(12) United States Patent
Blake et al.

(10) Patent No.: US 7,124,950 B2
(45) Date of Patent: Oct. 24, 2006

(54) BAR CODE SYMBOL READING SYSTEM EMPLOYING ELECTRONICALLY-CONTROLLED RASTER-TYPE LASER SCANNER FOR READING BAR CODE SYMBOLS DURING ON HANDS-ON AND HANDS-FREE MODES OF OPERATION

(75) Inventors: Robert E. Blake, Woodbury Heights, NJ (US); Stephen J. Colavito, Brookhaven, PA (US); Xiaoxun Zhu, Marlton, NJ (US); Charles Naylor, Sewell, NJ (US); Thomas C. Amundsen, Turnersville, NJ (US); Thomas Carullo, Marlton, NJ (US); C. Harry Knowles, Moorestown, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 10/826,677

(22) Filed: Apr. 16, 2004

(65) Prior Publication Data

US 2005/0001036 A1   Jan. 6, 2005

Related U.S. Application Data

(63) Continuation of application No. 09/996,079, filed on Nov. 28, 2001, now Pat. No. 6,742,709, which is a continuation of application No. 09/154,020, filed on Sep. 16, 1998, now abandoned, which is a continuation-in-part of application No. 08/931,691, filed on Sep. 16, 1997, now Pat. No. 6,227,450.

(51) Int. Cl.
*G02B 5/08* (2006.01)

(52) U.S. Cl. .............................. 235/462.36; 235/462.38

(58) Field of Classification Search ........... 236/462.01, 236/462.09, 462.22–462.26, 462.44, 462.45, 236/472.01, 472.03, 462.36, 462.38
See application file for complete search history.

(56) References Cited

U.S. PATENT DOCUMENTS

| | | |
|---|---|---|
| 3,532,408 A | 10/1970 | Dostal |
| 3,671,766 A | 6/1972 | Howe |
| 3,919,527 A | 11/1975 | Bowen et al. |
| 4,044,283 A | 8/1977 | Allison |
| 4,063,287 A | 12/1977 | van Rosmalen |
| 4,387,297 A | 6/1983 | Swartz et al. |
| 4,619,498 A | 10/1986 | Croiset |
| 4,632,501 A | 12/1986 | Glynn |
| 4,717,241 A | 1/1988 | Aagano |
| 4,794,239 A | 12/1988 | Allais |
| 4,958,894 A | 9/1990 | Knowles |
| 5,124,537 A | 6/1992 | Chandler et al. |
| 5,157,687 A | 10/1992 | Tymes |
| 5,168,149 A | 12/1992 | Dvorkis et al. |
| 5,172,261 A | 12/1992 | Kato et al. |
| 5,224,088 A | 6/1993 | Atiya |
| 5,237,161 A | 8/1993 | Grodevant |
| 5,262,627 A | 11/1993 | Shepard |
| 5,262,628 A | 11/1993 | Shepard et al. |
| 5,280,165 A | 1/1994 | Dvorkis et al. |
| 5,296,690 A | 3/1994 | Chandler et al. |
| 5,329,103 A | 7/1994 | Rando |
| 5,373,148 A | 12/1994 | Dvorkis et al. |
| 5,412,198 A | 5/1995 | Dvorkis |
| 5,478,997 A | 12/1995 | Bridgelall et al. |
| 5,528,022 A * | 6/1996 | Nakazawa ................... 235/436 |
| 5,543,610 A | 8/1996 | Bard et al. |
| 5,545,886 A * | 8/1996 | Metlitsky et al. ....... 235/462.42 |
| 5,581,067 A | 12/1996 | Grosfeld et al. |
| 5,591,952 A * | 1/1997 | Krichever et al. ...... 235/462.11 |
| 5,600,119 A | 2/1997 | Dvorkis et al. |
| 5,621,203 A * | 4/1997 | Swartz et al. ........... 235/462.11 |
| 5,661,290 A | 8/1997 | Bard et al. |
| 5,665,954 A | 9/1997 | Bard et al. |
| 5,691,834 A | 11/1997 | Plesko |
| 5,751,465 A | 5/1998 | Melville et al. |
| 5,825,006 A | 10/1998 | Longacre, Jr. et al. |
| 5,923,025 A | 7/1999 | Dvorkis et al. |
| 5,945,659 A | 8/1999 | Dvorkis et al. |
| 5,988,508 A * | 11/1999 | Bridgelall et al. ........ 235/462.4 |

| | | | |
|---|---|---|---|
| 6,010,071 A * | 1/2000 | Bard et al. | 235/462.43 |
| 6,568,595 B1 | 5/2003 | Wilz, Sr. et al. | |
| 6,621,063 B1 * | 9/2003 | McQueen | 250/208.1 |

FOREIGN PATENT DOCUMENTS

| | | |
|---|---|---|
| EP | 0 615 207 A2 | 11/1993 |
| EP | 0 731 417 A2 | 11/1996 |

OTHER PUBLICATIONS

Scientific publication entitled "Laser Scanner Notebook" by Leo Beiser, SPIE Optical Engineering Press, Nov. 1992, pp. 1-20.
International Appln. No. PCT/US98/19488, 1998.
European Appln. No. EP 98 94 9372, 2001.

* cited by examiner

*Primary Examiner*—Ahshik Kim
(74) *Attorney, Agent, or Firm*—Thomas J. Perkowski, Esq., P.C.

(57) ABSTRACT

A bar code symbol reading system is disclosed comprising a hand-supportable bar code symbol reading device which embodies an electronically-controlled bar code symbol reading engine for producing a raster-type laser scanning pattern in either a hands-free or hands-on mode of operation for scanning 1-D and 2D bar code symbols. The electronically-controlled bar code symbol reading engine has (i) a high-speed/high-resolution raster scanning mode of operation, during which a high-speed, high-resolution raster-type scanning pattern is precisely generated under electronic control, and (ii) a high-speed/low-resolution raster scanning mode of operation during which a high-speed, low-resolution raster-type scanning pattern is precisely generated under electronic control. The electronically-controlled bar code symbol reading engine is induced into its high-speed/high-resolution raster scanning mode of operation when the hand-supportable bar code symbol reading device is removed from its support stand, and into its high-speed/low-resolution raster scanning mode when the hand-supportable bar code symbol reading device is placed into its support stand. The bar code symbol reading engine comprises a pair of mechanically-damped off-resonant laser beam scanning mechanisms that are arranged on a miniature optical bench and electronically-controlled by either a synchronously or synchronously driven drive circuit. When asynchronously driven, the raster laser scanning pattern floats slightly along the y-scanning direction to facilitate reading of 2-D bar code symbols during the hands-on mode of operation.

12 Claims, 50 Drawing Sheets

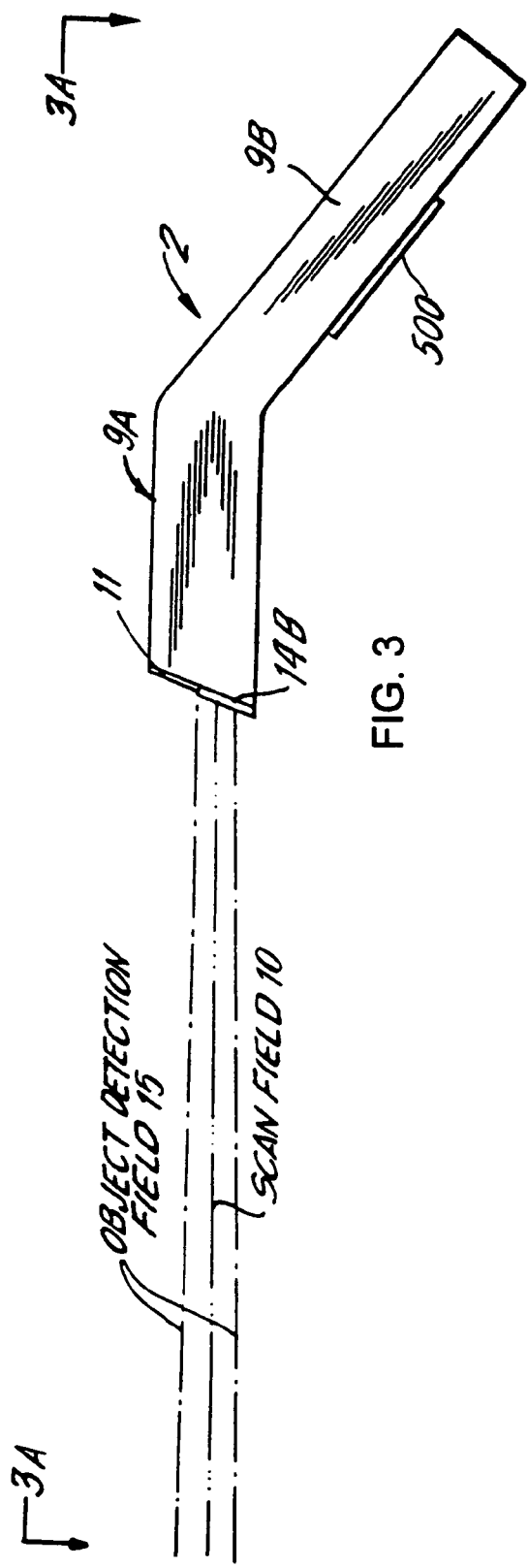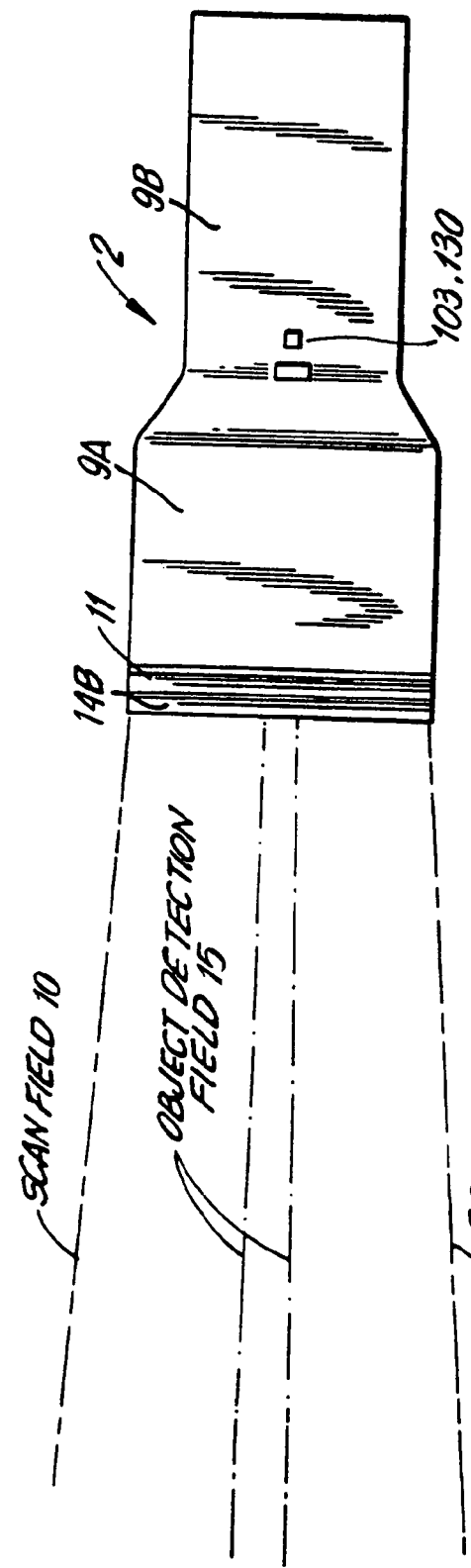
FIG. 3
FIG. 3A

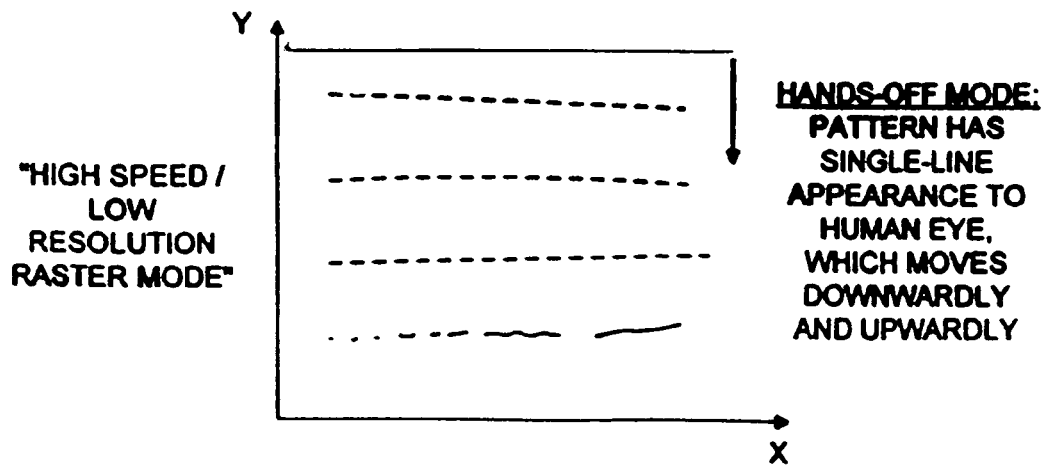
FIG. 4A1
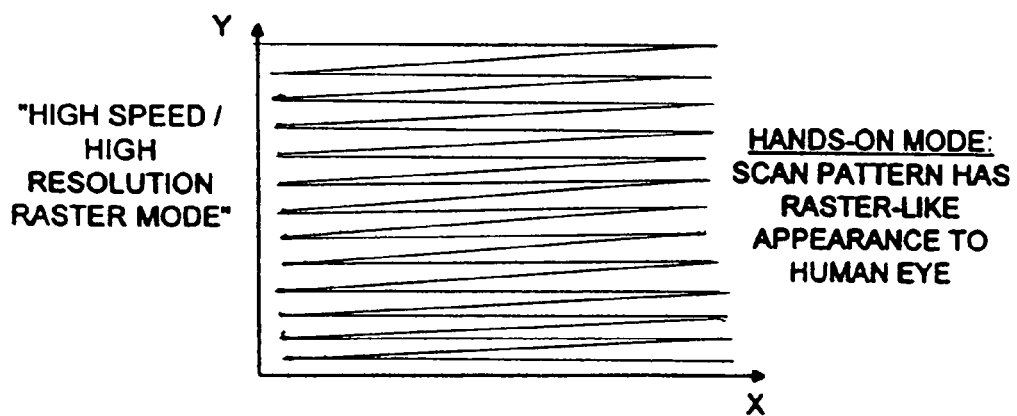
FIG. 4C1

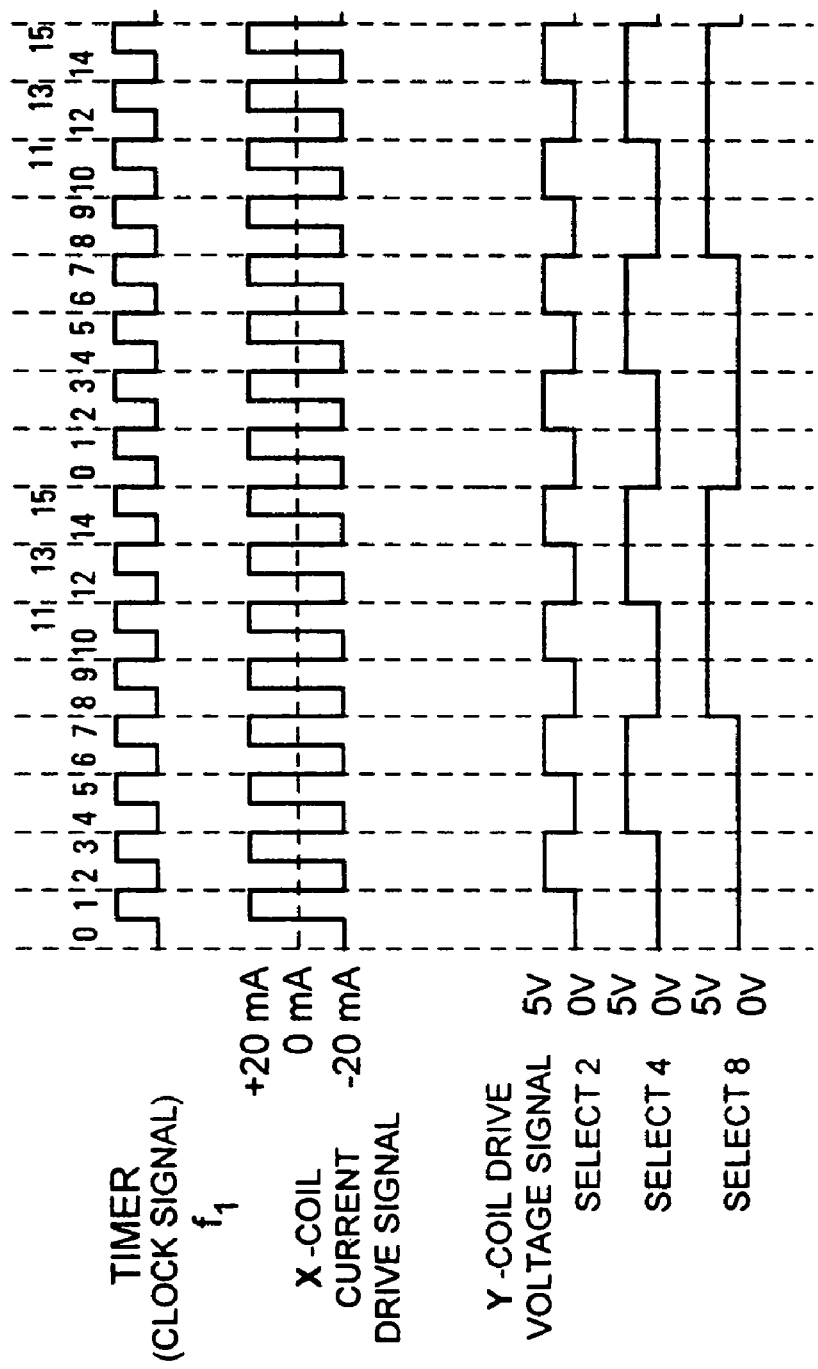

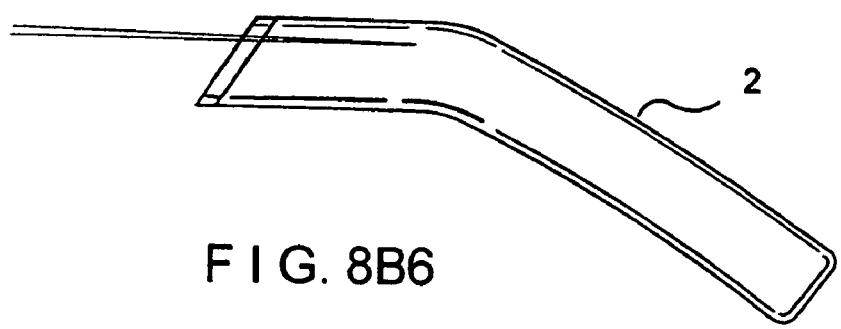
FIG. 8B6
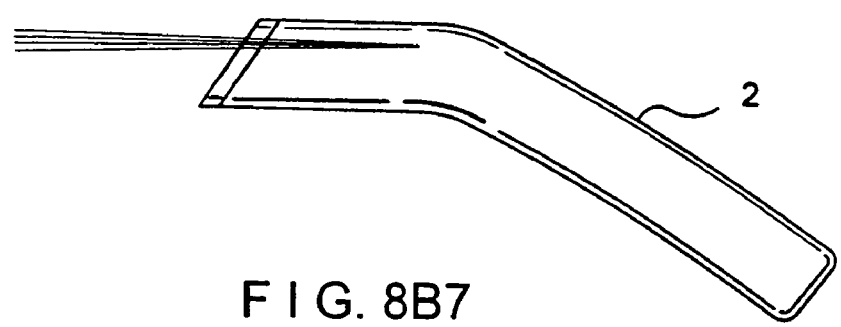
FIG. 8B7
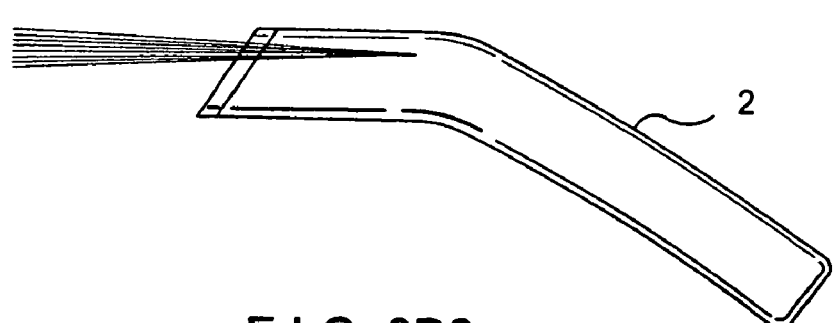
FIG. 8B8

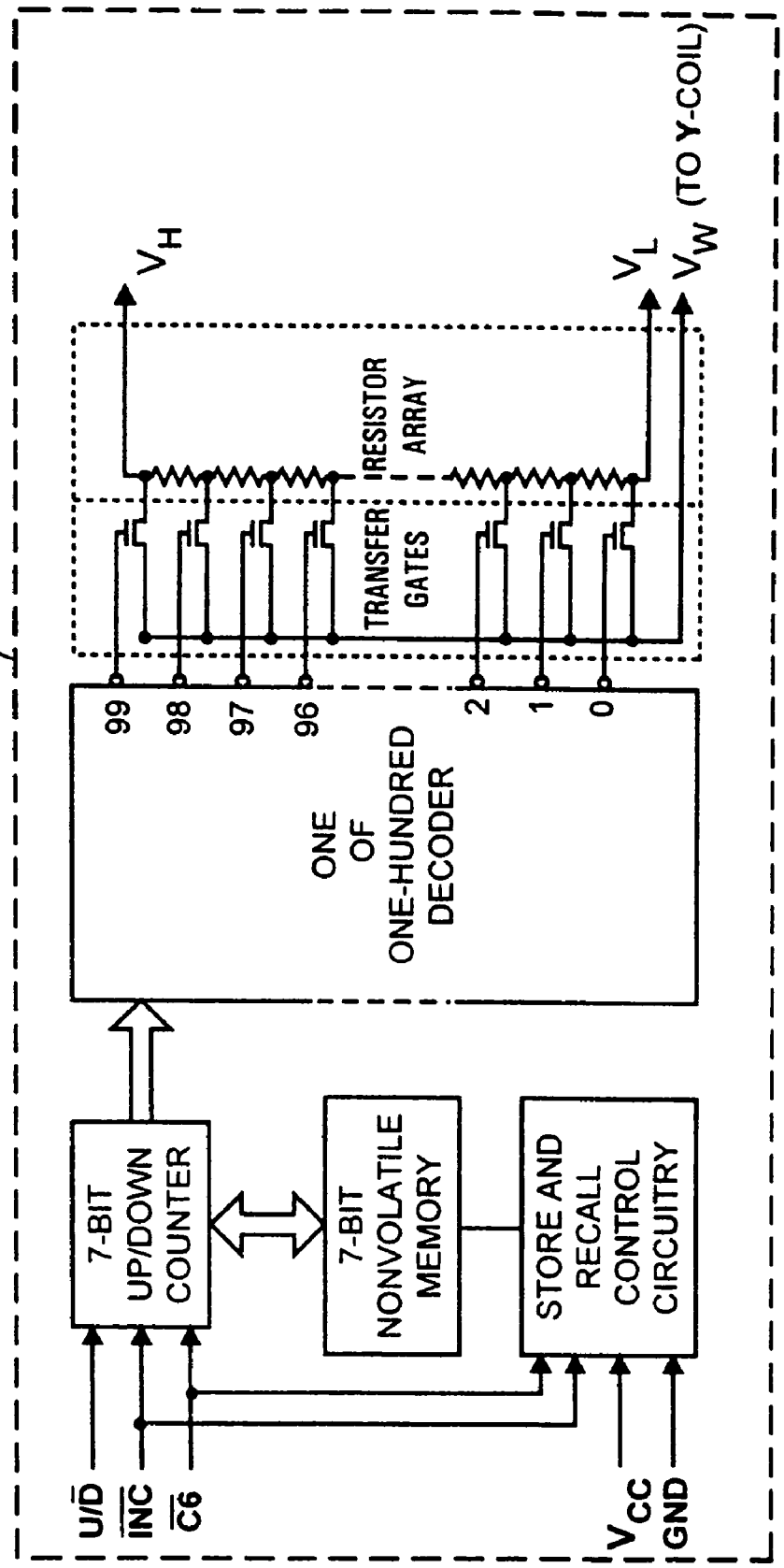
FIG. 8C1

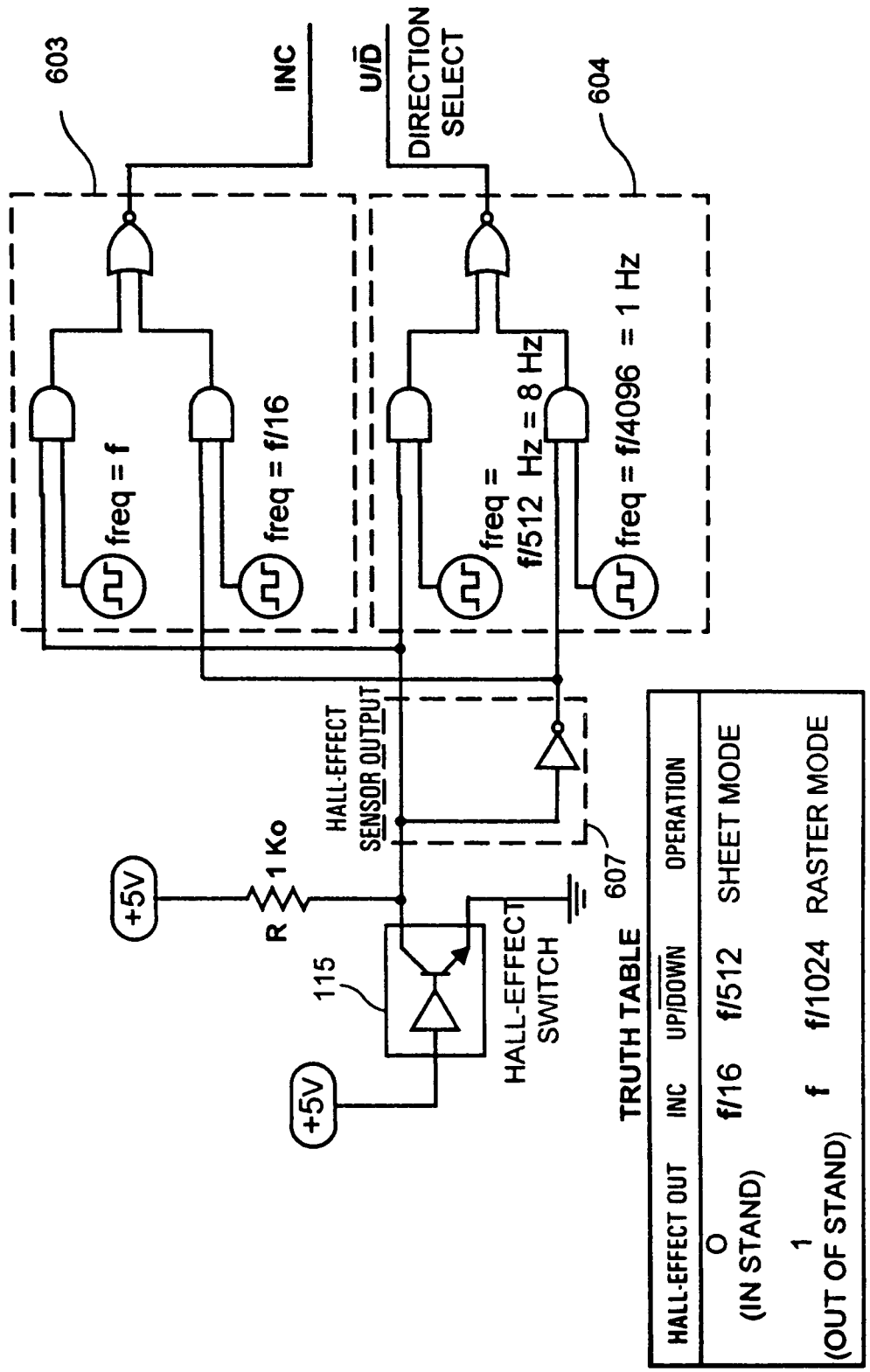
FIG. 8C2

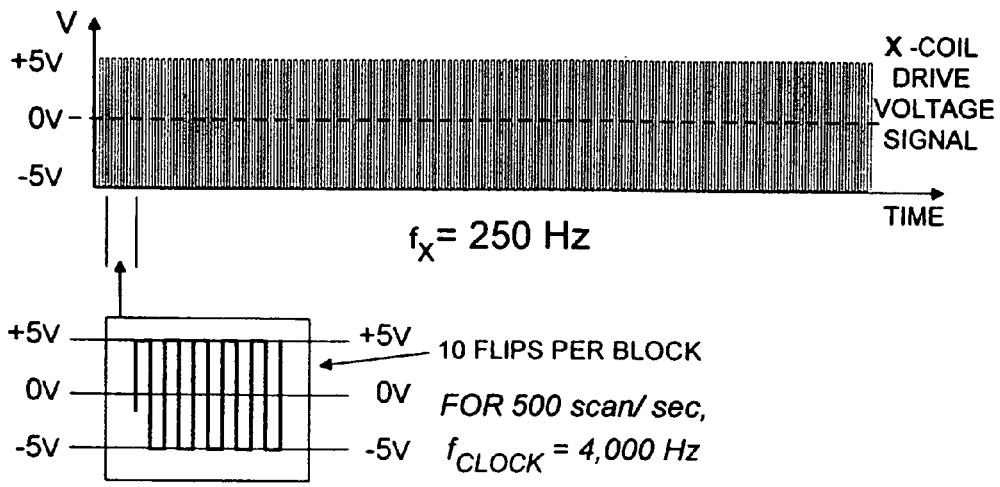
FIG. 8D1
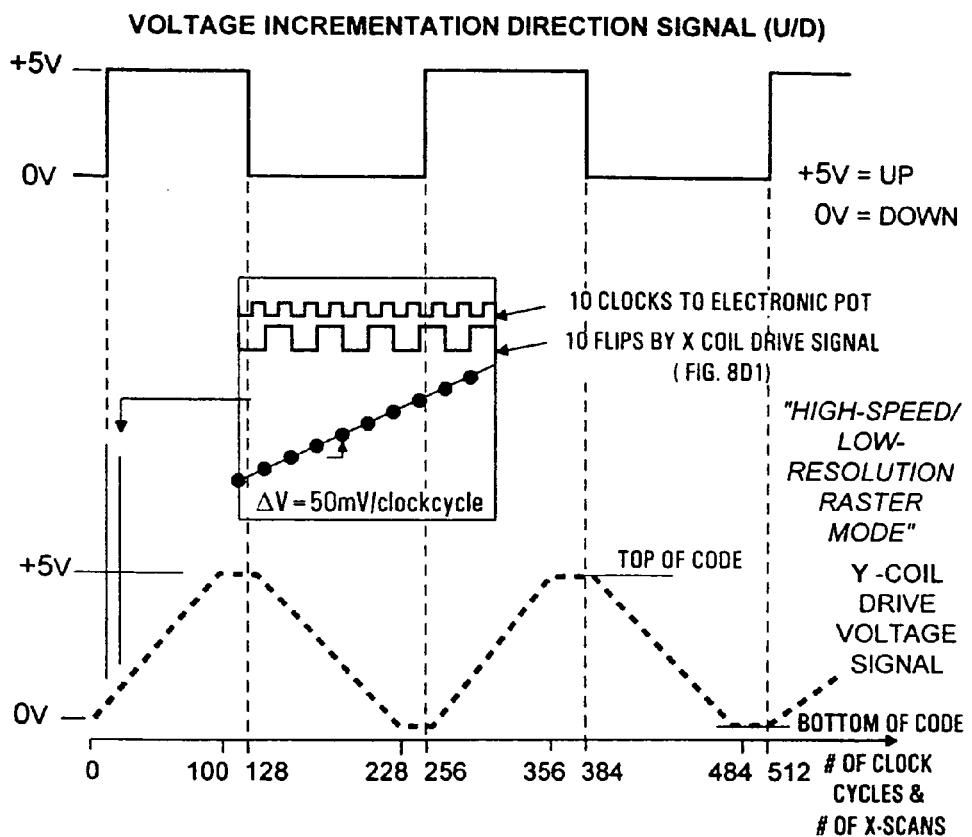
FIG. 8D2

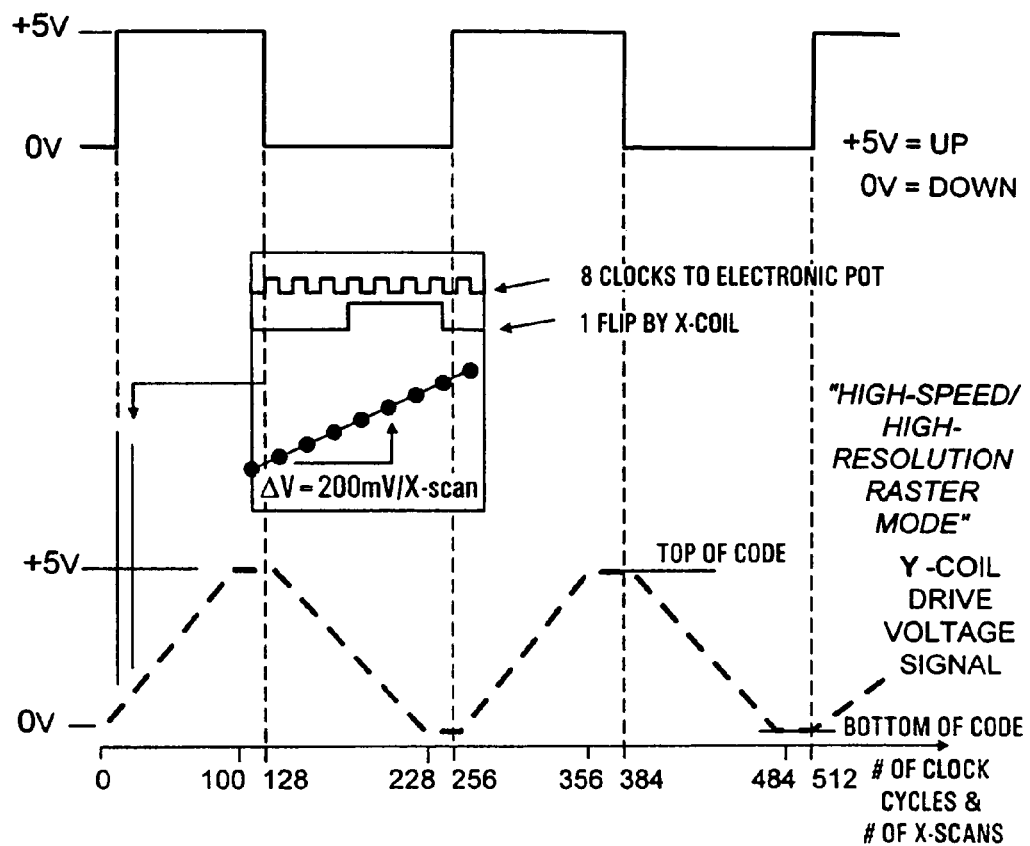
FIG. 8D3

$$E_0 = \overline{(B + A_0)(C_3/C_2 - 1)}$$
$$E_1 = (C_3/C_2 - 2) + B$$
$$E_2 = (C_2/C_1)(T_1)$$

| R | $C_3/C_2$-1 | $C_3/C_2$-2 | $E_3$ | $C_2/C_1$ |
|---|---|---|---|---|
| 0 | X | X | $A_{2L}$ | 0 |
| 1 | 0 | 0 | $A_{2L}$ | 0 |
| 1 | 0 | 1 | $A_{2S}$ | 0 |
| X | 1 | 1 | X | 1 |
|   | X = DON'T CARE | | | |

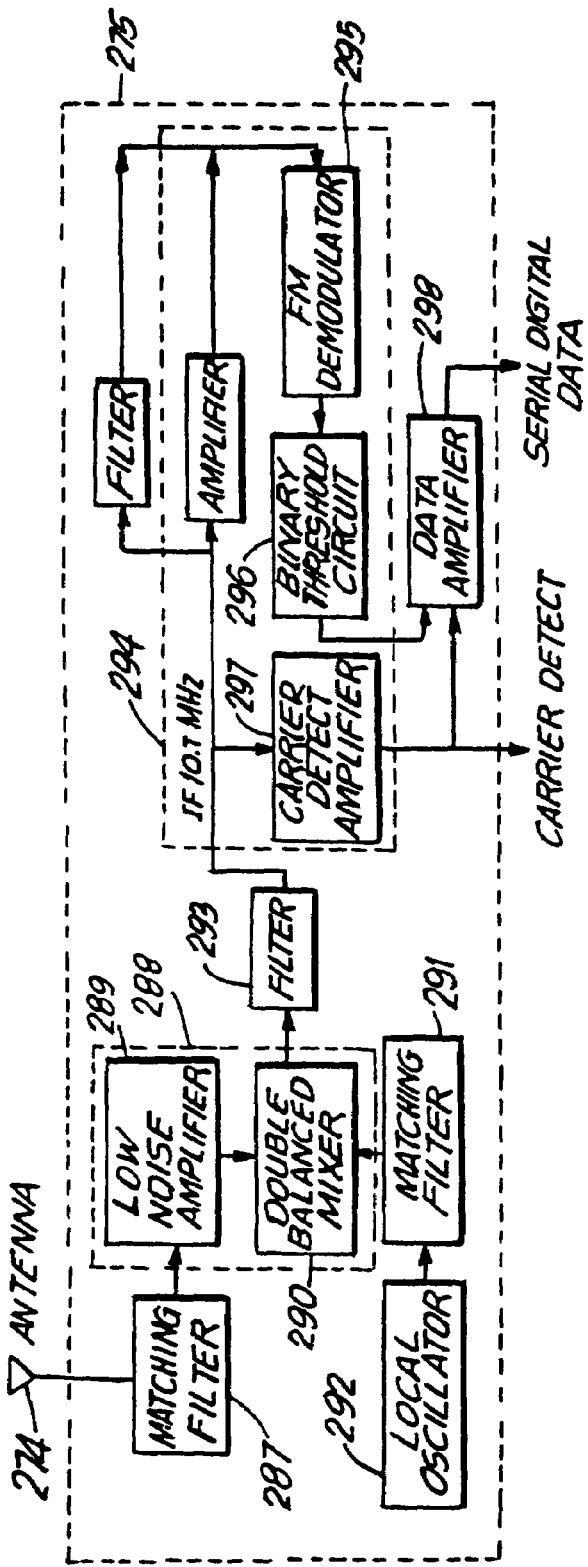
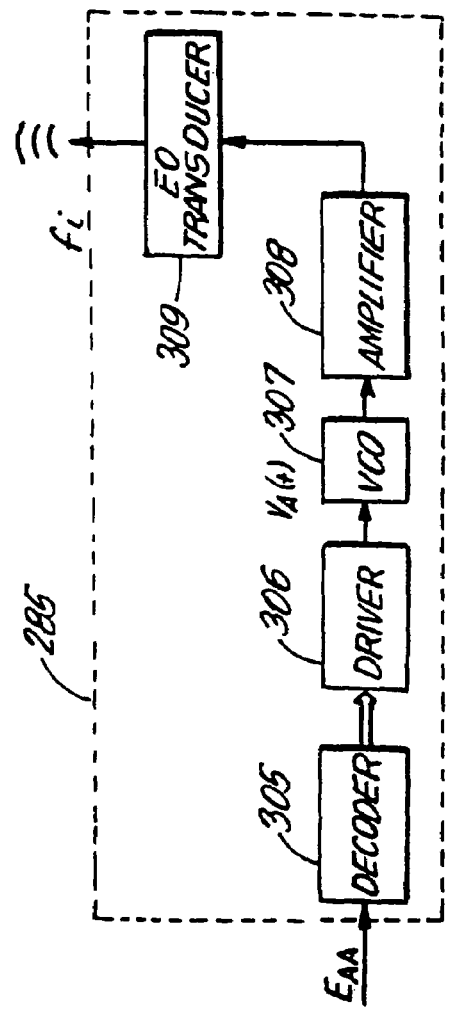
FIG. 16A
FIG. 16B

BAR CODE SYMBOL READING SYSTEM EMPLOYING ELECTRONICALLY-CONTROLLED RASTER-TYPE LASER SCANNER FOR READING BAR CODE SYMBOLS DURING ON HANDS-ON AND HANDS-FREE MODES OF OPERATION

RELATED CASES

This Application is a Continuation of Ser. No. 09/996,079 filed Nov. 28, 2001 now U.S. Pat. No. 6,742,709 which is a Continuation of Ser. No. 09/154,020 filed Sep. 16, 1998; now abandoned; which is a Continuation-in-part of application Ser. No. 08/931,691 filed Sep. 16, 1997, now U.S. Pat. No. 6,227,450; each said patent application is assigned to and commonly owned by Metrologic Instruments, Inc. of Blackwood, N.J., and is incorporated herein by reference in its entirety.

BACKGROUND OF THE INVENTION

1. Field of Invention

The present invention relates generally to laser scanning bar code symbol reading systems, and more particularly to portable bar code symbol reading systems capable of generating raster-type laser scanning patterns having variable speed and resolution for reading various types of 1-D and 2-D bar code symbols during hands-on and hands-free modes of operation.

2. Brief Description of the Prior Art

Bar code symbols have become widely used in many commercial environments such as, for example, point-of-sale (POS) stations in retail stores and supermarkets, inventory and document tracking, and diverse data control applications. To meet the growing demands of this recent technological innovation, bar code symbol readers of various types have been developed for scanning and decoding bar code symbol patterns and producing symbol character data for use as input in automated data processing systems.

In general, laser scanning bar code symbol scanners are used for reading one-dimensional (1D) and two-dimensional (2-D) bar code symbols on products and packages for identification purposes. 2-D bar code symbols are advantageous in that they have the capacity to encode a substantially larger volume of data than 1D bar code symbols. Consequently, 2-D bar code symbols have enjoyed increasing popularity over recent years.

Many different techniques exist for scanning laser beams across objects bearing 2-D bar code symbols. Examples of 2-D laser scanning mechanisms for reading 2-D bar code symbols (e.g. the popular PDF 417 symbology) are described in U.S. Pat. Nos. 5,665,954, 5,691,834, and 5,550,367 and EPO Patent Application Publication No. EP 0 731 417 A2, incorporated herein by reference.

While each of these prior art laser scanning mechanisms are capable of producing a raster-type laser scanning pattern, such prior art techniques are unnecessarily complicated, expensive to manufacture, and generally do not enable precise speed/resolution control within the raster scanning pattern in a simple and practical manner required by numerous 2-D scanning applications.

Thus, there is a great need in the bar code symbol reading art for a bar code symbol reading system and method which overcomes the above-described shortcomings and drawbacks without compromising system performance and versatility.

OBJECTIVES AND SUMMARY OF THE INVENTION

Accordingly, it is a primary object of the present invention to provide improved laser scanning bar code symbol reading system that avoids the shortcomings and drawbacks of prior art methods and technologies.

A further object of the present invention is to provide a bar code symbol reading system comprising a hand-supportable bar code symbol reading device which embodies an electronically-controlled bar code symbol reading engine for producing a raster-type laser scanning pattern in either a hands-free or hands-on mode of operation for scanning 1-D and 2D bar code symbols.

Another object of the present invention is to provide such a bar code symbol reading system, wherein a support stand is provided for supporting the hand-supportable bar code symbol reading device above a counter-top or like surface during the hands-free mode of operation.

Another object of the present invention is to provide such a bar code symbol reading system, wherein the hand-supportable bar code symbol reading device can be used as either a portable automatic hand-supported bar code symbol reader in its hands-on mode of operation, or as an automatic fixed projection-type bar code symbol reader in its hands-free mode of operation.

Another object of the present invention is to provide such a bar code symbol reading system, wherein the electronically-controlled bar code symbol reading engine has (i) a high-speed/high-resolution raster scanning mode of operation during which a high-speed, high-resolution raster-type scanning pattern is precisely generated under electronic control, and (ii) a high-speed/low-resolution raster scanning mode of operation during which a high-speed, low-resolution raster-type scanning pattern is precisely generated under electronic control.

Another object of the present invention is to provide such a bar code symbol reading system, wherein the electronically-controlled bar code symbol reading engine is induced into its high-speed/high-resolution raster scanning mode of operation when the hand-supportable bar code symbol reading device is removed from its support stand, and into its high-speed/low-resolution raster scanning mode when the hand-supportable bar code symbol reading device is placed into its support stand.

Another object of the present invention is to provide such a bar code symbol reading system, wherein 2-D bar code symbols can be easily and reliably read in the hands-on mode of operation when the electronically-controlled bar code symbol reading engine is induced into its high-speed/high-resolution raster scanning mode of operation.

Another object of the present invention is to provide such a bar code symbol reading system, wherein 2-D bar code symbols can be easily and reliably read in the hands-free mode of operation when the electronically-controlled bar code symbol reading engine is induced into its high-speed/low-resolution raster scanning mode of operation as, for example, during sheet reading applications.

Another object of the present invention is to provide such a bar code symbol reading system, wherein 2-D bar code symbols, containing numerous lines of information encoded in accordance with the PDF 147 symbology, can be read by the bar code symbol reading device and the symbol character data representative thereof be automatically transmitted to a base unit over a one-way wireless radio-frequency (RF) link, and therefrom, onto a host computer, whereupon the base unit an acoustical acknowledgment signal is automatically generated for reception by the human operator.

Another object of the present invention is to provide such a bar code symbol reading system, wherein the hand-supportable bar code symbol reading device is provided with an IR-based object detection subsystem for enabling automatic actuation of the raster-type bar code symbol reading engine of the present invention upon automatic detection of objects.

Another object of the present invention is to provide such a bar code symbol reading system, wherein the hand-supportable bar code symbol reading device is provided with a manually-actuated trigger for enabling manual actuation of the raster-type bar code symbol reading engine of the present invention.

Another object of the present invention is to provide such a bar code symbol reading system, wherein the raster-type bar code symbol reading engine of the present invention can be electronically-reconfigured to produce a single-line type laser scanning pattern upon manual actuation of an external switch provided on the exterior of the hand-supportable housing of the bar code symbol reading device, or upon reading a predesigned mode-switching bar code symbol, for reading 1-D bar code symbols.

A further object of the present invention is to provide such a bar code symbol reading system, wherein the raster-type bar code symbol reading engine comprises a pair of mechanically-damped off-resonant laser beam scanning mechanisms that are arranged on a miniature optical bench and electronically-controlled by a synchronously driven drive circuit.

A further object of the present invention is to provide such a bar code symbol reading system, wherein the raster-type bar code symbol reading engine comprises a pair of mechanically-damped off-resonant laser beam scanning mechanisms that are arranged on a miniature optical bench and electronically-controlled by an asynchronously driven drive circuit so that the raster laser scanning pattern floats slightly along the y-scanning direction to facilitate reading of 2-D bar code symbols during the hands-on mode of operation.

A further object of the present invention is to provide such a bar code symbol reading system, wherein each such laser beam scanning mechanism comprises an etched scanning element having a small flexible gap region of closely-controlled dimensions disposed between an anchored base portion and a laser beam deflecting portion.

Another object of the present invention is to provide such a bar code symbol reading system, wherein the resonant frequency or oscillation of each laser beam deflecting portion relative to the anchored base portion is determined by the closely controlled dimensions of the flexible gap region set during manufacture.

A further object of the present invention is to provide such a bar code symbol reading system, wherein the resonant frequency of oscillation of each scanning element is tuned by adjusting the thickness and width of the flexible gap region.

Another object of the present invention is to provide such a bar code symbol reading system, wherein the physical dimensions of the flexible gap region are closely controlled by using chemical-etching techniques during manufacture.

Another object of the present invention is to provide such a bar code symbol reading system, wherein each etched scanning element is manufactured by chemically etching a double-sided copper clad sheet consisting of a polyamide base material laminated between ultra-thin cooper sheets.

Another object of the present invention is to provide such a bar code symbol reading system, wherein a permanent magnet is mounted on the rear surface of each laser beam deflecting portion, and a laser beam deflecting element is mounted on the front surface of the laser beam deflecting portion.

Another object of the present invention is to provide such a bar code symbol reading system, wherein the base portion of each scanning element is securely fixed to an optical bench and the laser beam deflecting portion is forced to oscillate substantially away from the natural resonant frequency of the scanning element, by a reversible electromagnet disposed in close proximity to a permanent magnet mounted to the rear surface of the laser beam deflecting portion.

Another object of the present invention is to provide such a bar code symbol reading system, wherein the natural harmonic (i.e., resonant) frequency of each laser beam deflecting portion about the anchored base portion is mechanically-damped by adding a thin layer of flexible rubber material to the gap region of the scanning element during manufacture, and the laser beam deflecting portion is forcibly driven by a reversible electromagnet operated at a forcing (i.e., driving) frequency tuned substantially away (i.e., off) from the natural resonant frequency of the laser beam deflecting portion.

Another object of the present invention is to provide such a bar code symbol reading system, wherein the steady-state frequency of oscillation of the laser beam deflecting portion is determined by the frequency of polarity reversal of the electromagnet, which is electronically controlled by the polarity of electrical current supplied to the input terminals of the magnet coil of the reversible electromagnet.

Another object of the present invention is to provide such a bar code symbol reading system with an electronically-controlled laser beam scanning mechanism, wherein the driving or forcing frequency of the electromagnet thereof is selected to be at least ten percent off (i.e., greater or less than) the natural resonant frequency of the laser beam deflecting portion. Another object of the present invention is to provide such a bar code symbol reading system, wherein the steady-state frequency of oscillation can be set at the time of manufacture to be any one of a very large range of values (e.g., 50–500 Hz) for use in both low-speed and high-speed laser scanning systems.

Another object of the present invention is to provide such a bar code symbol reading system, wherein the laser beam scanning mechanism has ultra-low power consumption, and a low operating current.

Another object of the present invention is to provide such a bar code symbol reading system, wherein the angular sweep of each laser beam deflecting element is at about thirty (i.e., +/−15 degrees) measured with respect to the point of pivot about the anchored base portion of the scanning element of the present invention.

Another object of the present invention is to provide such a bar code symbol reading system, wherein the scanning element and electromagnet are mounted within an ultra-compact housing having integrated stops for delimiting the sweep that the scanning element is permitted to undergo during operation.

A further object of the present invention is to provide such a system with one or more automatic (i.e., triggerless) hand-supportable laser-based bar code symbol reading devices, each of which is capable of automatically transmitting data packets to its base unit after each successful reading of a bar code symbol.

A further object of the present invention is to provide such a bar code symbol system, wherein the base unit is adapted to support the hand-supportable bar code symbol reading device in its automatic hands-free mode of operation.

Another object of the present invention is to provide an improved bar code symbol reading system capable of generating high-speed raster-type laser scanning patterns for reading one-dimensional and two-dimensional bar code symbols in both hands-on and hands-off modes of operation.

A further object of the present invention is to provide such a bar code symbol reading system in the form of a portable data (transaction) terminal capable of producing either a 1-D or 2-D laser scanning pattern by manual selection, or bar code symbol programming, for reading 1-D or 2-D bar code symbols, respectively.

A further object of the present invention is to provide such a bar code symbol reading system in the form of a body-wearable transaction terminal capable of producing either a 1-D or 2-D laser scanning pattern for reading 1-D or 2-D bar code symbols, respectively.

A further object of the present invention is to provide such a bar code symbol reading system, wherein the base unit contains a battery recharging device that automatically recharges batteries contained in the hand-supportable device when the hand-supportable device is supported within the base unit.

It is another object of the present invention to provide such a bar code symbol reading system with a mode of operation that permits the user to automatically read one or more bar code symbols on an object in a consecutive manner.

A further object of the present invention is to provide such a bar code symbol reading system, wherein a plurality of automatic hand-supportable bar code symbol reading devices are used in conjunction with a plurality of base units, each of which is mated to a particular bar code symbol reading device.

A further object is to provide such a bar code symbol reading device, wherein the automatic hand-supportable bar code (symbol) reading device has an infrared (IR) based object detection field which spatially encompasses at least a portion of its visible laser light scan field along the operative scanning range of the device, thereby improving the laser beam pointing efficiency of the device during the automatic bar code reading process of the present invention.

Another object of the present invention is to provide such an bar code symbol reading system, wherein the base unit has a support frame that supports the hand-supportable housing of the device in a selected mounting position, and permits complete gripping of the handle portion of the hand-supportable housing prior to removing it from the support frame.

A further object of the present invention is to provide such an automatic bar code symbol reading system, wherein the hand-supportable bar code reading device has a hands-on high-speed/high-resolution mode of raster scanning, and a hands-off high-speed/low-resolution mode of raster scanning.

An even further object of the present invention is to provide an automatic hand-supportable bar code reading device which prevents multiple reading of the same bar code symbol due to the dwelling of the laser scanning beam upon a bar code symbol for an extended period of time.

It is a further object of the present invention to provide an automatic hand-supportable bar code reading device having a control system which has a finite number of states through which the device may pass during its automatic operation, in response to diverse conditions automatically detected within the object detection and scan fields of the device.

It is yet a further object of the present invention to provide a portable, fully automatic bar code symbol reading system which is compact, simple to use and versatile.

Yet a further object of the present invention is to provide a novel method of reading bar code symbols using the automatic hand-supportable laser scanning device of the present invention.

A further object of the present invention is to provide such a bar code symbol reading system, wherein the laser scanning plane thereof extends upwardly, downwardly, or laterally transverse to the pointing direction of the wearer's hand on which the device is mounted.

A further object of the present invention is to provide a point-of-sale station incorporating the automatic bar code symbol reading system of the present invention.

These and further objects of the present invention will become apparent hereinafter and in the claims.

BRIEF DESCRIPTION OF THE DRAWINGS

For a fuller understanding of the Objects of the Present Invention, the Detailed Description of the Illustrated Embodiments of the Present Invention should be read in conjunction with the accompanying drawings, wherein:

FIG. 3 is an elevated side view of the first illustrative embodiment of the automatic bar code symbol reading device of the present invention, illustrating the spatial relationship between the object detection and scan fields of the device, and the long and short-ranges of programmed object detection, bar code presence detection, and bar code symbol reading;

FIG. 3A is a plan view of the automatic bar code symbol reading device taken along line 3A—3A of FIG. 3;

FIG. 4A1 is a schematic representation of the high-speed/low-resolution raster laser scanning pattern generated from the bar code symbol reading system of FIG. 1 when operated in its hands-free mode;

FIG. 4C1 is a schematic representation of the high-speed/high-resolution raster laser scanning pattern generated from the bar code symbol reading system of FIG. 1 when operated in its hands-on mode;

FIG. 8B1 is a schematic representation of the output clock signal used in the circuitry of FIG. 8A to synchronize the current drive signal supplied to the electromagnetic coil of the X-axis laser beam scanning module employed in the bar code symbol reading engine of FIG. 5A;

FIG. 8B2 is a schematic representation of the drive current signal supplied to the electromagnetic coil of the X-axis laser beam scanning module employed in the bar code symbol reading engine of FIG. 5A;

FIG. 8B3 is a schematic representation of the voltage signal used to drive the electromagnetic coil of the Y-axis laser beam scanning module employed in the engine of FIG. 5A when a two-line raster scanning pattern is to be produced;

FIG. 8B4 is a schematic representation of the voltage signal used to drive the electromagnetic coil of the Y-axis laser beam scanning module employed in the engine of FIG. 5A when a four-line raster scanning pattern is to be produced;

FIG. 8B5 is a schematic representation of the voltage signal used to drive the electromagnetic coil of the Y-axis laser beam scanning module employed in the engine of FIG. 5A when a eight-line raster scanning pattern is to be produced;

FIG. 8B6 is an elevated side-view of a two-line raster laser scanning pattern produced from the bar code symbol reading engine shown in FIG. 5A, when driven with the voltage signal of FIG. 8B3;

FIG. 8B7 is an elevated side-view of a four-line raster laser scanning pattern produced from the bar code symbol reading engine shown in FIG. 5A, when driven with the voltage signal of FIG. 8B4;

FIG. 8B8 is an elevated side-view of a eight-line raster laser scanning pattern produced from the bar code symbol reading engine shown in FIG. 5A, when driven with the voltage signal of FIG. 8B5;

FIG. 8C1 is a schematic block diagram of the electronically-controlled potentiometer employed in the coil-drive signal generation circuit of FIGS. 8CA through 8CD;

FIG. 8C2 is a schematic diagram of the potentiometer employed in the coil-drive signal generation circuit of FIGS. 8CA through 8CD;

FIG. 8D1 is a schematic representation showing how the direction select signal (U/D) is produced the Y-Direction Sweep Rate Control Circuit using the x-coil drive voltage signal generated by the coil drive voltage generation circuit of FIGS. 8CA through 8CD;

FIG. 8D2 is a schematic representation showing how, during the high-speed/low-resolution raster mode, the y-coil drive voltage signal is ($V_W$) is produced from the electronically-controlled potentiometer/drive circuit using, as input, the direction select signal (U/D) generated from the Y-axis sweep rate control circuit and the increment signal (INC) generated from the Y-axis step time control circuit employed in the Y-axis drive voltage generation circuit of FIGS. 8CA through 8CD;

FIG. 8D3 is a schematic representation showing how, during the high-speed/high-resolution raster mode, the y-coil drive voltage signal ($V_W$) is produced from the electronically-controlled potentiometer/drive circuit using, as input, the direction select signal (U/D) generated from the Y-axis sweep rate control circuit and the increment signal (INC) generated from the Y-axis step time control circuit employed in the Y-axis drive voltage generation circuit of FIGS. 8CA through 8CD;

FIG. 16A is a functional block diagram of the radio receiver subcircuit of the data packet receiving circuit of FIG. 16;

FIG. 16B is a functional block diagram of the digitally controlled acoustical acknowledgment signal generating circuit of the present invention;

DETAILED DESCRIPTION OF THE ILLUSTRATIVE EMBODIMENTS OF THE PRESENT INVENTION

The illustrative embodiments of the present invention will be described with reference to the figure drawings wherein like elements and structures are indicated by like reference numbers.

Figure 1:
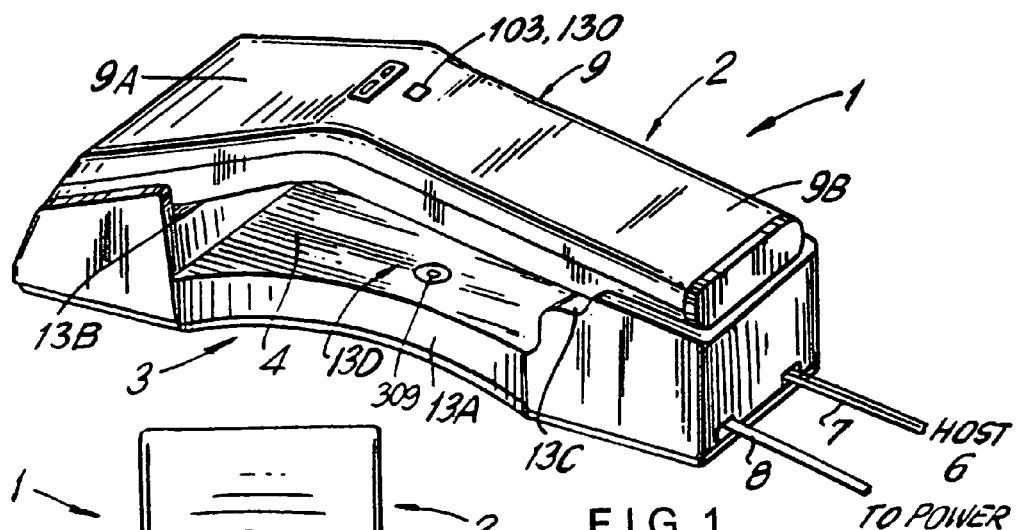
FIG. 1 is a perspective view of the first illustrative embodiment of the automatic bar code symbol reading device of the present invention, shown supported within the scanner support stand portion of its matching base unit, for automatic hands-free operation using IR-based object detection.
Figure 1A:
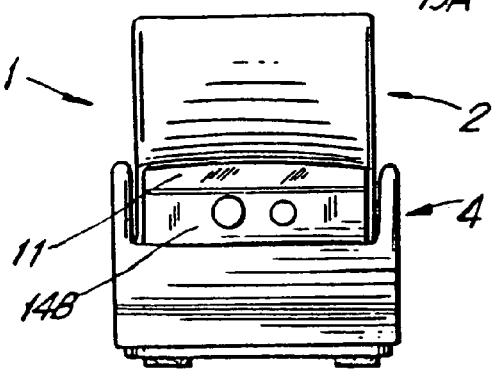
FIG. 1A is an elevated front view of the automatic bar code symbol reading device of FIG. 1, shown supported within the scanner support stand portion of its base unit.
Figure 1B:
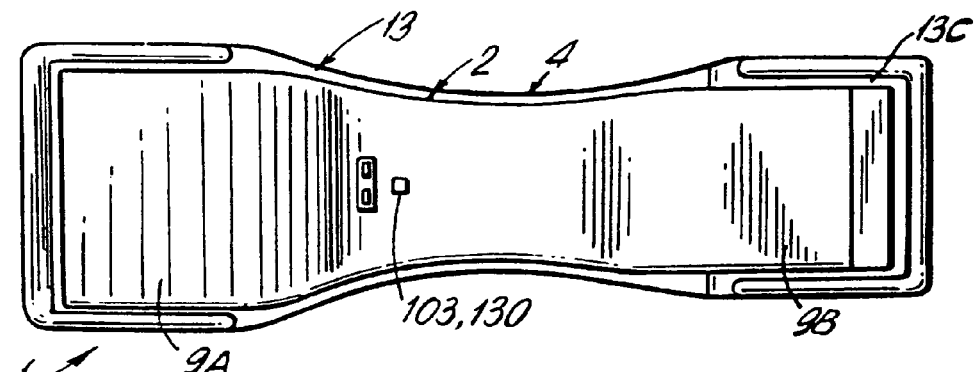
FIG. 1B is a plan view of the automatic bar code symbol reading system shown in FIG. 1.
Figure 18:
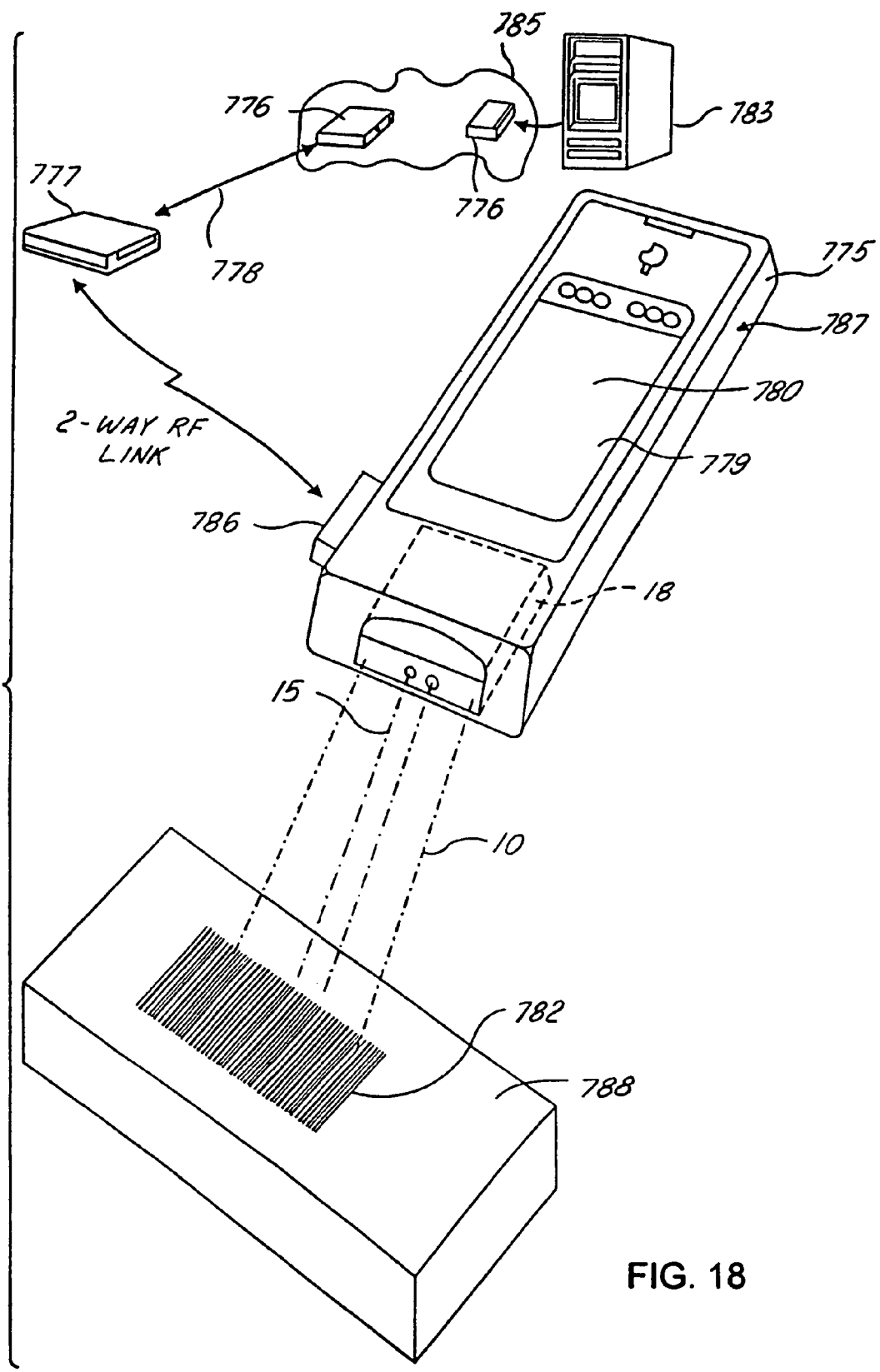
FIG. 18 is a perspective view of a second illustrative embodiment of the automatic bar code symbol reading system of the present invention realized in the form of a portable Internet-based data transaction terminal, in which the laser beam scanning module of FIG. 5A is integrated therewith for scanning 1-D and 2-D bar code symbols.
Figure 19:
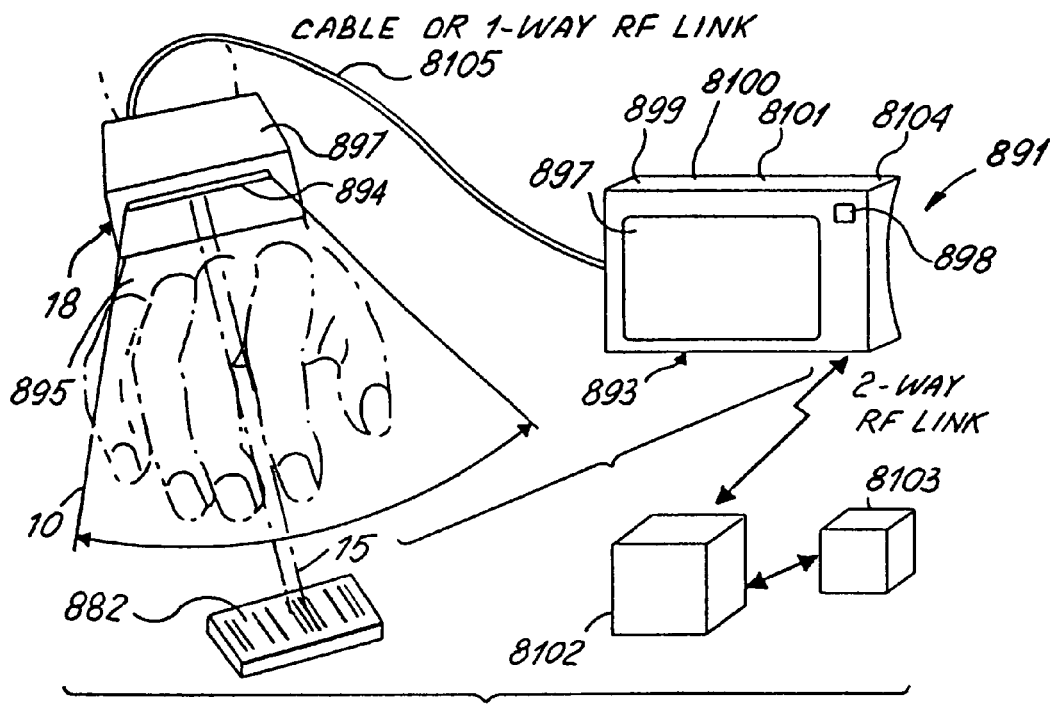
FIG. 19 is a perspective view of a perspective view of a third illustrative embodiment of the automatic bar code symbol reading system of the present invention realized in the form of a body-wearable Internet-based data transaction terminal, in which the laser beam scanning engine (i.e. module) of FIG. 5A is integrated therewith for scanning 1-D and 2-D bar code symbols.

In FIGS. 1, 18 and 19, first, second and third illustrative embodiments of the bar code symbol reading system hereof are shown, wherein an automatic IR-based object detection subsystem is provided in each of these systems for automatically activating the laser scanning mechanism thereof in response to automated IR-based object detection.

Figure 20:
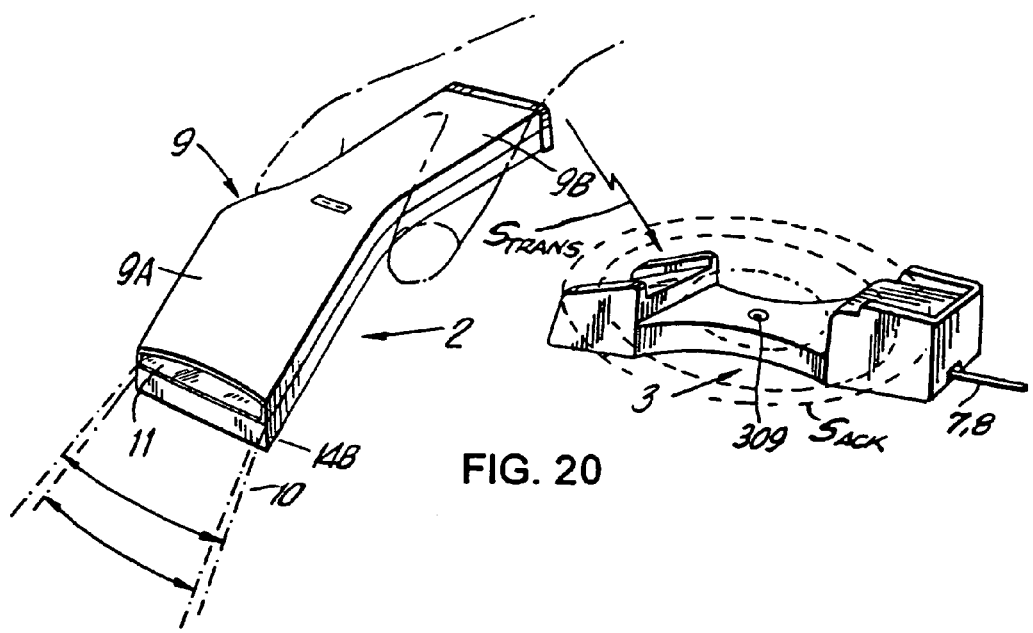
FIG. 20 is a perspective view of the four illustrative embodiment of the bar code symbol reading system of the present invention, shown supported within the scanner support stand portion of its matching base unit, for automatic hands-free operation using low-power laser-based object detection.
Figure 21:
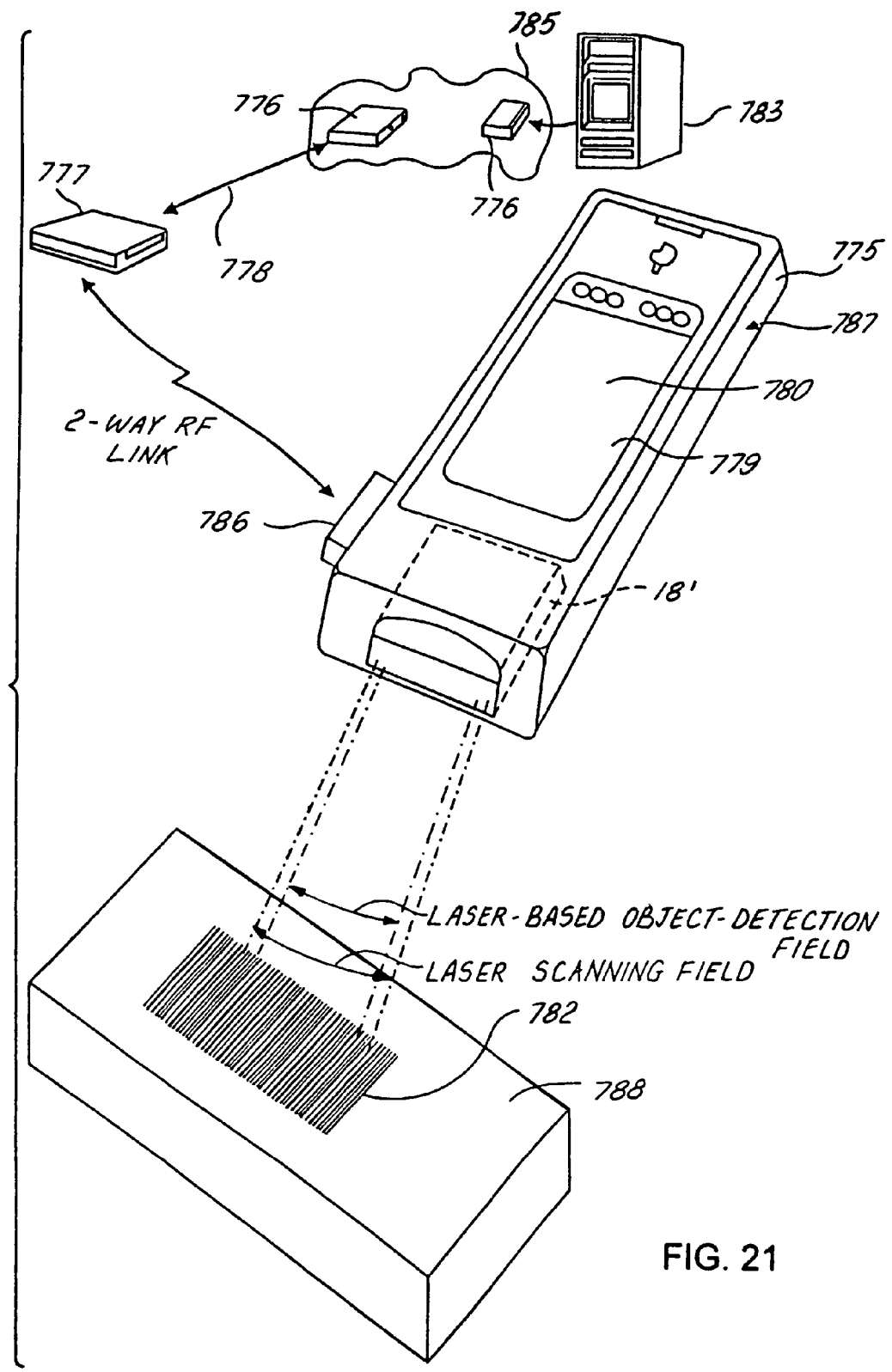
FIG. 21 is a perspective view of a fifth illustrative embodiment of the bar code symbol reading system of the present invention realized in the form of a portable Internet-based data transaction terminal, wherein a laser beam scanning module employing low-power object detection is integrated therewith for scanning 1-D and 2-D bar code symbols.
Figure 22:
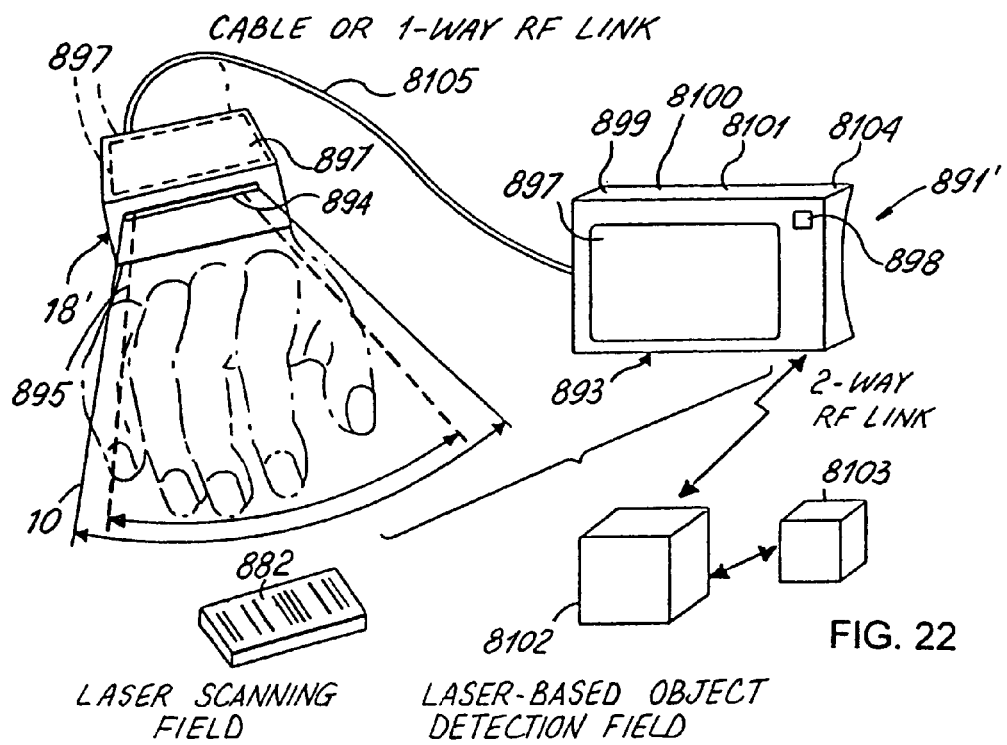
FIG. 22 is a perspective view of a sixth illustrative embodiment of the automatic bar code symbol reading system of the present invention realized in the form of a body-wearable Internet-based data transaction terminal, wherein a laser beam scanning engine (i.e. module) employing low-power laser-based object detection is integrated therewith for scanning 1-D and 2-D bar code symbols.

In FIGS. 20, 21 and 22, fourth, fifth and sixth illustrative embodiments of the bar code symbol reading system hereof are shown, wherein a low-power laser-based object detection subsystem is provided in each of these systems for automatically activating the laser scanning mechanism thereof in response to automated laser-based object detection.

Figure 23:
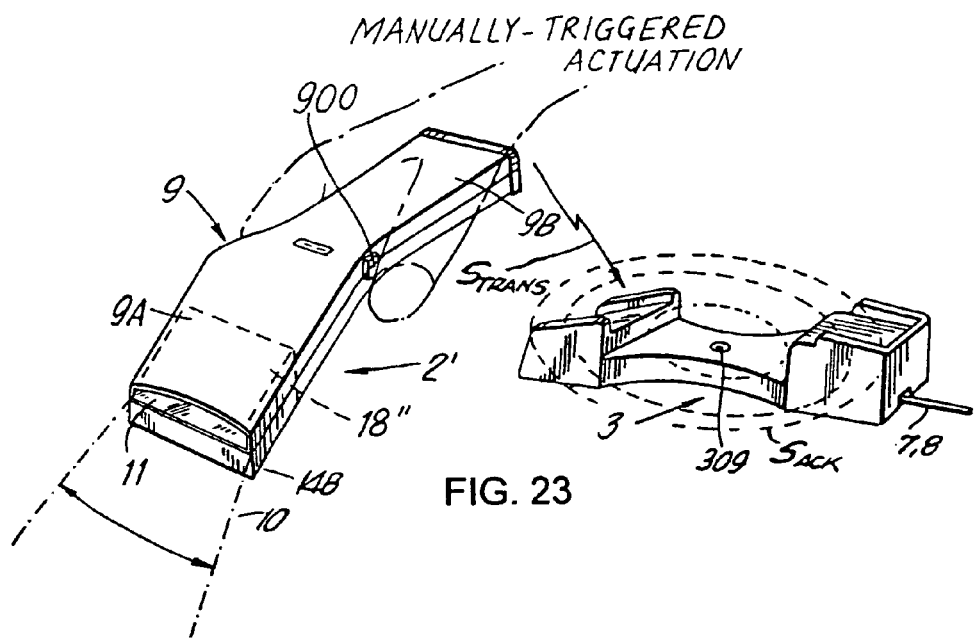
FIG. 23 is a perspective view of the seventh illustrative embodiment of the bar code symbol reading system of the present invention, shown in the form of a manually-actuated hand-held bar code symbol scanner.
Figure 24:
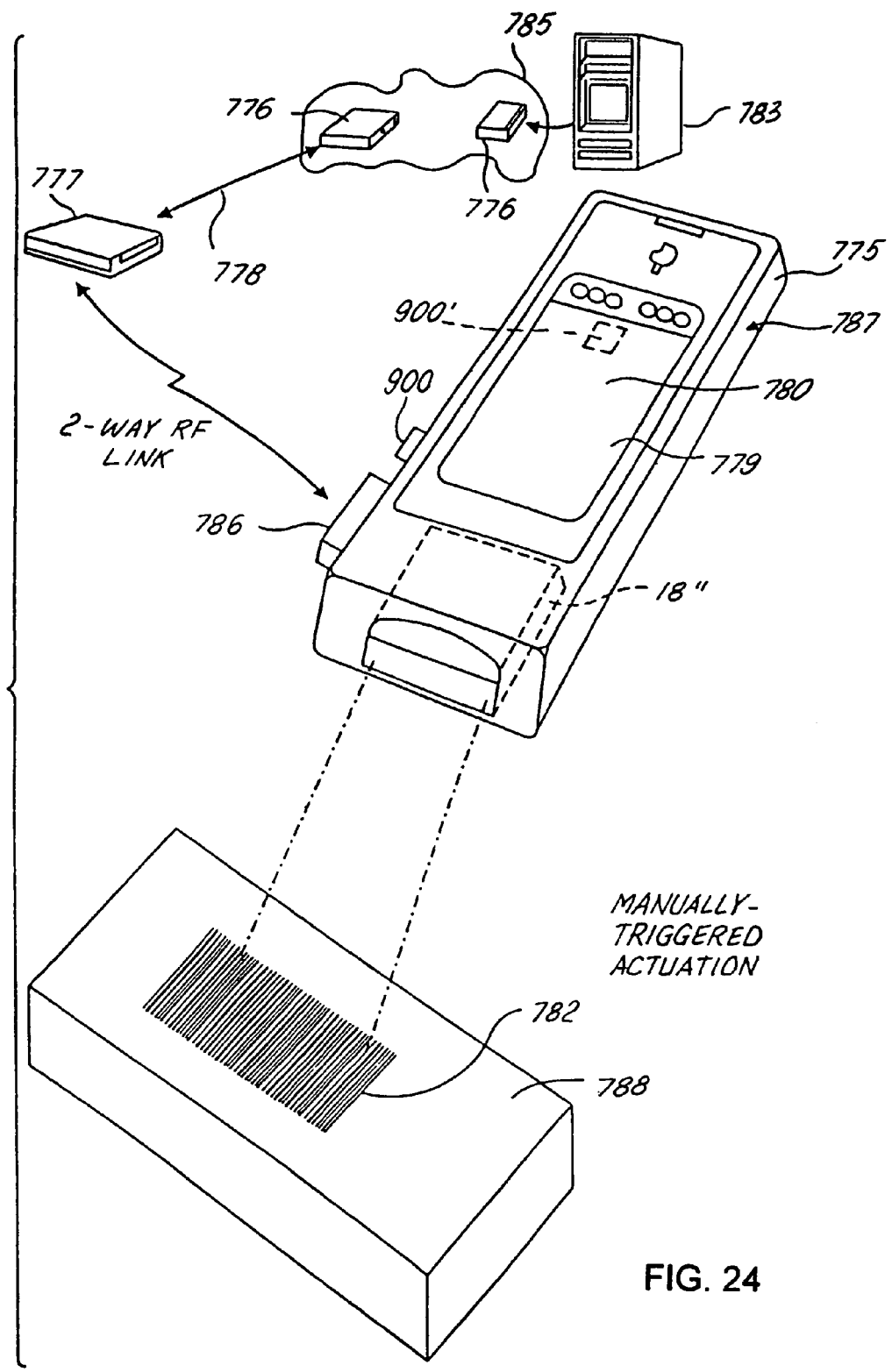
FIG. 24 is a perspective view of a eighth illustrative embodiment of the bar code symbol reading system of the present invention realized in the form of a manually-actuated portable Internet-based data transaction terminal for scanning 1-D and 2-D bar code symbols.
Figure 25:
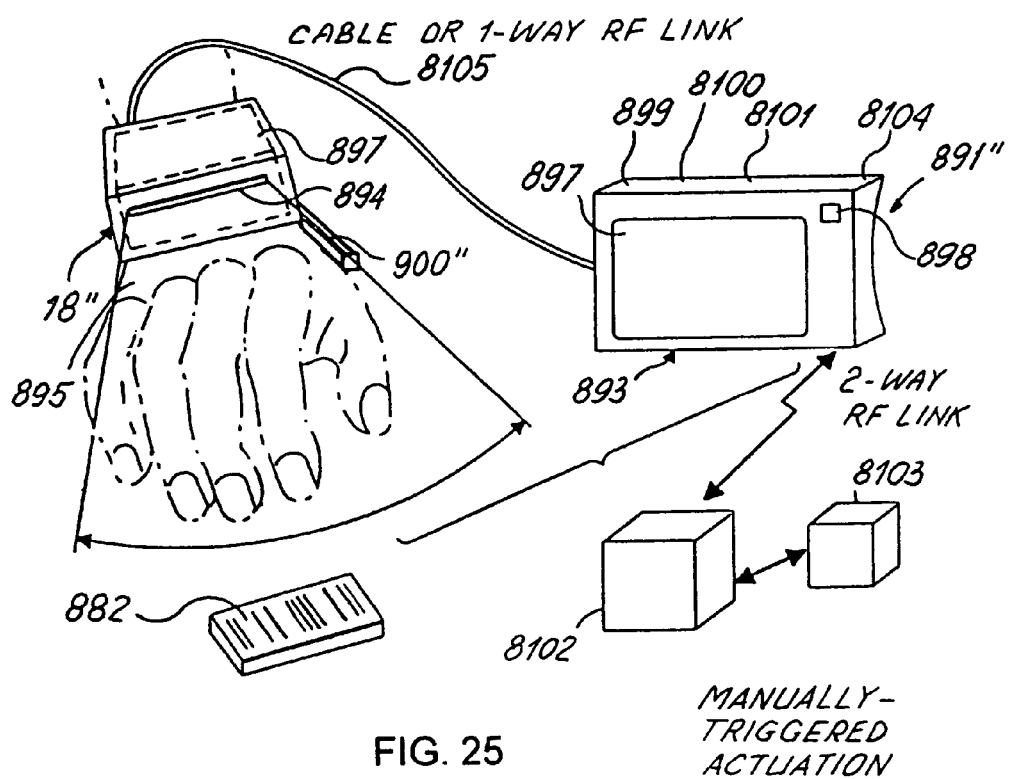
FIG. 25 is a perspective view of a perspective view of a ninth illustrative embodiment of the bar code symbol reading system of the present invention realized in the form of a manually-actuated body-wearable Internet-based data transaction terminal—for scanning 1-D and 2-D bar code symbols.

In FIGS. 23, 24 and 25, seventh, eighth and ninth illustrative embodiments of the bar code symbol reading system hereof are shown, wherein a manually-actuated trigger-switch is provided on the housing of each of these systems for manually activating the laser scanning mechanism thereof.

Each of these illustrative embodiments of the present invention will be described in great detail hereinafter so as to enable one with ordinary skill in the art to practice the same in diverse user environments.

Figures 2, 2A, 2B:
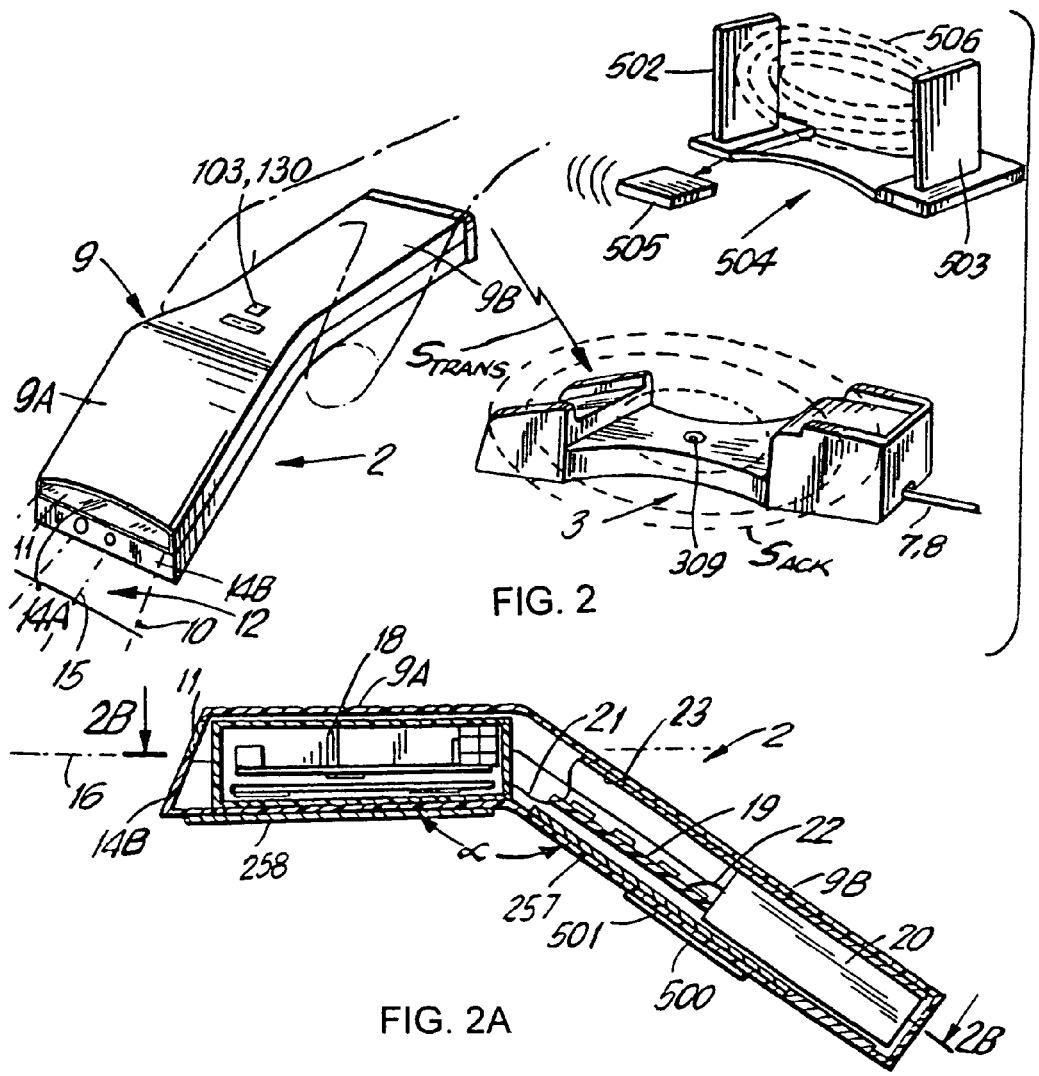
FIG. 2 is a perspective view of the first illustrative embodiment of the automatic hand supportable bar code symbol reading device of the present invention, shown being used in the automatic hands-on mode of operation.
FIG. 2A is an elevated, cross-sectional side view taken along the longitudinal extent of the automatic bar code symbol reading device of FIG. 2, showing the various components contained therein, including the automatic bar code symbol reading engine of the present invention.
FIG. 2B is a cross-sectional plan view taken along line 2B—2B of FIG. 2A, showing the various components contained therein.

As shown in FIGS. 1 to 3A2, the first illustrative embodiment of the bar code symbol reading system of the present invention is realized in the form of a fully-automatic bar code symbol reading system 1 comprising an automatic (i.e., triggerless) portable bar code (symbol) heading device 2 operably associated with a base unit 3 having a scanner support stand 4. As shown, bar code symbol reading device 2 is operably connected with its base unit 3 by way of a one way electromagnetic link 5 that is momentarily created between bar code symbol reading device 2 and its mated base unit 3 after the successful reading of each bar code symbol by the bar code symbol reading device. Operable interconnection between the base unit and a host system (e.g., electronic cash register system, data collection device, etc.) 6 is achieved by a flexible multiwire communications cable 7 extending from the base unit and plugged directly into the said data-input communications port of the host computer system 6. In the illustrative embodiment, electrical power from a low voltage direct current (DC) power supply (not shown) is provided to the base unit by way of a flexible power cable 8. Notably, this DC power supply can be realized in host computer system 6 or as a separate DC power supply adapter pluggable into a conventional 3-prong electrical socket. As will be described in greater detail hereinafter, a rechargeable battery power supply unit is contained with bar code symbol reading device 2 in order to energize the electrical and electro-optical components therewithin.

Figure 1C:
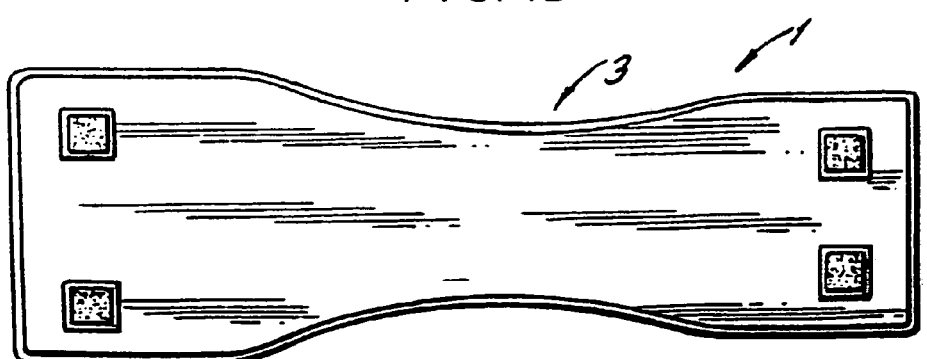
FIG. 1C is a bottom view of the automatic bar code symbol reading system shown in FIG. 1.

As illustrated in FIGS. 1 through 1C, scanner support stand 4 is particularly adapted for receiving and supporting portable bar code symbol reading device 2 in a selected position without user support, thus providing a stationary, automatic hands-free mode of operation. In general, portable bar code reading device 2 includes an ultra-light weight hand-supportable housing 9 having a contoured head portion 9A and a handle portion 9B. As will be described in greater detail hereinafter, head portion 9A encloses electro-optical components which are used to generate and project a visible laser beam 10 through a light transmissive window 11 in housing head portion 9A, and to repeatedly scan the projected laser beam across a scan field 12 defined external to the hand-supportable housing.

As illustrated in FIGS. 1 through 1C, the scanner support stand portion 3 includes a support frame which comprises a base portion 13A, a head portion support structure 13B, handle portion support structure 13C and a finger accommodating recess 13D. As shown, base portion 13A has a longitudinal extent and is adapted for selective positioning with respect to a support surface, e.g., countertop surface, counter wall surface, etc. Head portion support structure 13B is connected to base portion 13A, for receiving and supporting the head portion of bar code symbol reading device 2. Similarly, handle portion support structure 13C is connected to base portion 13A, for receiving and supporting the handle portion of the code symbol reading device. In order that the user's hand can completely grasp the handle portion of the hand-supportable bar code reading device, (i.e., prior to removing it off and away from the scanner support stand), finger accommodating recess 13D is disposed between head and handle portion support structures 13B and 13C and above base portion 13A of the support frame. In this way, finger accommodating recess 13D is laterally accessible so that when the head and handle portions 9A and 9B are received within and supported by head portion support structure and handle portion support structure, respectively, the fingers of a user's hand can be easily inserted through finger accommodating recess 13D and completely encircle the handle portion of the hand-supportable device.

As illustrated in FIGS. 2 through 2B in particular, head portion 9A continuously extends into contoured handle portion 9B at an obtuse angle $\alpha$ which, in the illustrative embodiment, is about 146 degrees. It is understood, however, that in other embodiments obtuse angle $\alpha$ may be in the range of about 135 to about 180 degrees. As this ergonomic housing design is sculptured (i.e., form-fitted) to the human hand, automatic hands-on scanning is rendered as easy and effortless as waving one's hand. Also, this ergonomic housing design eliminates the risks of musculoskeletal disorders, such as carpal tunnel syndrome, which can result from repeated biomechanical stress commonly associated with pointing prior art gun-shaped scanners at bar code symbols, squeezing a trigger to activate the laser scanning beam, and then releasing the trigger.

As illustrated in FIGS. 2 through 3A, the head portion of housing 9 has light transmission aperture 11 formed in upper portion of front panel 14A, to permit visible laser light to exit and enter the housing, as will be described in greater detail hereinafter. The lower portion of front panel 14B is optically opaque except at optical wavelengths over the infra-red (IR) region of the electromagnetic spectrums, as are all other surfaces of the hand supportable housing.

As best shown in FIGS. 2A and 2B, the automatic bar code symbol reading engine 18 of the present invention is securely mounted within the head portion of hand-supportable housing 9, while a printed circuit board 19 and a rechargeable battery supply unit 20 are mounted within the handle portion of the hand-supportable housing. As will be described in greater detail hereinafter, the data packet transmission circuit of the present invention is realized on PC board 19 and is operably connected to bar code symbol reading engine 18 by way of a first flexible wire harness 21, while electrical power is supplied from rechargeable battery 20 to the data packet transmission circuit and the bar code symbol reading engine by way of a second flexible wire harness 22. As shown, a transmitting antenna 23 is operably connected to the data packet transmission circuit on PC board 19 and is mounted within hand-supportable housing 9 for transmission of a data packet modulated RF carrier signal. The structure and the functionalities of the automatic bar code symbol reading engine 18 will be described in greater detail hereinafter with reference to FIGS. 5 to 14.

When using any of the bar code symbol reading devices of the present invention in commercial environments, such as retail stores, the wireless nature of the bar code symbol reader/base unit interface permits the operator thereof to accidentally or deliberately walk off with the bar code symbol reading device. This could have serious financial consequences preventing commercially successful utilization of the system in such operating environments. In the illustrative embodiments hereof, this problem is solved by providing each bar code symbol reader with an electrically-passive tuned resonant circuit 500 (i.e., target), realized on an ultra-thin adhesive label 501 affixed to either the exterior or interior of the hand supportable housing, is shown in FIG. 2A. The tuned resonant circuit 500 is identical to those used on products such is library books, compact discs, and other valuable goods sold in retail outlets. When the bar code symbol reader is moved through the exit door of the store, the tuned resonant circuit 500 absorbs energy from the magnetic field produced by magnetic field generation panels 502 and 503 installed of an electronic article surveillance system 504 installed at the store exit. When a bar code symbol reader bearing tuned resonant circuit 500 is moved through the magnetic interrogation field produced by panels 502 and 503, the tuned resonant circuit absorbs power from the magnetic field and the corresponding current fluctuation is detected by current sensing circuitry which triggers an audible alarm 505, notifying store management that the bar code symbol reader has been removed from the store without authorization. Various types of targets, interrogation field panels and electronic current sensing circuitry may be used to practice this aspect of the present invention. Suitable anti-theft detection (or electronic article surveillance) systems for practicing this aspect of the present invention can be found in U.S. Pat. No. 4,870,391 to Cooper; U.S. Pat. No. 4,751,500 to Minasy, et al.; and U.S. Pat. No. 4,684,930 to Minasy, et al., which are hereby incorporated by reference in their entirety. This method provides an inexpensive way of securing bar code symbol scanning devices using an electrically-passive element mounted on portable scanners within the system (or network), and thus is much less expensive and much simpler than providing a signal receiver within the bar code symbol scanner itself, or using an electrically-active security tag on the portable scanner.

Having described the first illustrative embodiment of the bar code symbol reading system hereof, it is appropriate at this juncture to describe in greater detail the laser scan and object detection fields thereof automatically generated from bar code symbol reading engine 18.

As illustrated in FIG. 2 in particular, the automatic bar code symbol reading device of FIG. 1 generates from its bar code symbol reading engine, two different types of fields external to its hand-supportable housing. As explained below, these fields function to carry out a novel bar code symbol reading process according to the principles of the present invention. The first field, referred to as the "object detection field", indicated in FIG. 2 by broken and dotted lines 15, is provided external to the housing for detecting energy reflected off an object (bearing a bar code symbol) located in the object detection field. The second field, referred to as the "scan field", has at least one laser beam scanning plane 10, as shown in FIG. 2, and is provided external to the housing for scanning a bar code symbol on the object in the object detection field. In the preferred embodiment, bar code symbol scanning is achieved using a visible laser beam which, after reflecting off the bar code symbol in the scan field, produces laser scan data that is collected for the purpose of automatically detecting the bar code symbol and subsequently reading (i.e., scanning and decoding) the same.

In general, detected energy reflected from an object during object detection can be optical radiation or acoustical energy, either sensible or non-sensible by the user, and may be generated either from the automatic bar code reading device or an external ambient source. However, as will be described in greater detail hereinafter, the provision of such energy is preferably achieved by transmitting a wide beam of pulsed infrared (IR) light away from transmission aperture 11, in a direction substantially parallel to longitudinal axis 16 of the hand-supportable housing. In the preferred embodiment, the object detection field, from which such reflected energy is collected, is designed to have a narrowly diverging pencil-like geometry of three-dimensional volumetric expanse, which is spatially coincident with at least a portion of the transmitted infrared light beam. This feature of the present invention ensures that an object residing within the object detection field will be illuminated by the infrared light beam, and that infrared light reflected therefrom will be directed generally towards the transmission aperture of the housing where it can be automatically detected to indicate the presence of the object within the object detection field. In response, a visible laser beam is automatically generated within the interior of the bar code symbol reading engine, projected through the light transmission aperture of the housing and repeatedly scanned across the scan field, within which at least a portion of the detected object lies. At least a portion of the scanned laser light beam will be scattered and reflected off the object and directed back towards and through light transmissive window 11 for collection and detection within the interior of the bar code symbol reading engine, and subsequently processed in a manner which will be described in detail hereinafter.

To ensure that the user can quickly align the visible laser beam with the bar code symbol on the detected object, the object detection field is designed to spatially encompass at least a portion of the scan field along the operative scanning range of the device, as illustrated in FIGS. 3 and 3A, for the first illustrative embodiment of the present invention. This structural feature of the present invention provides the user with an increased degree of control, as once an object is detected, minimal time will be required by the user to point the visible laser beam towards the bar code symbol for scanning. In effect, the laser beam pointing efficiency of the device is markedly improved during the automatic bar code reading process, as it is significantly easier for the user to align the laser beam across the bar code symbol upon object detection.

Figure 4A:
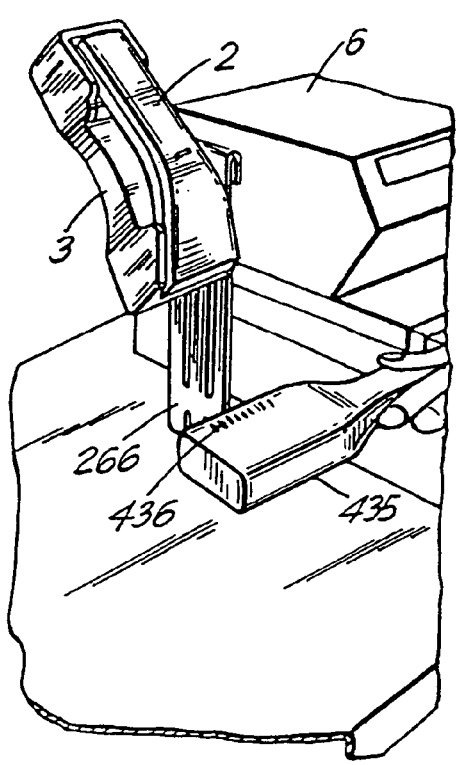
FIG. 4A is a perspective view of the hand-supportable bar code symbol reader of the present invention of FIG. 1 shown being used to read a 2-D PDF-formatted bar code symbol in its hands-free (i.e., stand-supported) mode of operation.
Figure 4B:
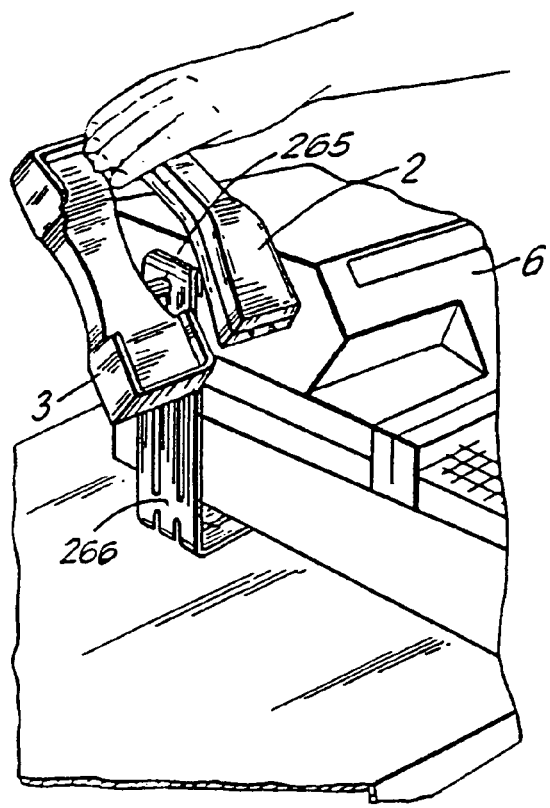
FIG. 4B is a perspective view of the hand-supportable bar code symbol reader of the present invention of FIG. 1, showing the automatic hand-supportable bar code symbol reading device being removed from its counter-top base unit.

Hands-Off Mode of Operation with High-Speed and Low-Resolution Raster Scanning Pattern In FIG. 4A, the automatic bar code symbol reading device of the first illustrative embodiment is shown being operated in its hands-off mode of operation. While the bar code symbol reader 2 is supported within its support stand 3, magnetic element 255 (or 256) within the support stand 3 is automatically detected by a Hall-effect or like sensor 115 mounted in the bar code symbol reader 2, and automatically causing the bar code symbol reading engine 18 therein to enter its high-speed/low-resolution raster scanning mode. When operated in its high-speed/low-resolution mode, the bar code symbol reading engine 18 automatically generates a high-speed/low-resolution laser scanning pattern as generally shown in FIG. 4A1.

As indicated in FIG. 4A1, the high-speed/low-resolution raster-type laser scanning pattern of the illustrative embodiment is characterized by: (i) a scanline speed of about 500 scanlines/second along the +x-axis direction of the raster scanning pattern and about 500 scanlines/second along the −x-axis direction of the raster scanning pattern; (ii) a beam sweep of about minimally 60 degrees along the x-axis direction; (iii) a beam sweep of about minimally +/−10 degrees along the +/− y-axis direction of the raster scanning pattern; and (iv) a resolution of about 12 scanlines along the +y-axis direction of the raster pattern and about 12 scanlines along the −y-axis direction of the raster scanning pattern.

Figure 8:
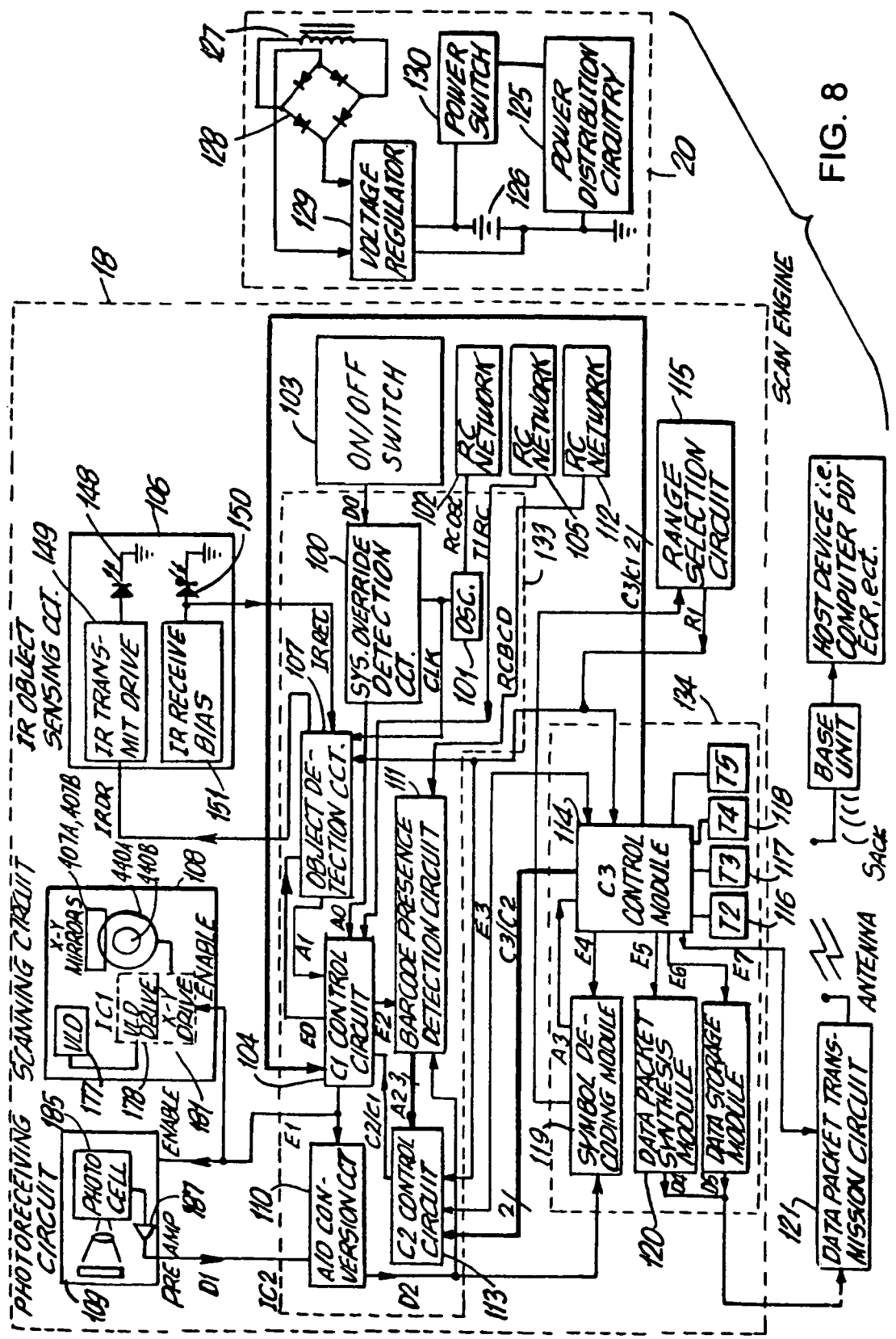
FIG. 8 is a system block functional diagram of the automatic bar code symbol reading system of the present invention, illustrating the principal components integrated with the control (sub)system thereof.
Figure 8A:
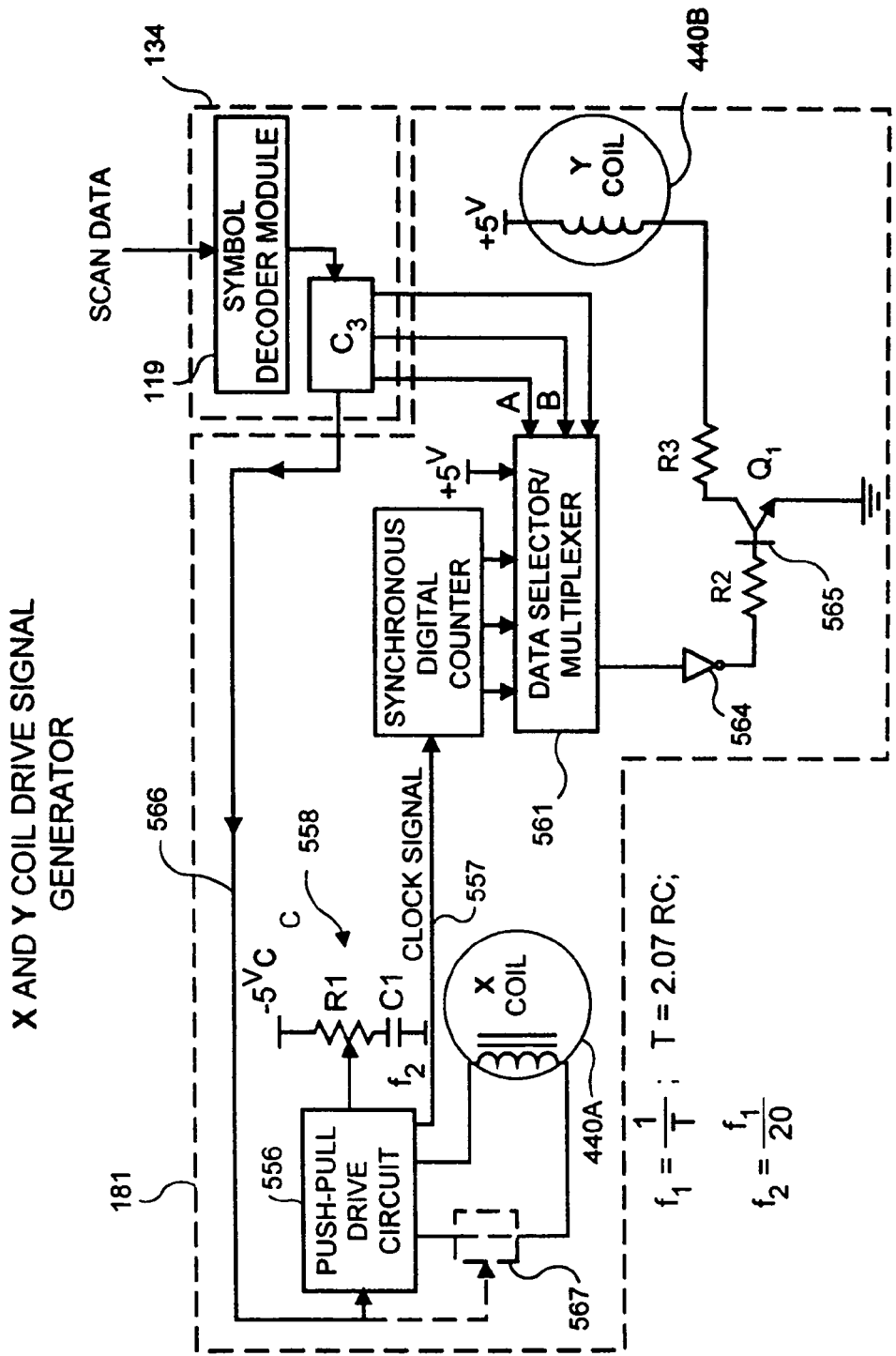
FIG. 8A is a schematic diagram of a first type of circuitry for producing synchronized drive signals for the raster-type laser scanning mechanism shown in FIG. 5A.

When the bar code symbol reading engine 18 employs the "synchronous" type scanning element drive circuit shown in FIGS. 8A–8B5, a high-speed/low-resolution raster scanning pattern is repeatedly generated from bar code symbol reading device 2 with minimal movement of the raster scanline pattern relative to the scanner housing, during scanning operations. When the bar code symbol reading engine 18 employs the "asynchronous" type scanning element drive circuit shown in FIGS. 8CA–8D3, a high-speed/low-resolution raster scanning pattern is repeatedly generated from bar code symbol reading device 2 with a slight degree of float or movement of the raster scanline pattern relative to the scanner housing, during scanning operations. In either case, the high-speed/low-resolution mode of operation is ideally suited for reading 2-D bar code symbols printed on sheets of paper or like print media.

Figure 4C:
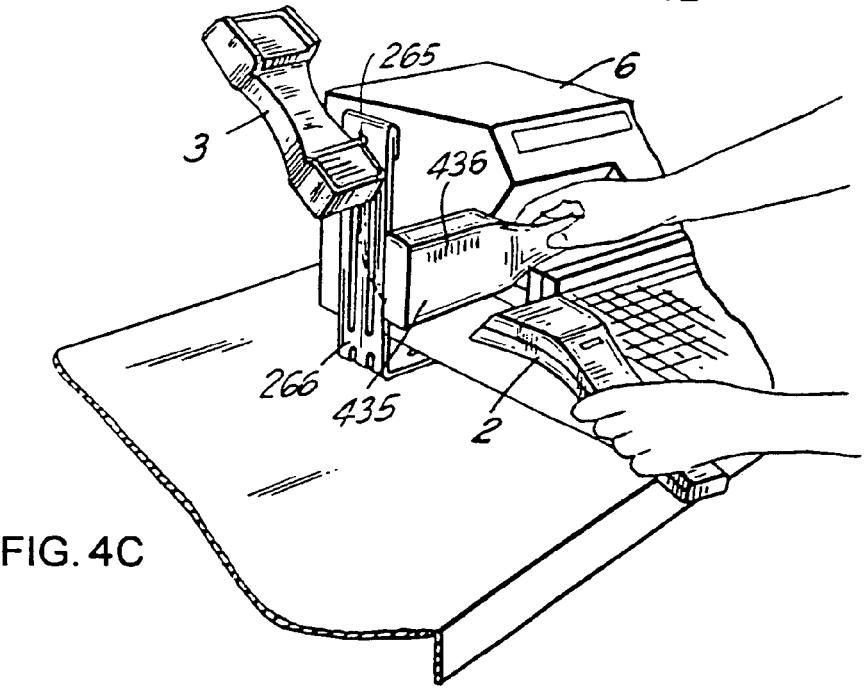
FIG. 4C is a perspective view of the hand-supportable bar code symbol reader of the present invention of FIG. 1 shown being used to read a 2-D PDF-formatted bar code symbol in its hands-on mode of operation.

Hands-On Mode of Operation with High-Speed/High-Resolution Raster Scanning Pattern In FIGS. 4C, the automatic bar code symbol reading device of the first illustrative embodiment is shown being operated in its hands-on mode of operation. As the bar code symbol reader 2 is picked up out of its support stand 3, magnetic element 255 (or 256) mounted within the support stand 3 is automatically detected as being absent by a Hall-effect or like sensor 115 mounted in the bar code symbol reader 2, automatically causing the bar code symbol reading engine 18 therein to enter its high-speed/high-resolution raster scanning mode. When operated in its high-speed/high-resolution mode, the bar code symbol reading engine 18 automatically generates a high-speed/high-resolution laser scanning pattern as generally shown in FIG. 4C1.

As indicated in FIG. 4C1, the high-speed/high-resolution laser scanning pattern of the illustrative embodiment is characterized by (i) a scanline speed of about 500 scanlines/second along the +x-axis direction of the raster scanning pattern and about 500 scanlines/second along the −x-axis direction of the raster scanning pattern, (ii) a beam sweep of about minimally 60 degrees along the x-axis direction, (iii) a beam sweep of about minimally +/−10 degrees along the +/− y-axis direction of the raster scanning pattern, and (iv) a resolution of about 100 scanlines along the +y-axis direction of the raster pattern and about 100 scanlines along the −y-axis direction of the raster scanning pattern.

When operated in its high-speed/high-resolution mode, the bar code symbol reading engine 18 automatically generates a high-speed/high-resolution laser scanning pattern as generally shown in FIG. 4C1. As indicated in FIG. 4C1, the high-speed/low-resolution laser scanning pattern of the illustrative embodiment is characterized by (i) a scanline speed of about 500 scanlines/second along the +x-axis direction of the raster scanning pattern and about 500 scanlines/second along the −x-axis direction of the raster scanning pattern, (ii) a beam sweep of about minimally 60 degrees along the x-axis direction, (iii) a beam sweep of about minimally +/− 10 degrees along the y-axis direction of the raster scanning pattern, and (iv) a resolution of about 100 scanlines along the +y-axis direction of the raster pattern and about 100 scanlines along the −y-axis direction of the raster scanning pattern.

When the bar code symbol reading engine 18 employs the "synchronous" type scanning element drive circuit shown in FIGS. 8A–8B5, a high-speed/high-resolution raster scanning pattern is repeatedly generated from bar code symbol reading device 2 with minimal movement of the raster scanline pattern relative to the scanner housing, during scanning operations. When the bar code symbol reading engine 18 employs the "asynchronous" type scanning element drive circuit shown in FIGS. 8CA–8D3, a high-speed/high-resolution raster scanning pattern is repeatedly generated from bar code symbol reading device 2 with a slight degree of float or movement of the raster scanline pattern relative to the scanner housing, during scanning operations, rendering it easier to read 2-D bar code symbols in the hands-on mode of operation.

Laser Beam Scanning Engzine of the Present Invention

Figures 5A, 5B, 5C, 5D:
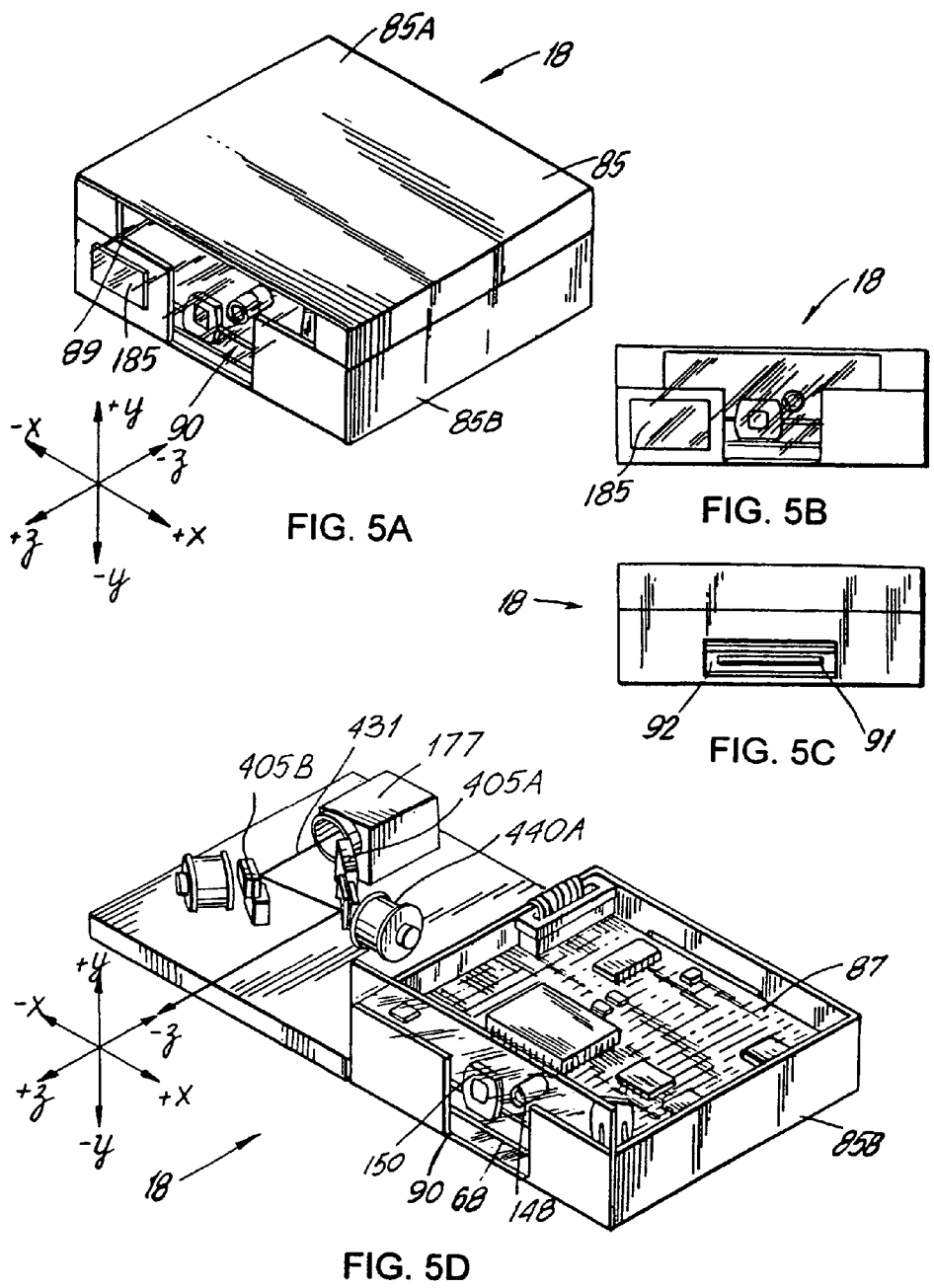
FIG. 5A is a perspective view of the automatic laser-based bar code symbol reading engine of the present invention, showing its miniature "match-box" size housing.
FIG. 5B is an elevated front view of the automatic bar code symbol reading engine of the present invention, showing the geometrical characteristics of its light transmission window.
FIG. 5C is an elevated rear view of the automatic bar code symbol reading engine of the present invention, showing its input/output signal port.
FIG. 5D is a perspective view of the automatic bar code symbol reading engine of the present invention, shown within the upper portion of the miniature match-box size housing removed from the lower housing portion thereof.

As shown in FIGS. 5A to 5E, the automatic bar code symbol reading engine 18 according to a first illustrative embodiment of the present invention contains a number of electronic, electro-optical and optical components arranged in a strategic manner within a miniature housing 85. In the illustrative embodiment, the miniature housing has smaller than matchbook size dimensions (e.g., a width along light transmission window of 1.8", a depth of 1.6", and a height of 0.6") and an interior volume of about 1.7 cubic inches. As shown, housing 85 has an upper portion 85A and a lower portion 85B. The underside 86 of the upper housing portion 85A functions as an optical bench (i.e., platform) upon which the majority of optical and electro-optical components of the engine are mounted. The lower housing portion 85B supports two PC boards 87 and 88 on which the circuits of FIG. 8 are realized using surface-mount componentry and like technology known in the art. In order to permit the laser beam produced within housing 85 to exit the housing and to allow reflected laser light enter the same for detection, a first light transmission aperture 89 is provided in the front side panel of the upper housing portion 85A. In order to permit IR light to exit and enter the housing, a second light transmission aperture 90 is formed in the front side panel of the lower housing portion 85B, as shown. To permit flexible wire harness 21, 28 or 47 (between the bar code symbol reading engine and the data packet transmission circuit on the PC board) to interconnect with the circuitry on PC board 88 by way of a conventional connector 91, an input/output aperture 92 is formed in the rear side panel of the lower housing portion 60B, as shown. With PC boards 87 and 88 installed within the interior 93 of the lower housing portion, as shown in FIG. 5A, the upper housing is snap-fitted with the lower housing portion 85B by way of tabs 94 that engage against the interior surfaces of the side panels of the lower housing portion 85B. Additional details regarding the optical layout and construction details of the preferred embodiment of bar code reading engine 18, will be described hereinafter.

As shown in FIG. 5D, a pair of miniature laser beam scanning modules 40A and 40B, to be described in detail below, and visible laser diode (VLD) 177 are configured onto optical bench 86 in order to form an ultra-compact laser beam scanning device capable of selectively producing a 1-D or 2-D (raster-type) laser scanning pattern under the control of electronic circuitry 181. As shown in FIG. 5D, the optical bench 86 allows the modules 440A and 440B to be mounted relative to each other so that the scanning aperture of the first module is orientable along the x-axis of the scanning field, while the scanning aperture of second module is orientable along the y-axis thereof. In some applications, it might be desired to provide the optical bench with beam folding mirrors in order to fold the produced scanning beam in a particular manner. In the illustrative embodiment, the x-axis direction scanning element undergoes a maximum angular excursion of about +/−30 degrees about its non-deflected position, whereas the maximum angular excursion for the y-direction scanning element is about +/−10 degrees about the non-deflected position thereof.

Figure 6:
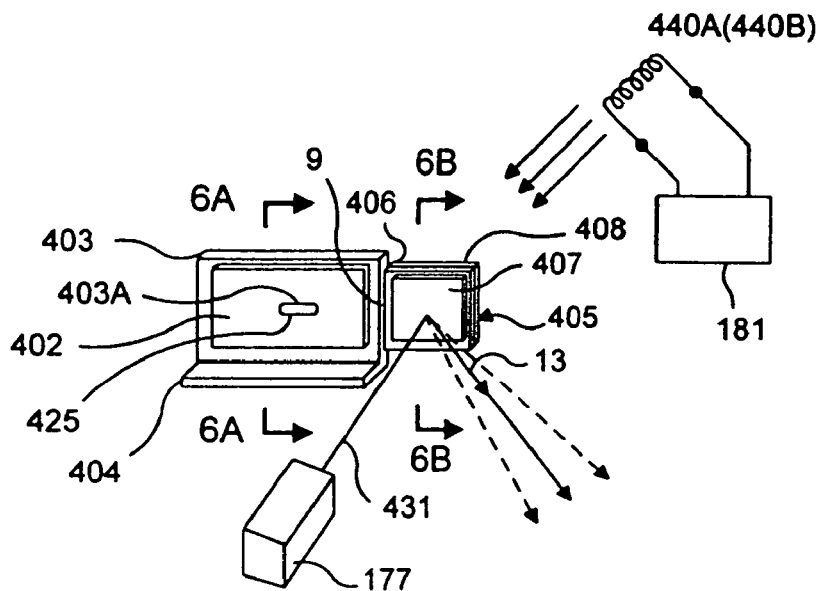
FIG. 6 is a schematic diagram of the laser beam scanning mechanism used to realize the bar code symbol reader of the present invention, showing the anchored base portion thereof mounted on a support structure of an optical bench and the laser beam deflecting portion, extending from the base portion, bearing a light beam deflecting element on its front surface and a magnetic element on its rear surface for interaction with an externally generated magnetic force field produced by a miniature electromagnet driven by an electrical pulse train having a frequency which is controlled by an electronic coil-drive signal generation circuit.

As shown in greater detail in FIG. 6, each laser beam scanning mechanism 405A and 405B has a base portion 402 mounted (i.e., anchored) on a support structure 403 of an optical bench 404, and a laser beam deflecting portion 405 extending from the base portion, with a flexible gap portion 406 disposed therebetween. As shown, the laser beam deflecting portion 405 ears a light deflecting element 407A (407B) on its front surface and a thin permanent magnet element 8 mounted on its rear surface. Each light deflecting element 407A (407B) can be realized in a number of different ways, namely: as a light reflective element such as a mirror; as a light diffractive element such as a reflection or transmission hologram (i.e., HOE); as a light refractive element such as a lens element; or as any other type of optical element capable of deflecting a laser beam along an optical path as the laser beam deflecting portion 405 is oscillated about a fixed pivot point 409 defined at the interface between the anchored base portion and flexible gap portion of the scanning element. Light deflecting element 407 and magnetic element 408 can be mounted to the scanning element using an adhesive, or other fastening technique (e.g., soldering) well known in the art. In the illustrative embodiments disclosed herein, the laser beam deflecting portion 405 of the x-axis scanning module is oscillated about its fixed pivot point by producing a reversible magnetic force field 410 (e.g., of about 260 Gauss) against the permanent magnet 408 (e.g., $^{20}/_{1000}$th thick) mounted on the rear surface of the laser beam deflecting portion.

In the illustrative embodiment, the positive polarity of the permanent magnetic field is directed away from the light deflecting element on the laser beam deflecting portion 405. The interaction of magnetic fields of opposite polarity produced by the permanent ferrite-type magnet 408 and a stationary magnetic field producing electromagnet 411 causes the laser beam deflecting portion 405 to oscillate about its fixed pivot point 409 at both its natural resonant frequency of oscillation, its harmonic modes of oscillation, as well as at the driving or forcing frequency at which the polarity of the magnetic force field (produced by electromagnet 411) reverses in response to amplitude variations in the electrical pulse train (driving the electromagnetic coil) which occur at a frequency controlled by an electronic signal generation circuit 412. In the illustrative embodiment, the angular excursion of the laser beam along the x-z scanning plane (defined in FIGS. 5A and 5D) is about +/−30 degrees away from its non-deflected position, whereas the angular excursion of the laser beam along the y-z scanning plane is about +/−10 degrees away from its non-deflected position. The function of the light deflecting element 405 is to deflect a focused light beam 413 (produced by source 14) along a scanning path in response to oscillation of the light beam deflecting portion 405 about the fixed pivot point 9, defined above.

Figures 6A, 6B:
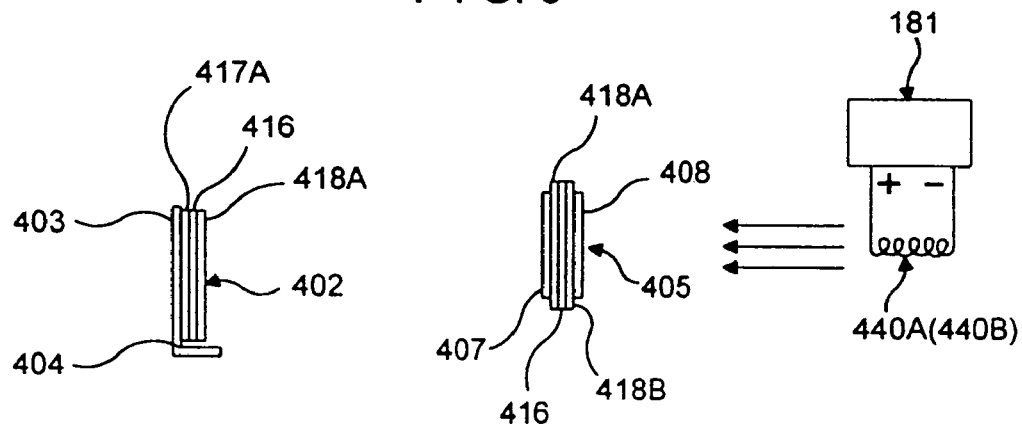
FIG. 6A is a cross-sectional view of the laser beam scanning mechanism of FIG. 6, taken along line 6A—6A thereof.
FIG. 6B is a cross-sectional view of the resonant scanning mechanism of FIG. 6, taken along line 6B—6B thereof.
Figure 6C:
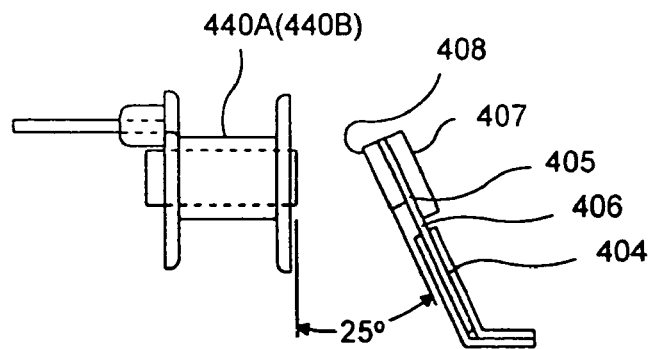
FIG. 6C is a schematic diagram showing the angular tilt of the coil of the electromagnet shown in FIG. 6, in relation to the axis of symmetry of the coil.

As shown in FIGS. 6 through 6B, each scanning element in the raster scanning mechanism hereof has a laminated construction, wherein: the anchored base portion 402 and the laser beam portion 405, each consist of a thin layer of Kapton™ polyamide 416 sandwiched between a pair of thin layers of cooper 417A and 417B, and 418A and 418B, respectively; and the flexible gap portion 406 consisting of the thin layer of Kapton™ (polyamide) plastic material 18 and a thick layer of mechanically-damping film material, such as screenable silicone rubber (General Electric SLA 7401S-D1), having a suitable duromater measure, e.g., Shore A40. Notably, the thin layer of polyamide in the anchored base portion 402, the flexible gap portion 405 and the laser beam deflecting portion 406 is realized as a single unitary layer having a uniform thickness across these individual portions of the scanning element. The copper layers on opposite sides of the anchored base portion, the flexible gap portion and the laser beam deflecting portion of the scanning element are discrete elements of uniform thickness realized by precisely-controlled chemical-etching of the copper and polyamide layers during particular stages of the scanning element fabrication process described below.

As shown in greater detail in FIG. 6, the x and y axis laser beam scanning mechanisms in bar code reading engine 18 are each realized on optical bench 86 having planar dimensions. Magnetic-field producing coil (i.e., electromagnetic coil) 440A (440B) is supported upon a first projection (e.g., bracket) 427 which extends from the optical bench. The scanning element of the present invention described above is mounted upon a second projection 428 which extends from the optical bench. The permanent magnet 408 is placed in close proximity with the magnetic-field producing coil 440A (440B), as shown in FIGS. 5D, 6 and 6B. Visible laser diode (VLD) 177 produces an output laser beam 431 which is directed towards laser beam deflecting portion 405 onto the y-axis scanning element 405A and reflects onto the x-axis scanning element 405B, and thus along the projection axis of the scanning module. The y-axis scanning element 405A is forced into oscillatory motion by driving the electromagnetic coil 440A with a voltage signal having a frequency substantially off the resonant frequency of the y-axis scanning element (e.g. by at least 10%). Similarly, the y-axis scanning element 405B is forced into oscillatory motion by driving the electromagnetic coil 440B with a voltage signal also having a frequency substantially off the resonant frequency of the x-axis scanning element (e.g. by at least 10%).

In the illustrative embodiments disclosed herein, the x-axis electromagnetic coil 440B is driven in a push-pull mode, wherein the magnetic polarity reverses periodically at a rate determined by the amplitude variation of the voltage signal applied across the terminals of the electromagnetic coil 440B. A suitable voltage waveform for driving the x-axis electromagnetic coil 440B in the laser beam scanning mechanism is shown in FIG. 8B2. As shown in FIG. 8A, an electronic circuit 56 for producing this drive signal can be realized by a conventional push-pull current drive integrated circuit (IC) chip (556 in FIG. 8A) connected to magnetic-field producing coil 440A in an electrically-floating manner (i.e., not connected to electrical ground). As shown, a resistor-capacitor (RC) network 558 is connected to the push-pull current drive IC 56 in order to set the scan speed (e.g., 500 sweeps or lines per second). In the illustrative embodiments, the scan speed of the x-axis laser scanning module can be adjusted between about 50 to 700 lines/second by setting the RC time constant using an external resistor $R_1$ and capacitor $C_1$, although it is understood, that in other embodiments, the scan speed can be extended above and below this range as required by the particular application at hand.

Figure 5E:
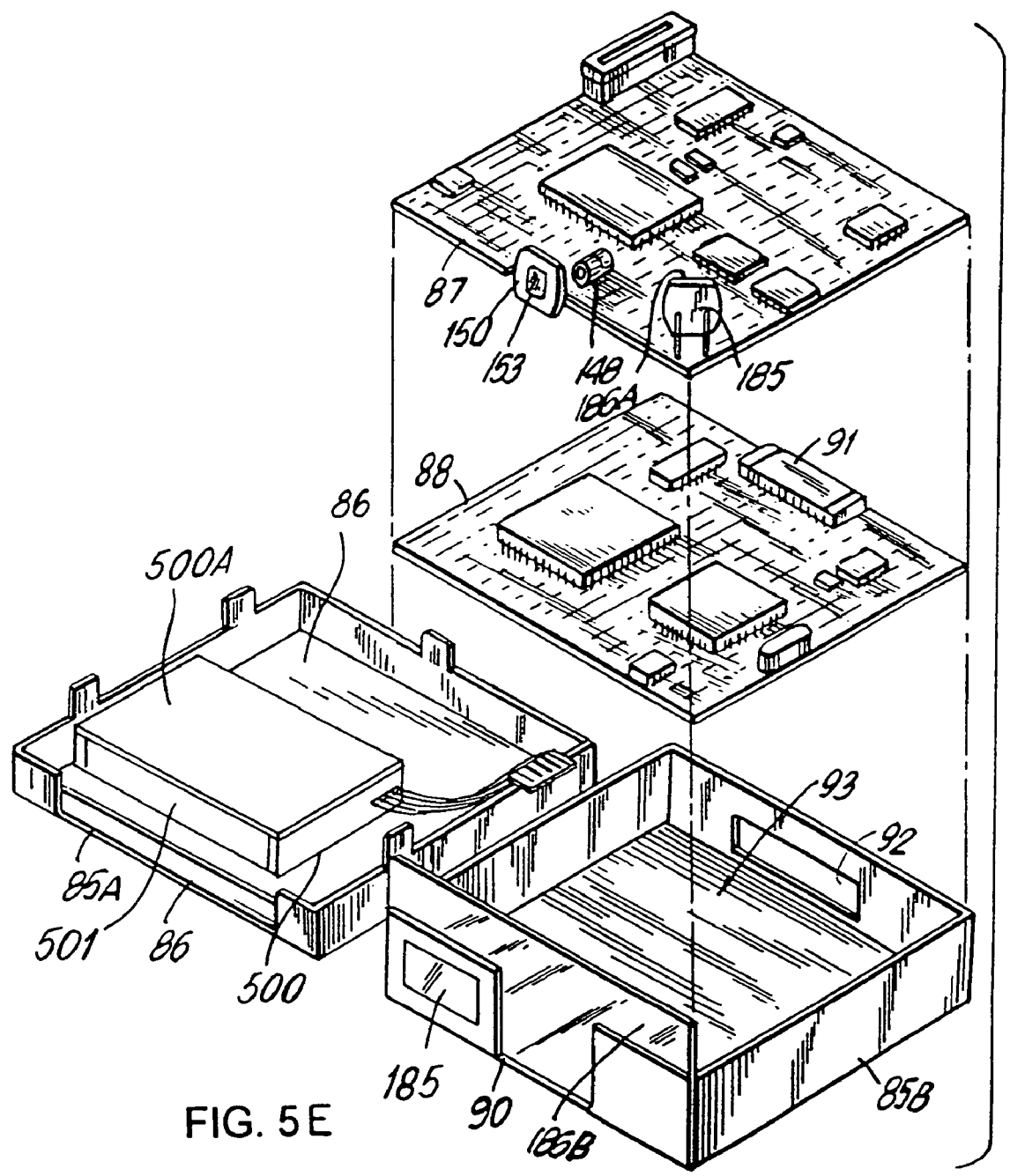
FIG. 5E is a perspective exploded view of the automatic bar code symbol reading engine of the present invention, showing the spatial relationships among the printed circuit boards, the upper and lower housing portions, and the laser beam scanning optics thereof.

In FIG. 5E, a second illustrative embodiment of raster-type laser scanning mechanism described above is shown realized within an ultra-compact plastic housing 500, wherein electromagnetic coil 440A and 440B, and the laser beam scanning mechanism of FIGS. 5D, 6, 6A and 6B are mounted with holographic beam modifying optics of the kind disclosed in Applicants' copending application Ser. No. 09/071,512 entitled "DOE-Based Systems And Devices For Producing Laser Beams Having Modified Beam Characteristics", filed May 1, 1998, and incorporated herein by reference. In all other respects, the bar code reading engine of FIG. 5E is the same as that shown in FIG. 5A. As shown, plastic housing 500 comprises a top plate 500A, side walls extending from the base plate, and a surface for mounting the anchorable base portions of the scanning elements 405A and 405B thereto. Housing 500 also is provided with recesses in its side wall, within which the magnetic-field producing coils 440A and 440B can be mounted in a press-fit manner. When assembled, the scanning elements 405A and 405B extend towards the central axes of the magnetic-field producing coils 440A and 440B, respectively, so that the permanent magnet 408A and 408B are closely positioned adjacent to one end of the respective coils, while the other ends thereof, mounted on a support post in recess, are mounted thereto. The terminals of the magnetic-field producing coils can be passed through small holes drilled in side walls. Top plate 500A snaps onto the top surface of the side walls of the housing, while the two pairs of posts straddle the flexible gap portion 406A (406B) of the x and y axis scanning elements and function to delimit the maximum angular swing thereof if and when the raster scanning mechanism is subjected to excessive external forces as might be experienced when the unit is dropped to the ground. In such an assembled configuration, the laser beam scanning module has a scanning aperture 501, through which the laser beam can be swept along either a 1-D or 2-D (raster) scanning pattern. Preferably, all of the components of the housing described above are fabricated using injection molding technology well known in the art.

Figure 5F:
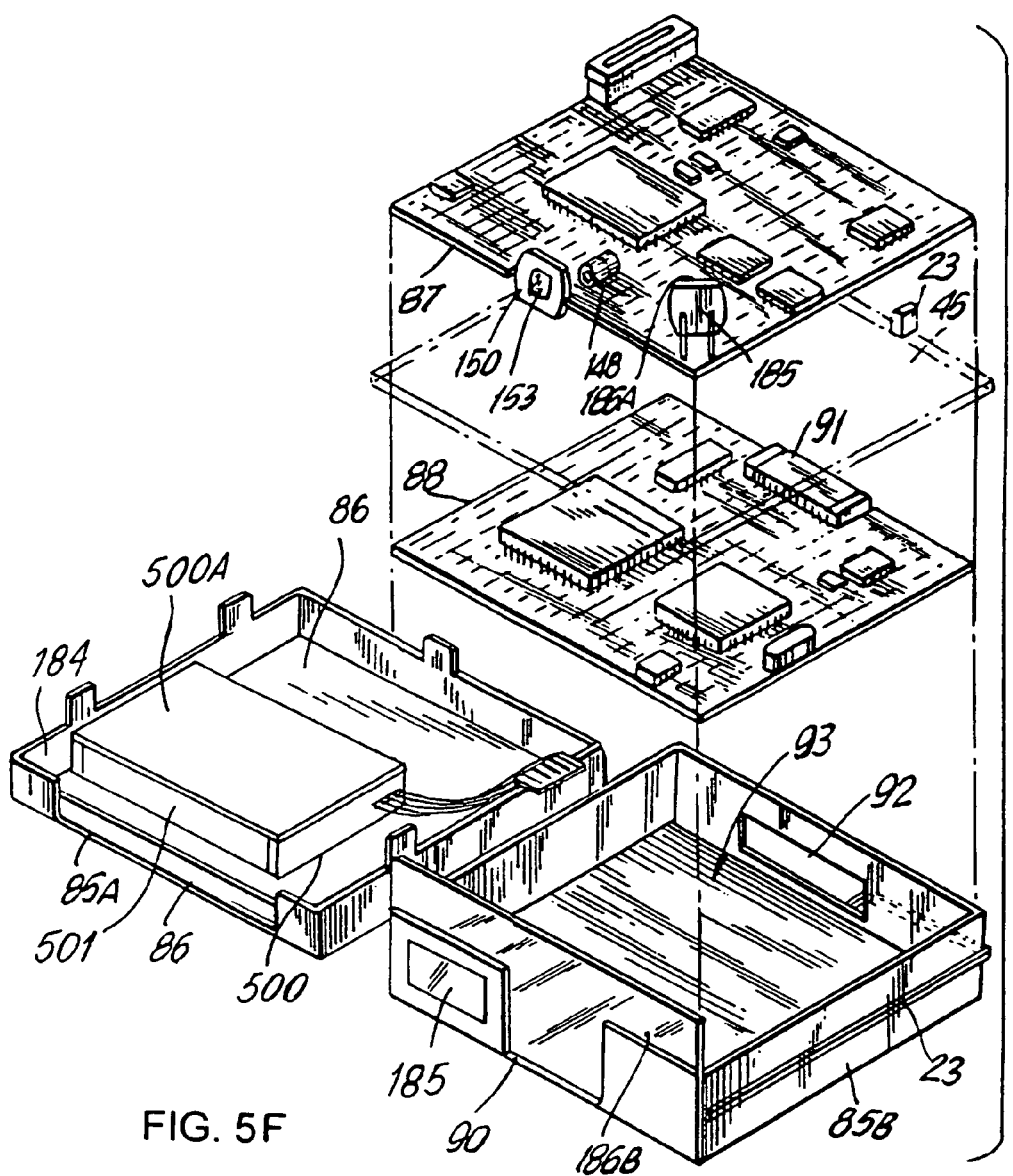
FIG. 5F is a perspective exploded view of an alternative embodiment of the automatic bar code symbol reading engine of the present invention, showing the spatial relationships among the printed circuit boards, including the printed board supporting the data packet transmission circuit of the present invention.

As illustrated in FIG. 5F, a third embodiment of the bar code symbol reading engine 18 is shown to further include PC board 45 mounted between PC boards 87 and 88, contained within match-box size housing 60. With data transmission circuit 121 realized on PC board 45, all that s required to operate automatic bar code symbol reading engine 18 is a supply of low voltage D.C. power, which can be provided by attaching a subminiature battery pack onto the end portion, bottom portion, top portion, or side portion of the housing 60. The transmitting antenna 23, connected to PC board 45, is mounted onto the exterior of housing 60 and the produced output from this embodiment of the bar code symbol reading engine is a RF carrier signal modulated by a serial data stream representative of the data packet group produced by the data packet transmission circuit in response to the successful reading of a bar code symbol. In alternative embodiments of the present invention, the battery pack may be physically incorporated within the interior of the housing modified in dimensions to accommodate the dimensions of the battery supply, and battery power recharging circuitry used in recharging the same.

Figure 7:
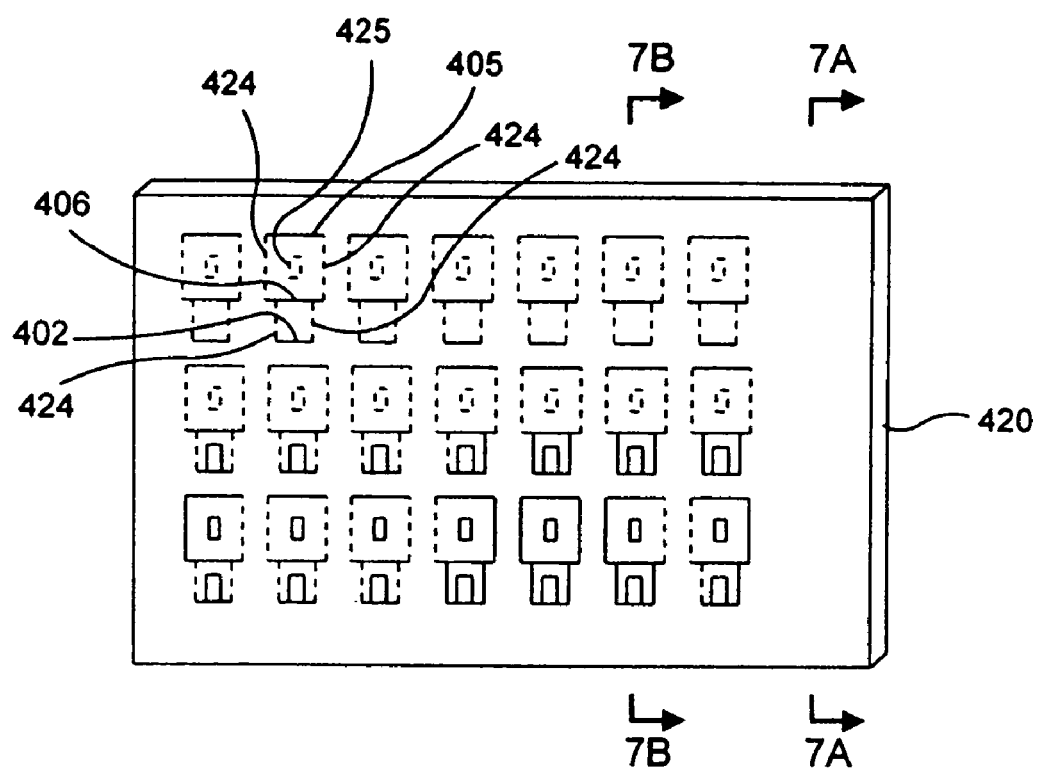
FIG. 7 is a perspective view of a chemically-etched sheet of double-sided copper-clad base material used to mass-manufacture the scanning element of the scanning mechanism of FIG. 6.
Figure 7A:
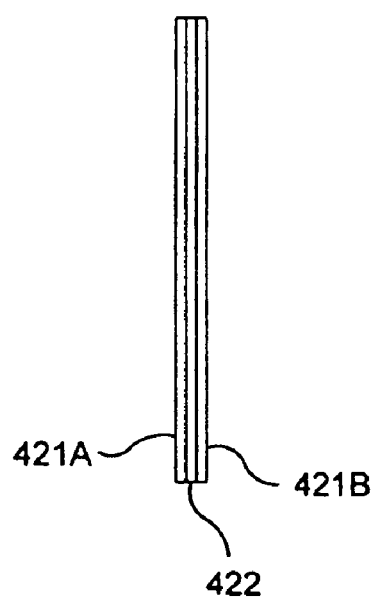
FIG. 7A is a cross-sectional view taken along line 7A—7A of FIG. 7 showing a portion of the double-sided copper-clad base material that has not been chemically etched.
Figure 7B:
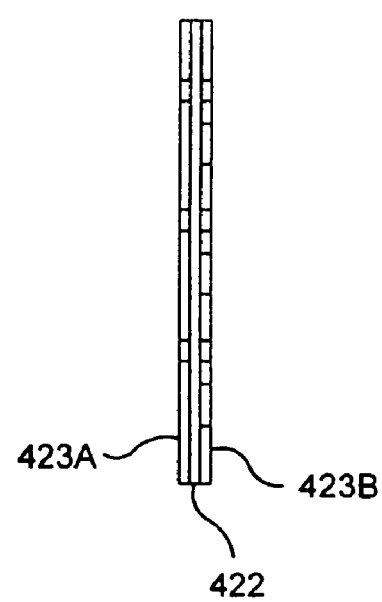
FIG. 7B is a cross-sectional view taken along line 7B—7B of FIG. 7 showing a portion of the double-sided copper-clad base material that has been chemically etched so as to form seven rows of three scanning elements therefrom.

Fabrication of the Scanning Elements Employed in the Raster Laser Scanning Mechanism Hereof The preferred method of fabricating the flexible scanning elements of the present invention will be described with reference to FIGS. 7 through 7B in the Drawings.

The first step of the fabrication method involves providing a sheet of base material 420, in which sheets of thin copper foil material 421A and 421B are laminated onto both front and back surfaces of a 12"×12" sheet of Kapton™ polyamide film material 422 using a epoxy adhesive. Suitable copper-laminated base material ("base material") can be obtained from Techetch, Inc. of Plymouth, Mass. The cross-sectional nature of this base material is shown in FIG. 7.

Both sides of the 12"×12" sheet of base material 420 are screen-printed with a pattern of copper-protective ink ("photo-resist"). The copper-protective pattern is structured so that it covers those areas of the sheet where the copper elements associated with the anchorable base portion 402 and the laser beam deflecting portion 405 of many scanning elements are to be formed on the polyamide layer in a spatially-registered manner, as shown in FIGS. 7 and 7B. Those areas not covered by the copper-protective pattern (i.e., where the gap portions of the scanning elements are to be formed and scanning element mounting hole 425) are susceptible to the copper-etchant to be used in a subsequent etching stage. After the copper-protective pattern is printed, the sheet is exposed to the copper-etchant by dipping the sheet in a reservoir of the same. Thereafter, the chemically-etched sheet, having etched copper surfaces 423A and 423B, is rinsed in a conventional manner. At this stage of the fabrication process, the copper elements associated with the anchorable base portion and the laser beam portion of four-hundred (400) canning elements are formed on 12"×12" sheet in a spatially-registered manner; also, the gap portions of the scanning elements made from polyamide material are also formed between corresponding base and laser beam deflecting portions.

The next stage of the fabrication process involves screen-printing a pattern of polyamide-protective ink on the chemically-etched sheet. The polyamide-protective pattern is structured so that it covers those areas of the sheet where the polyamide gap portions 406 have been previously formed, as well as very thin strips or string-like elements (e.g., called "stringers") between the copper elements associated with the anchorable base portion and the laser beam portion of neighboring scanning elements. Those areas of exposed polyamide not covered by the polyamide-protective pattern described above (e.g., scanning element mounting hole 425) are susceptible to the polyamide-sensitive etchant that is to be used in a subsequent etching stage. After the polyamide-protective pattern is printed, the sheet is exposed to the polyamide-etchant by dipping the partially-etched sheet in a reservoir of the same. Thereafter, the etched sheet is rinsed in a conventional manner. At this stage of the fabrication process, the polyamide elements associated with the gap portion of the four-hundred scanning elements are formed on 12"×12" sheets, along with the copper elements associated with the base portions and laser beam deflecting portions thereof. Each scanning element is suspended with respect to its neighboring scanning element by way of the formed "stringers" 424 which can easily be broken by gently pulling a fabricated scanning element from the nested matrix of scanning elements formed in the etched copper-clad sheet described above.

While suspended within the nested matrix, a thin layer of GE silicone (Durometer of Share A40) of about 0.01 inch thick is screened onto a single surface of the gap region of each scanning element.

Once fabricated in the manner described above, the permanent (ferrite) magnets 408 and light deflecting (mirror) elements 407 can be attached to the laser beam deflecting portions of the etched scanning elements using CNC-based robotic machinery well known in the art. In addition, the completely fabricated scanning elements can then be mounted to their optical benches (or mounting brackets) using CNC-based machinery well known in the art.

Notably, while the above-described process involved treating single sheets of base material, it is understood that alternative embodiments of the present invention, a roll of base material can be used (instead of sheets) and treated using a continuous version of the above-described fabrication process.

Tuning the scanning element described above is relatively easy. It has been determined that the natural resonant frequency of oscillation of the light beam deflecting portion 405 is functionally related to: the thickness of the layer of flexible material 416 (422); the physical dimensions of the flexible gap portion 406; the total mass of the laser beam deflecting portion, including the laser beam deflecting element (e.g., mirror) 407 and the permanent magnet 408. For a given permanent magnet, mirror element and base material (e.g., double-side copper-clad polyamide), the natural resonant frequency of the laser beam deflecting portion about the fixed pivot point 409 can be precisely controlled by controlling the physical dimensions of the flexible gap region 406 during the copper etching stage of the scanning element fabrication process (i.e., printing the copper-protective and polyamide-protective pattern). This technique enables tuning the scanning element over a fairly broad range of operation. For a greater degree of tuning, it might be desirable or necessary to use a different base material, in which the thickness of the polyamide layer is thicker (where a higher scanning frequency is required), or thinner (where a lower scanning frequency is required).

While sophisticated mathematical models of the scanning element can be created to assist in the design process of the scanning element hereof, it has been found that straight forward experimentation can be used to determine the gap dimensions for a desired natural operating frequency. As the forced frequency of operation is the "operating frequency" of the scanning mechanism, the designer will start with the desired operating frequency (i.e., set by scanning speed requirements, bar code symbol resolution, signal processing limitations, etc.) and figure out what the natural resonant frequency of the scanning element must be (e.g., at least 10% away from the forced frequency of operation). Knowing the approximate range of the natural resonant frequency of the scanning element under design, the designer can then experiment (or model) in a straight forward manner to determine the physical dimensions required to attain the desired natural frequency of oscillation for a scanning element fabricated from a particular base material.

Using the above-described fabrication technique, scanning elements have been fabricated with natural frequencies of operation within the range of about 50 Hz to about 250 Hz.

In the Table I below, the resonant frequencies are listed for a number of different scanning elements (1) fabricated using base material having a polyamide thickness of 0.001 inches, and 2.0 ounce double-sided copper cladding, and (2) having a laser beam deflecting portion (including a mirror and permanent magnet) with a total mass of about 0.11 grams (i.e., where the ferrite magnet has a mass of 0.04 grams and mirror having mass of 0.03 grams).

| | |
|---|---|
| Double sided copper clad | 2.0 oz |
| Polyamide layer thickness | 0.001 inch |
| Mass of Ferrite Magnet | 0.04 grams |
| Mass of Mirror Element | 0.03 grams |
| Total Mass of Light Beam Deflecting Portion | 0.11 grams |
| Gap Region Height | 0.160 inch |
| Thickness of Silicon Damping Film Layer Applied over one side of Gap Region | 0.01 inch |
| Durometer of Silicone Damping Film Layer | Share A 40 |

| RESONANT FREQUENCY (Hz) | GAP REGION WIDTH (Inch) |
|---|---|
| 25 | .065 |
| 26.5 | .060 |
| 28.0 | .055 |
| 29.5 | .050 |
| 31.0 | .045 |
| 32.5 | .040 |
| 34.0 | .035 |
| 35.5 | .030 |
| 37.0 | .025 |
| 38.5 | .020 |
| 40.0 | .015 |

In the Table II below, the resonant frequencies are listed for a number of different scanning elements (1) fabricated using base material having a polyamide thickness of 0.003 inches, and 2.0 ounce double-sided copper cladding, and (2) having a laser beam deflecting portion (including a mirror and permanent magnet) with a total mass of about 0.11 grams (i.e., where the ferrite magnet has a mass of 0.04 grams and mirror having mass of 0.03 grams).

| | |
|---|---|
| Double sided copper clad | 2.0 oz |
| Polyamide layer thickness | 0.003 inch |
| Mass of Ferrite Magnet | 0.04 grams |
| Mass of Mirror Element | 0.03 grams |

-continued

| | |
|---|---|
| Total Mass of Light Beam Deflecting Portion | 0.11 grams |
| Gap Region Height | 0.160 inch |
| Thickness of Silicon Damping Film Layer Applied over one side of Gap Region | 0.01 inch |
| Durometer of Silicone Damping Film Layer | Share A 40 |

| RESONANT FREQUENCY (Hz) | GAP REGION WIDTH (Inch) |
|---|---|
| 75 | .065 |
| 79.5 | .060 |
| 84 | .055 |
| 88.5 | .050 |
| 93 | .045 |
| 97.5 | .040 |
| 102 | .035 |
| 106.5 | .030 |
| 111 | .025 |
| 115.5 | .020 |
| 120 | .015 |
| 124.5 | .010 |

Bar Code Symbol Reading Engine of the Present Invention

As shown in FIG. 8, automatic bar code reading engine 18 is a system comprising a number of cooperating components, namely: a system override signal detection circuit 100 for detecting the production of a system override signal and producing in the presence thereof control activation signal $A_0=1$; a primary oscillator circuit 101 for producing a primary clock signal CLK for use by the system override signal detection circuit and object detection circuit 107; a first RC timing network 102 for setting the oscillation frequency of the primary oscillator circuit; an externally mounted switch (i.e. ON/OFF switch) 103 for producing a system override signal; first control means 104, realized as a first control circuit $C_1$, for performing localized system control functions; a second RC timing network 105 for setting a timer $T_1$ in control circuit $C_1$; means (e.g., an object sensing circuit 106 and an object detection circuit 107) for producing a first activation control signal $A_1=1$ upon the detection of an object bearing a bar code in at least a portion of the object detection field; a laser beam scanning mechanism 108 for producing and scanning a visible laser beam across the bar code symbol on the detected object; photo-receiving circuit 109 for detecting laser light reflected off the scanned bar code symbol and producing an electrical signal $D_1$ indicative of the detected intensity; a analog-to-digital (A/D) conversion circuit 110 for converting analog scan data signal $D_1$ into a corresponding digital scan data signal $D_2$; a bar code presence detection circuit 111 for processing digital scan data signal $D_2$ in order to automatically detect the digital data pattern of a bar code symbol on the detected object and produce control activation signal $A_2=1$; a third RC timing network 112 for setting a timer $T_{BCD}$ in the bar code symbol detection circuit; second control means 113, realized as a second control circuit $C_2$, for performing local system control operations in response to the detection of the bar code symbol; third control means 114, realized as third control module $C_3$; second control circuit $C_2$ and third control module $C_3$; a raster mode selection circuit 115 for supplying raster mode selection signals to control circuits $C_2$ and $C_3$; timers $T_2$, $T_3$, and $T_4$ identified by reference numerals 116, 117 and 118, respectively; a symbol decoding module 119 for processing digital scan data signal $D_2$ so as to determine the data represented by the detected bar code symbol, generate symbol character data representative thereof, and produce activation control signal $A_3$ for use by third control module $C_3$; a data packet synthesis module 120 for synthesizing a group of formatted data packets for transmission to its mated base unit; and a data packet transmission circuit 121 for transmitting the group of data packets synthesized by the data packet synthesis module. As will be described in greater detail hereinafter, second control circuit $C_2$ is capable of "overriding" (i.e., inhibit and/or enable) first control circuit $C_1$, whereas third control module $C_3$ is capable of overriding first and second control circuits $C_1$ and $C_2$, respectively. As shown in FIG. 8, such control override functions are carried out by the generation of control override signals (i.e., $C_2/C_1$, $C_3/C_2$ and $C_3/C_1$) transmitted between respective control structures. Owing to the unique architecture of the control subsystem hereof, the automatic bar code symbol reading device of the present invention is capable of versatile performance and ultra-low power operation. The structure, function and advantages of this control subsystem architecture will become apparent hereinafter.

As shown in FIG. 8, electrical power is provided to the components of the bar code reading device by battery power supply unit (20) contained within the housing of the device. In the illustrative embodiment, the battery power supply unit is realized as a power supply distribution circuit 125 fed preferably by replaceable or rechargeable batteries 126. In the case of rechargeable batteries, a secondary inductive coil 127, bridge rectifier 128 and voltage regulation circuit 129 are contained within the hand-supportable housing, and configured as shown in FIG. 8. The function of second inductive coil 128 is to establish an electromagnetic coupling with the primary inductive coil contained in the base unit associated with the bar code reading device whenever the device is supported in the recharging portion of the base unit. In this configuration, electrical power is inductively transferred from the primary inductive coil in the base unit to secondary inductive coil 127, rectified by bridge rectifier 128, and filtered by voltage regulation circuit 129 to provide a regulated DC power supply for recharging rechargeable batteries 126. In addition, externally accessible ON/OFF power switch 130 or functionally equivalent device (which in the illustrative embodiments hereof is realized by the same switch 103) is provided in series between battery supply unit 126 and power distribution circuitry 125 so as to permit the user to selectively energize and deenergize the device, as desired or required. Raster mode selection circuit 115 may include a manually actuatable switch externally accessible to the housing, which the user can depress to select the high-speed/low-resolution or high-speed/high-resolution mode of operation provided within the system. Alternatively, raster mode selection circuit 115 can be set to a particular mode setting upon the symbol decoding module 119 decoding a particular bar code symbol which has been predesignated to activate a particular speed/resolution mode of operation, as the case may be.

As shown in FIG. 8A, the function of coil drive signal generation circuit 181 is to produce drive signals for synchronously driving the laser scanning modules 440A and 440B so that 1-D or 2-D raster-type scanning patterns are precisely and reliably produced under electronic control. This circuitry 181 can be realized on a small printed circuit (PC) board attached to the optical bench 86 or elsewhere within the housing of the bar code symbol reading engine or host computer device, as the case may be.

In the illustrative embodiment, push-pull drive IC 556 is used to produce a current drive signal for the x-axis magnetic-field producing coil 440A. The clock frequency of the clock signal 557 produced from push-pull drive circuit 556 is set by external resistor/capacitor network 558 (R1 and C1) connected to a 5 Volt power supply in a manner well known in the art. The output clock frequency shown in FIG. 8B1 serves as a base or reference signal for the operation of circuit 554. As shown, the output clock signal is provided as input to a synchronous (4-bit) binary counter 560 which produces a plurality of output clock signals having different lock rates (e.g., 2, 4, 8, etc.) In turn, these output clock signals, along with a DC signal, are provided as input signals to a multi-channel data selector/multiplexer 561 (e.g., whose control or gating signals are provided by the system controller 562 of the host system (e.g., hand-held bar code symbol reader, countertop scanner, vending machine, etc.) 553. The single output of the data-selector/multiplexer 61 is provided as input to an inverter 564 which is used to drive a transistor (Q1) 565 through a resistor R2 connected to the base thereof, with the transistor emitter connected to electrical ground. In turn, the collector and emitter junction of the transistor 565 are connected in series with a current limiting resistor R3, a y-axis magnetic-field producing coil 440B and the 5 Volt power supply.

In the illustrative embodiment, the system control module $C_3$ or $C_2$ is operably connected to the symbol decoding module 134. Typically, the symbol decoding module is realized as part of a programmed microprocessor capable of decoding 1-D and 2-D bar code symbols using auto discrimination techniques and the like well known in the art. During decode processing, the symbol decoding module 134 carries out one or more 2-D decoding algorithms (including PDF 417 algorithms). Such decoding algorithms may include scan pattern optimization control logic. According to such logic, if during the 2-D decoding process, a bar code symbol is decoded, then the decoding module proceeds to determine how many rows of scan data are contained in the 2-D bar code symbol. This is achieved by reading the "row" indication field in the decoded line of scan data and determining the number of rows within the scanned 2-D bar code symbol. When this information is recovered by the symbol decoding module, it is then provided to the appropriate system control module $C_3$ or $C_2$. In turn, the system control module uses this information to generate a control signal for the data-selector/multiplexer 561. The control signal selects a signal (at the multiplexer's input) which drives the y-axis magnetic-field producing coil 440B in an manner that the 2-D bar code symbol is optimally scanned using a high-speed raster-type laser scanning pattern.

For example, in some applications, it will be desirable to initially scan using a raster-type 2-D scanning pattern. This if the symbol decoding module detects a 1-D bar code symbol, then the system controller will automatically produce a control signal that causes the multiplexer 561 to select a DC-type drive voltage, thereby causing the y-axis magnetic-field producing coil 440B to remain pinned down, and be prevented from deflecting the laser beam along the y-axis of the scanning beam. In other applications, it will be desirable to initially scan using a 1-D scanning pattern. In such cases, if the symbol decoding module 134 detects a 1-D bar code symbol, then the system control module will automatically continue producing a control signal that causes the multiplexer 561 to select a DC voltage, thereby causing the y-axis magnetic-field producing coil 440B to remain pinned down, and prevented from deflecting the laser beam along the y-axis of the scanning beam.

If the symbol decoding module 134 detects a "Post-Net" type 2-D bar code symbol (e.g., using a 1-D scanning pattern), then the system control module will produce a control signal that causes the multiplexer 561 to select a coil drive signal that causes the y-axis magnetic-field producing coil 440B to produce a 2-line raster scanning pattern. If the symbol decoding module detects a "PDF or equivalent" type 2-D bar code symbol, then the symbol decoder 134 determines how many rows of data in the PDF code symbol. Based on the number of rows of data contained within the scanned 2-D bar code symbol, the system control module can dynamically generate a suitable control signal that causes the y-axis magnetic-field producing coil to produce an optimal number of scan lines in the scanning pattern, related to the number of rows of data contained within the scanned code symbol.

If the symbol decoding module determines that the PDF symbol has between 2–4 rows of data, then the system control module will produce a control signal that causes the multiplexer 561 to select a clock signal that causes the y-axis magnetic-field producing coil 440B to produce a 2-line raster scanning pattern. If the symbol decoding module determines that the PDF symbol has between 5–10 rows of data, then the system control module will produce a control signal that causes the multiplexer to select a clock signal that causes the y-axis magnetic-field producing coil 440B to produce a 4-line raster scanning pattern. If the symbol decoding module 134 determines that the PDF symbol has 11 or more rows of data, then the system control module will produce a control signal that causes the multiplexer to select a clock signal that causes the y-axis magnetic-field producing coil 440B to produce a 4-line raster scanning pattern. If the symbol decoding module 134 determines that the PDF symbol has 11 or more rows of data, then the system control module will produce a control signal that causes the multiplexer to select a clock signal that causes the y-axis magnetic-field producing coil 440B to produce an 8-line raster scanning pattern.

During operation of the x and y coil drive circuitry shown in FIG. 8A, the push-pull drive IC 556 thereof produces a clock signal 557 as shown. Based on this clock signal, a current drive signal shown in FIG. 8B2 is produced for driving the x-axis magnetic-field producing coil 440A. As the operation of the x-axis magnetic-field producing coil 440A is reversible (i.e., its magnetic polarity reverses in response to current direction reversal therethrough), the current direction is referenced to about a zero milliap value. Each time the current drive signal changes direction through windings of the x-axis magnetic-field producing coil 440A, so too does the magnetic polarity of the magnetic-field produced thereby and thus the direction of deflection of the scanning element along the x-axis.

To prevent deflection of the laser beam along the y-axis, and thus create a 1-D scanning pattern, the system control module will select a DC voltage at multiplexer 561. The selected DC voltage will forward bias the current drive transistor 565 so that a constant current flows through y-axis magnetic-field producing coil 440B, pinning the scanning element of the y-axis scanning module and preventing deflection of the laser beam along the y-axis in response to the base clock signal 557 shown in FIG. 8B6.

To produce a 2-D raster-type laser scanning pattern, the system control module will select one of the voltage signals shown in FIGS. 8B3 through 8B5 for driving current drive transistor 565 connected to the y-axis magnetic-field producing coil 440B. As illustrated in FIG. 8A, whenever the amplitude of the selected voltage signal is below a predetermined threshold (e.g., 0 Volts), then inverter 564 will produce an output voltage which forward biases the current drive transistor 565, causing electrical current to flow through the y-axis magnetic-field producing coil and a magnetic field are produced in response thereto. Under such conditions, the y-axis magnetic-field producing coil and a magnetic field produced in response thereto. Under such conditions, the y-axis magnetic-field producing coil 440B deflects the laser beam long they y-axis. When the amplitude of the selected voltage signal rises above the threshold level, the output of the inverter 564 decreases so that the current drive transistor 565 is no longer forward-biased. This condition causes current flow through the y-axis magnetic-field producing coil to cease and the magnetic field therefrom to collapse, thereby allowing the scanning element to deflect the laser beam I in the opposite direction.

When the selected control voltage changes polarity, the y-axis coil is once again actively driven and the scanning element thereof deflected, causing the horizontally deflected laser beam to be deflected along the y-axis direction. The number of horizontal scan lines produced each time the laser beam is deflected along the y-axis direction depends on how slowly the amplitude of the selected control voltage (from the multiplexer 561) changes as the x-axis magnetic-field producing coil 440A deflects the laser beam along the x-axis direction each time the current drive signal shown in FIGS. 8B3 through 8B5 undergoes a signal level transition from high to low.

Notably, the selected control voltage shown in FIG. 8B5 allows eight horizontal scan lines to be created along the x-axis before it undergoes its signal level transition, which in effect triggers the repositioning of the laser beam along the start position of the y-axis. The finish position along the y-axis depends on the time that the selected control voltage remains below the threshold voltage, as well as other factors (e.g., scanning aperture of the modules, host scanner, etc.)

Using the above-described principles of the present invention, clearly it is possible to produce 2-D raster-type scanning patterns having a number of horizontal scan lines that are optimally matched to the number of rows of data within virtually any 2-D bar code symbol being scanned.

In accordance with the principles of the present invention, the symbol decoding module 134 can be programmed to collect information regarding (i) the number of rows in a scanned 2-D bar code symbol and (ii) the length of the data rows. The system control module can then use the row number information to set the number of horizontal scan lines to be produced in the scanning pattern, while the row length information can be used to set the length of the scan lines by limiting the amplitude of electrical current through the x-axis magnetic-field producing coil 440A.

As shown in FIG. 8A, such control can be achieved by the system control module $C_2$ or $C_3$ sending a control signal 566 to push-pull drive circuit 556, or an active element 567 provided in series with electromagnetic coil 440A for the purpose of actively controlling the electrical current flowing therethrough.

In another embodiment of the present invention, it is possible for the symbol decoding module 134 to collect information regarding (i) the number of rows in a scanned 2-D bar code symbol, (ii) the length of the data rows, and (iii) count data representative of the distance of the symbol in the scanning volume. The system control module can then use the row number information to set the number of horizontal scan lines to be produced in the scanning pattern, and the row length information and count data to set the length of the horizontal scan lines (by limiting the amplitude of electrical current through the x-axis magnetic-field producing coil 440A by current control signal 566). By controlling such scanning parameters, the overriding system control module can achieve real-time control over the aspect-ratio of the 2-D raster-type scanning pattern.

An advantage of such system functionalities will be to improve the visibility of the scanned laser beam, optimize data collection operations, conserve electrical power and computational resources aboard the system, as the laser beam will only be scanned over regions in space where symbol data is likely present.

In FIGS. 3 and 3A, the raster-type laser scanning module of the present invention is shown being operated in its 1-D Scanning Mode. In this mode, a scan pattern is produced having a single horizontal scan line. In FIGS. 8B6 through 8B8, the laser scanning module is shown being operated in different variations of its 2-D Raster Scanning Mode, in which a raster-type scanning pattern is produced. In each of these figures, a different raster scanning pattern is shown being produced with a different number of scan lines. Preferably, the particular number of scan lines produced are automatically selected by the system controller of the present invention, as described in great detail above.

Scanning mode selection can be realized in a number of different ways. One way would be to mount an external button on the housing of the bar code symbol reader into which the scanning module has been integrated. When this mode selection button is depressed, the reader automatically enters a particular scanning mode. Alternatively, scanning mode selection can be achieved by way of reading a predetermined bar code symbol encoded to automatically induce a particular mode of operation. When a predetermined bar code symbol is read, the scanning module automatically enters the scanning mode represented by the scanned bar code symbol.

Figure 8C:
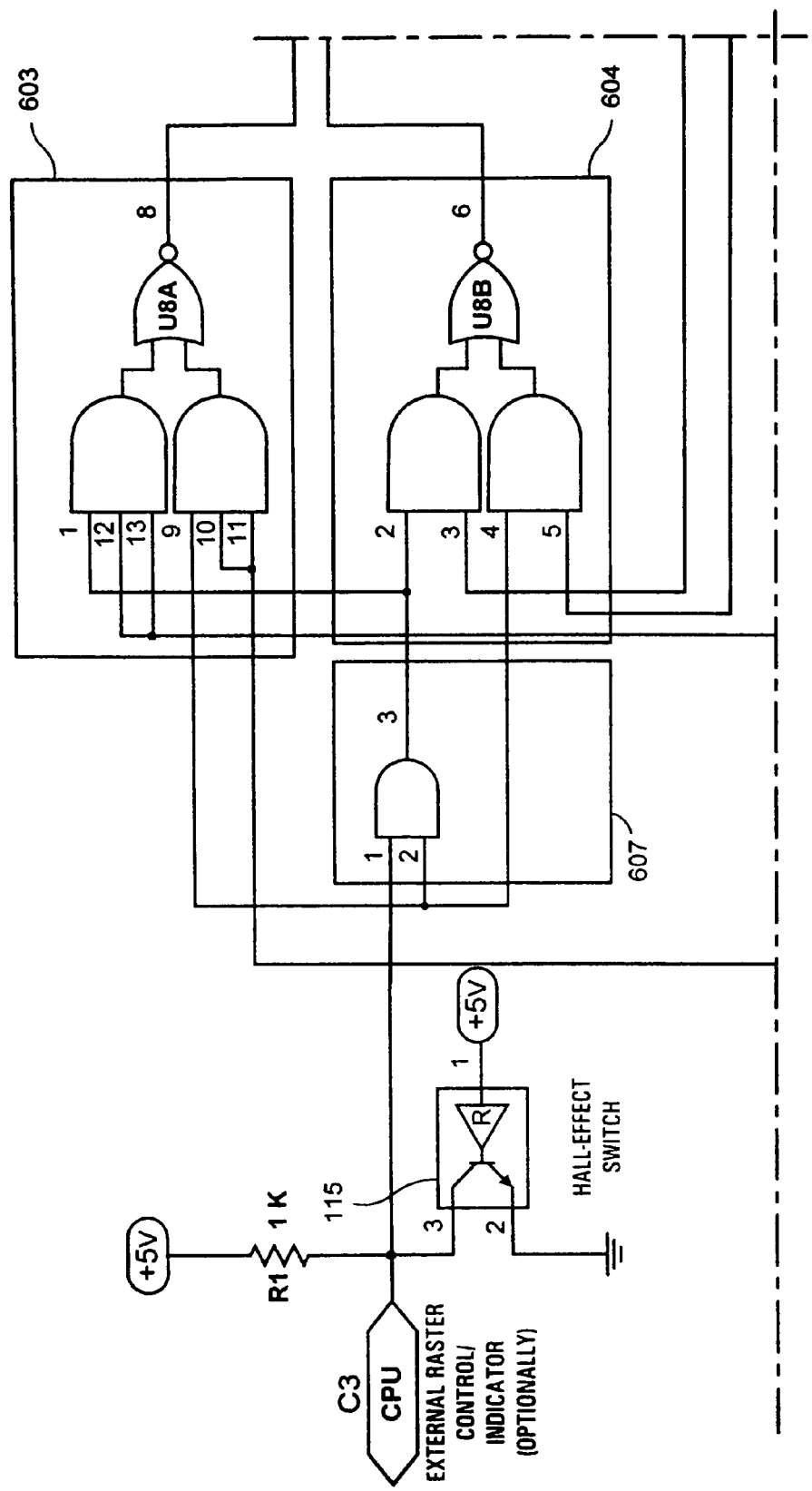
FIGS. 8CA through 8CD collectively show a schematic diagram of a second circuit which can be used to produce a synchronized coil-drive signals for use by the raster-type laser scanning engine shown in FIG. 5A.
Figure 8C:
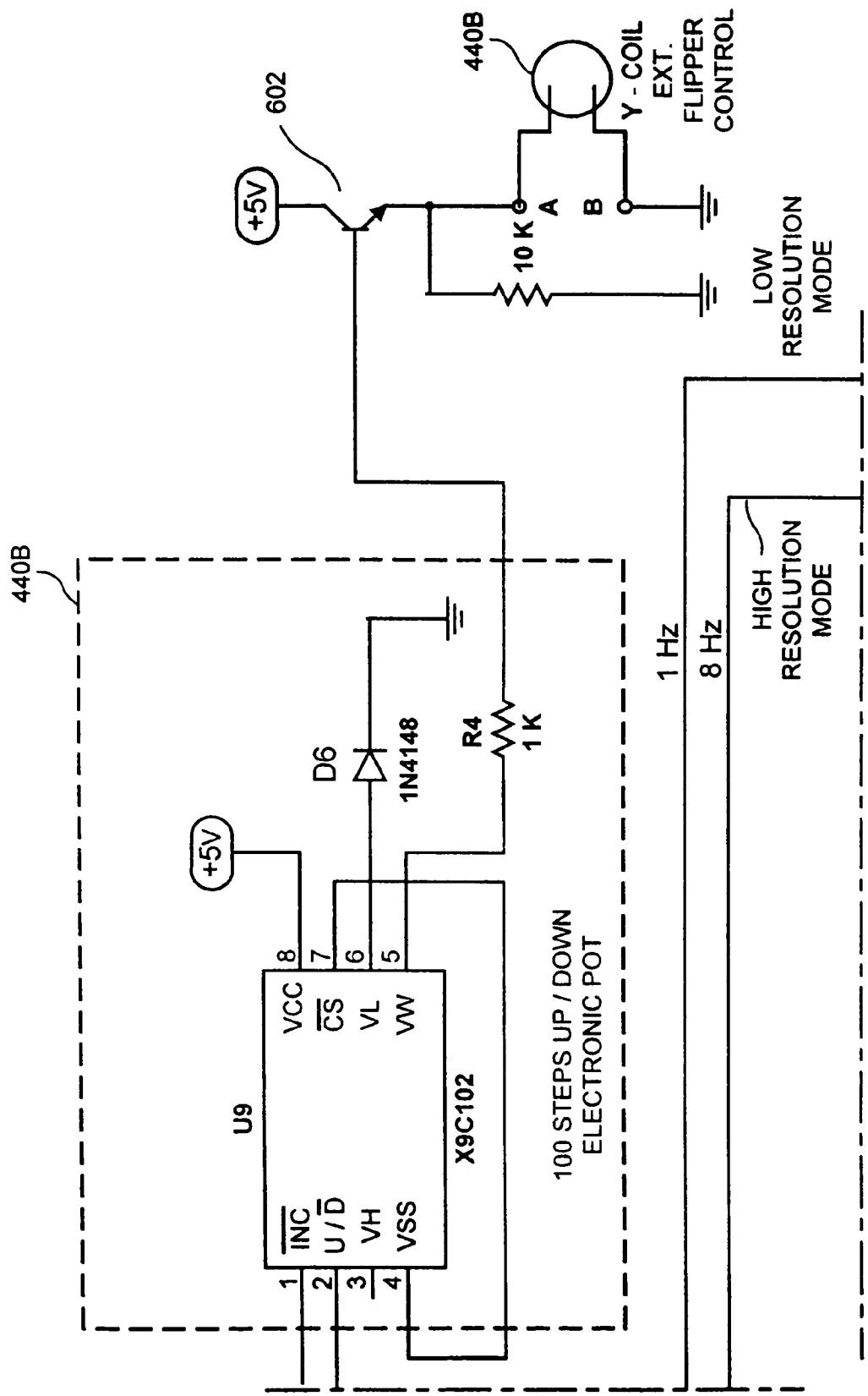
Figure 8C:
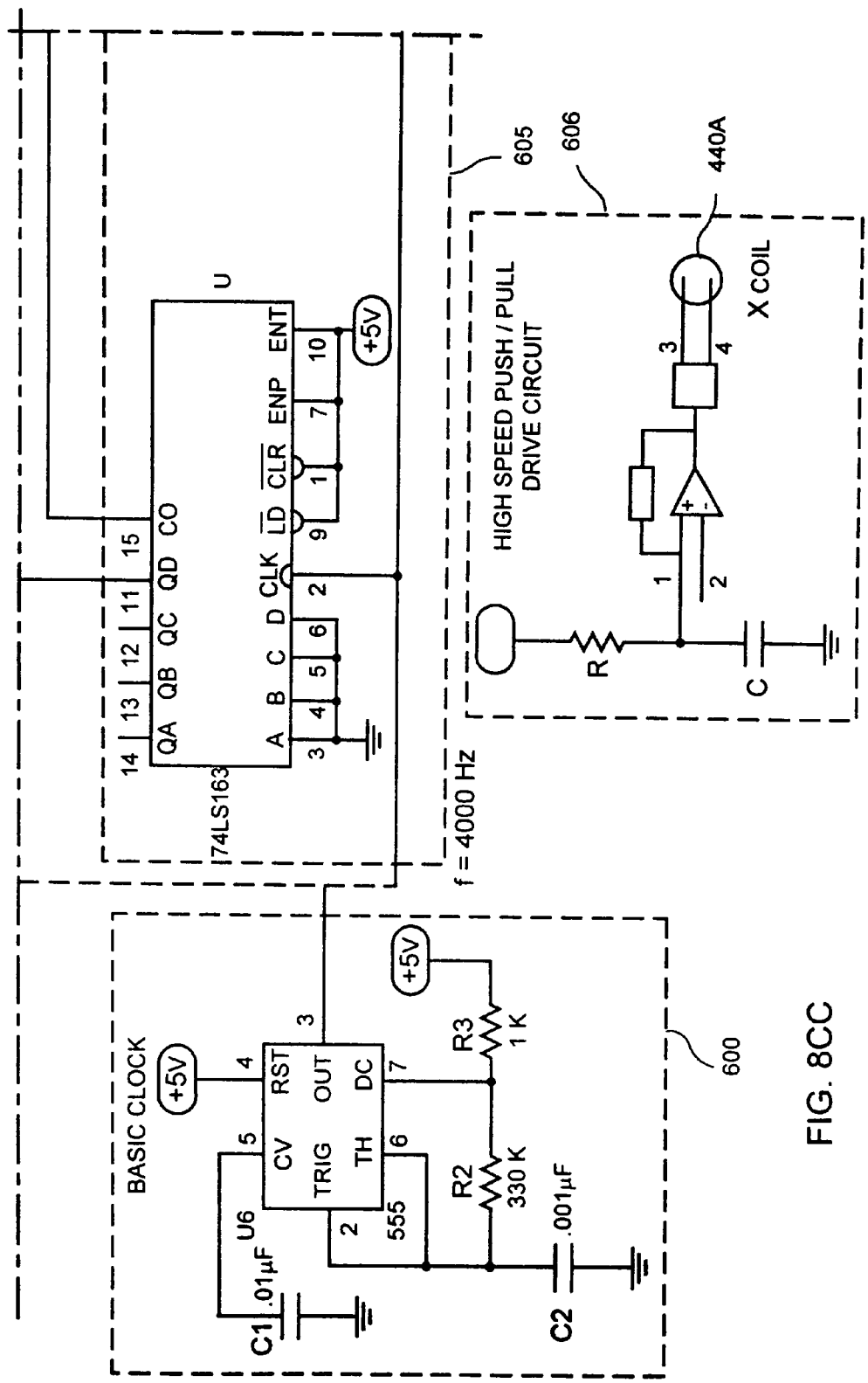
Figure 8C:
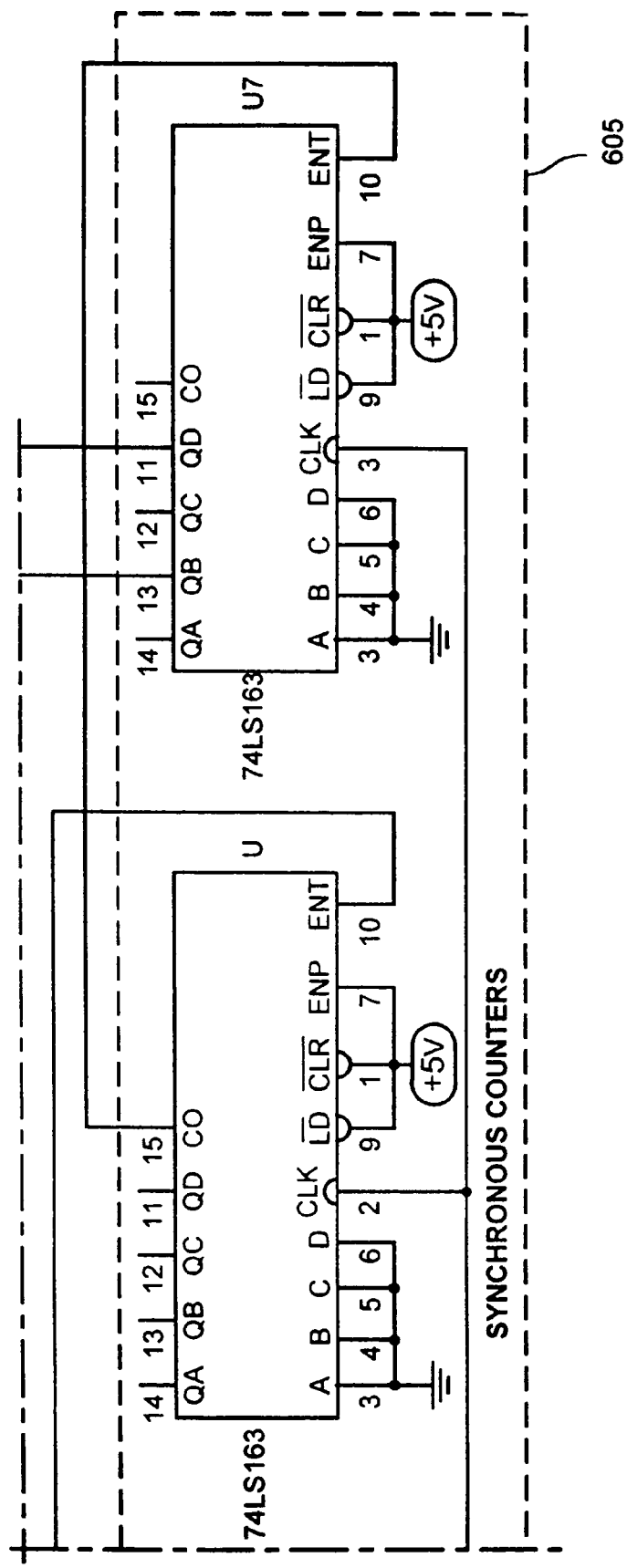

In FIGS. 8CA through 8D3, a second circuit is disclosed for producing asychronized coil-drive signals that can be used by the raster-type laser scanning engine of FIG. 5A to drive the electromagnetic coils 440A and 440B thereof.

As shown in FIGS. 8CA through 8D3, the coil drive signal generation circuit 181' comprises a number of subcircuits, namely: a clock timing signal producing circuit 600 for producing a master clock timing signal (e.g. f=4000 HZ) to be used within circuit 181'; an electronically-controlled potentiometer circuit 601 for incrementing the y-coil drive voltage signal ($V_W$) by (i) a predetermined voltage amount and (ii) along a direction of voltage movement (e.g. up or down); a transistor driver $Q_2$ 602 for converting the output drive voltage signal $V_W$ into a coil drive current signal for driving the y axis coil 440B; a y-axis step/increment control circuit 603 for producing a voltage increment signal (INC) for supply to the electronically-controlled potentiometer 604; a y-axis sweep-rate/direction control circuit 604 for generating a direction select/control signal (U/D) for supply to the electronically-controlled potentiometer 601; a 12-bit synchronous counter circuit 605 for dividing the master clock timing signal (f=4000 HZ) into (i) an appropriate timing control signal for supply to the y-axis step/increment control circuit 603 during the raster mode detected by mode detection circuit 607, and (ii) an appropriate timing control signal for supply to y-axis sweep-rate/direction control circuit 604 during the raster mode detected by mode detection circuit 607; a highspeed push-pull x-coil drive signal circuit 606 for producing a drive voltage signal to the x-axis coil 440A; an in/out-of-stand detection circuit 607 for detecting whether the bar code symbol reader 2 is disposed within its support stand 3, or is removed therefrom and automatically supplying a control signal to the y-axis step/increment control circuit 603 and y-axis sweep-rate/direction control circuit 604 for enabling the selection of appropriate timing control signals provided thereto by the synchronous counter circuit 605.

The function of the in/out-of-stand detection circuit 607 is to detect whether the bar code symbol reader 2 is disposed within its support stand 3, or is removed therefrom and automatically supply a control signal to the y-axis step/increment control circuit 603 and y-axis sweep-rate/direction control circuit 604 so as to enable the supply of appropriate timing control signals (generated by the synchronous counter circuit 605) to the y-axis step/increment control circuit 603 and y-axis sweep-rate/direction control circuit 604. In turn, these control circuits 603 and 604 generate signals INC and U/D respectively for provision as input to the electronically-controlled potentiometer 601, as required by the detected raster mode set by the mode selection circuit 115 (e.g. Hall-effect switch or control signal from a control module $C_2$ or $C_3$) and detected by in/out-of-stand detection circuit 607.

The function of the electronically-controlled potentiometer circuit 601 is two-fold. The first function is to increment the y-coil drive voltage signal ($V_W$) by a predetermined voltage amount (e.g. selected from up to 100 precisely quantified voltage levels) in response to a predetermined number of pulse transitions detected in the timing control signal (INC) within the potentiometer circuit 601. The second function is to increment the y-coil drive voltage signal ($V_W$) along a direction of voltage movement in response to a change in pulse direction detected in the timing control signal U/D within the potentiometer circuit 601. In the illustrative embodiment, potentiator circuit 601 is constructed using IC (U3)x9C102 non-volatile digital potentiometer from Xicor, Inc.

The function of the y-axis step/increment control circuit 603 is to produce voltage increment signal (INC) for supply to the electronically-controlled potentiometer 601 so that the output voltage $V_W$ is incremented and thus the y-axis scanning element 405B incrementally deflected by the y-coil 440B during raster scanning operations, thus sweeping the laser beam along the y-axis direction of the scanner. In its illustrative embodiment, circuit 603 is constructed using a pair of NAND gates and a NOR gate configured as shown in FIGS. 8CA through 8D3.

The function of the axis sweep-rate/direction control circuit 604 is to produce voltage direction select/control signal (U/D) for supply to the electronically-controlled potentiometer 601 so that the direction of voltage incrementation in $V_W$ is periodically changed from UP to DOWN and vice versa, in a manner corresponding the UP and DOWN traversals of the rastered laser beam during scanning operations. In the illustrative embodiment, circuit 604 is constructed using a pair of NAND gates and a NOR gate configured as shown in FIGS. 8CA through 8D3.

The function of the 12-bit synchronous counter circuit 605 is to divide the master clock timing signal (f=4000 HZ) into first and second sets of timing control signals for use during the raster mode (e.g. high-speed/low-resolution mode or high-speed/high-resolution mode) detected by in/out-of-stand detection circuit 607. The first set of timing control signals produced by synchronous counter circuit 605 are for controlling when the y-step/increment circuit 603 is to increment the output voltage $V_W$ from the electronically-controlled potentiometer circuit 601 by a precise (but quantified voltage amount). The second set of timing control signals produced by synchronous counter circuit 605 (e.g. 1 HZ signal for the high-speed/high-resolution raster mode and 8 HZ signal for the high-speed/low-resolution raster mode) are for controlling when the y-axis sweep-rate/direction control circuit 604 is to change the incrementation direction of the output voltage $V_W$ from the electronically-controlled potentiometer circuit 601, and thus the rate at which the laser beam is swept up and down along the y-axis direction of the raster scanning field. In the illustrative embodiment, synchronous counter circuit 605 is constructed using three 4-bit counter (e.g. 74LS163 IC from Texas Instruments, Inc.) In FIG. 8D1, the x-coil drive voltage signal is schematically represented independent of the y-coil drive voltage signal in order to emphasize that the x-coil drive voltage signal and the y-coil drive voltage signal are not synchronized in the preferred embodiment of x-v coil-drive signal generation circuit 181'. In FIG. 8D2, the y-coil drive voltage signal produced by circuit 181' in the high-speed/low-resolution raster mode is schematically depicted in conjunction with the voltage incrementation direction control signal (U/D) generated during this mode of scanner operation. In FIG. 8D3, the y-coil drive voltage signal produced by circuit 181' in the high-speed/high-resolution raster mode is schematically depicted in conjunction with the voltage incrementation direction control signal (U/D) generated during this mode of scanner operation. Notably, in each such mode of scanner operation, the y-coil drive voltage signal increments in a step-wise manner in the UP direction, and at the end of +y axis direction (corresponding to the top of a scanned bar code), remains at a fixed value for a number of clock cycles, and then decrements in a step-wise manner in the DOWN direction, and at the end of −y axis direction (corresponding to the bottom of the scanned bar code), remains at a fixed value for a number of clock cycles, with the process repeating itself, again and again, as shown in FIGS. 8D2 and 8D3. By virtue of such voltage characteristics, the y-coil 440B cyclically drives the y-axis scanning element 405B back and forth along the y axis scanning direction, while the x-coil 440A cyclically drives the x-axis scanning element 405A back and forth along the x axis scanning direction, in a non-synchronous manner, enabling the entire raster scanning pattern to float up and down along the y-axis scanning direction. Such pattern-floating action facilitates scanning the entire region of a 2-D bar code symbol presented within the raster scanning field generated by the bar code reading engine 18.

Having completed the description of x-y coil drive signal generation circuit 118', it is appropriate at this juncture to now resume description of the other subsystems and subcomponents within bar code symbol reading engine 18.

As illustrated in FIG. 8, system override signal detection circuit 100, primary oscillator circuit 101, object detection circuit 107, first control circuit $C_1$, analog-to-digital conversion circuit 110, bar code symbol detection circuit 111, and second control circuit $C_2$ are all realized on a single Application Specific Integrated Circuit (ASIC) chip 133 using microelectronic circuit fabrication techniques known in the art. In the illustrative embodiment, the ASIC chip and associated circuits for laser scanning and light detection and processing functions, are mounted on PC board 87. Symbol decoding module 119, data packet synthesis module 120, timers $T_2$, $T_3$, $T_4$, and $T_5$ and third control module $C_3$ are realized using a single programmable device, such as a microprocessor having accessible program and buffer memory, and external timing circuitry, collectively depicted by reference numeral 134 in FIG. 8. In the illustrative embodiment, these components and devices are mounted on PC board 88.

In the illustrative embodiment, when power switch 130 is engaged to its ON position, power from battery power unit 126 is provided to first control circuit $C_1$, system override detection circuit 100, primary oscillator circuit 101 and IR object sensing circuit 106 and object detection circuit 107 so as to enable their operation, while only biasing voltages are provided to all other system components so that they are each initially disabled from operation. In accordance with the principles of the present invention, the consumption of electrical power to all other system components occurs under the management of the control architecture formed by the interaction of distributed control centers $C_1$, $C_2$ and $C_3$.

Figure 8E:
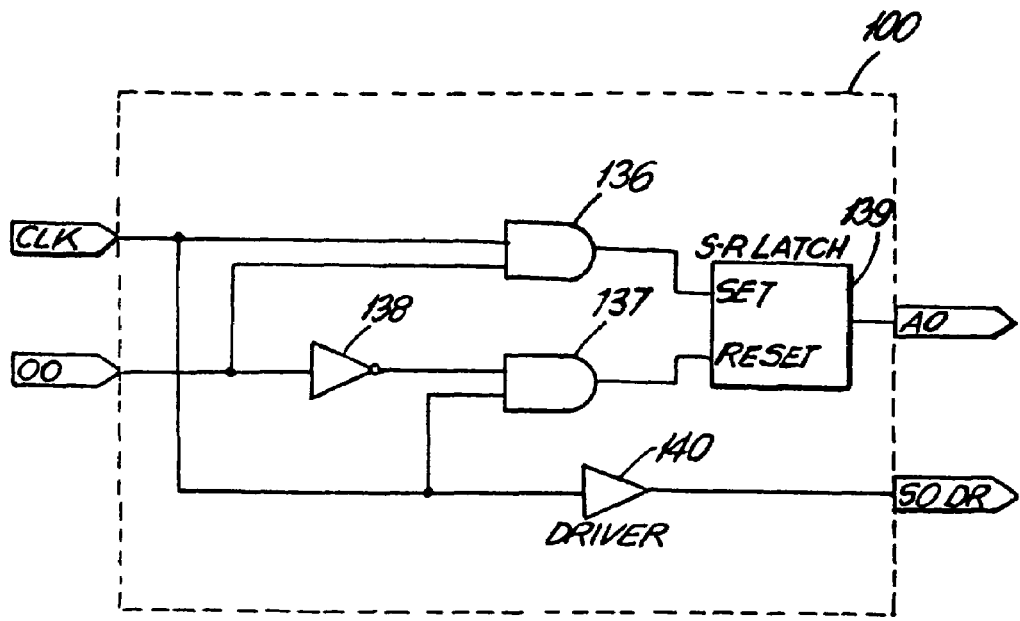
FIG. 8E is a functional logic diagram of the system override signal detection circuit in the Application Specific Integrated Circuit (ASIC) chip in the automatic bar code symbol reading engine of the present invention.
Figure 8F:
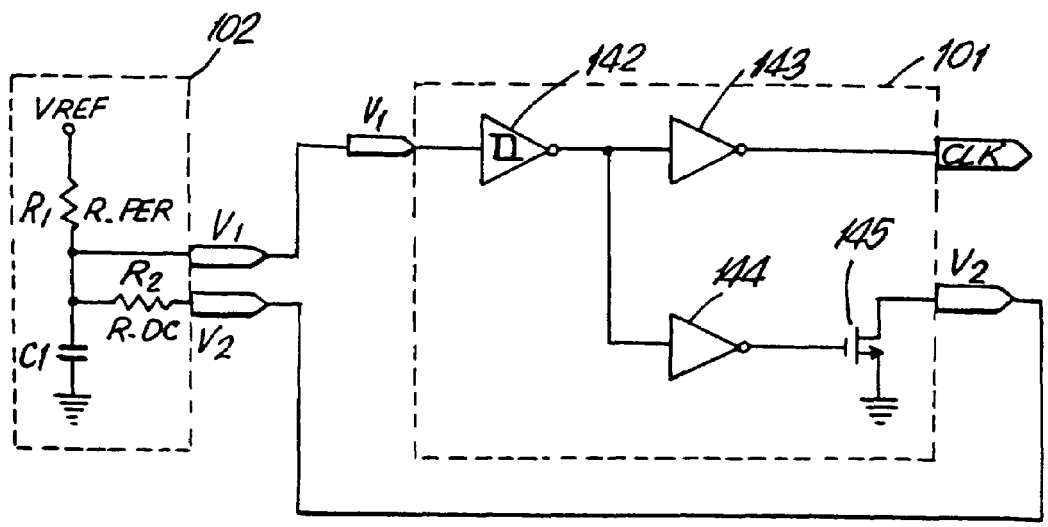
FIG. 8F is a functional logic diagram of the oscillator circuit in the ASIC chip in the automatic bar code symbol reading engine of the present invention.
Figure 8G:
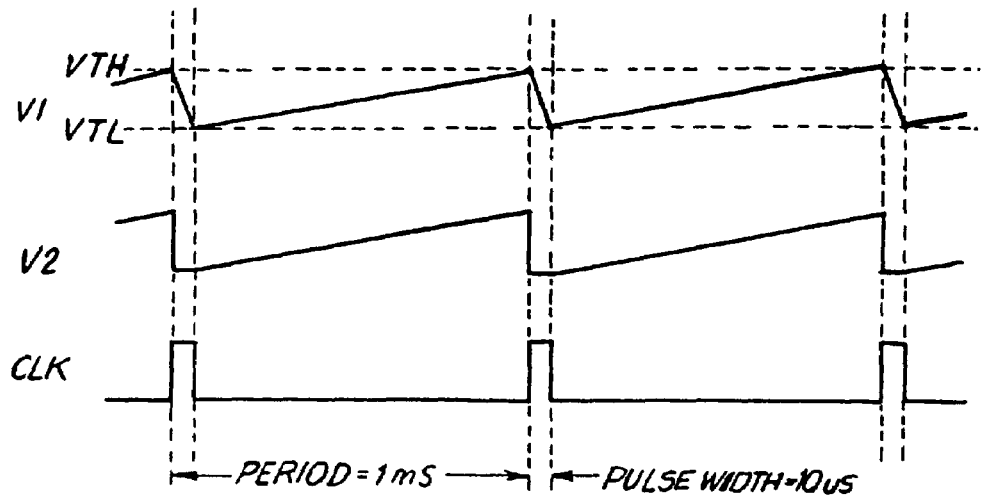
FIG. 8G is a timing diagram for the oscillator circuit of FIG. 8F.

In the illustrative embodiments of the present invention, operation of the entire system can be disabled by activating ON/OFF switch 103 mounted on the hand-supportable housing. As shown in FIG. 8E, system override signal detection circuit 100 comprises AND gates 136 and 137, an invertor 138, an S-R latch circuit 139 and a logical driver 140, configured as shown. As illustrated in FIG. 8Q, the clock oscillator signal CLK (i.e., a periodic pulsed signal) is provided as one input of AND gate 136, one input of AND gate 137, and the input of logic driver 140. The system override signal $S_O$ from ON/OFF switch 103 is provided to the input of invertor 138 and the second input of AND gate 136. The output of invertor 138 is provided to the input of AND gate 137. As shown, the output of AND gate 137 is provided to the RESET input of S-R latch 139, whereas the output of AND gate 136 is provided to the SET input of S-R latch 139. The output of S-R latch 139 is activation signal $A_O$ provided to first control circuit $C_1$, whereas the output of logic driver 140 is the driver signal $S_O$ DR which is used to drive (i.e., provide the supply voltage for) the ON/OFF switch 103 mounted on the hand-supportable housing.

As shown in FIG. 8, primary clock oscillator circuit 101 supplies a periodic pulsed signal to both the system override signal detection circuit and the object detection circuit. In the illustrative embodiment, the primary oscillation circuit is designed to operate at a low frequency (e.g., about 1.0 Khz) and a very low duty cycle (e.g, about 1.0%). The "ON" time for the system override signal producing means and the IR object sensing circuit is proportional to the duty cycle of the primary oscillation circuit. This feature allows for minimal operating current when the bar code symbol reading engine is in the object detection mode and also when the system override signal producing device is activated (i.e., produces a system override signal).

Figure 8H:
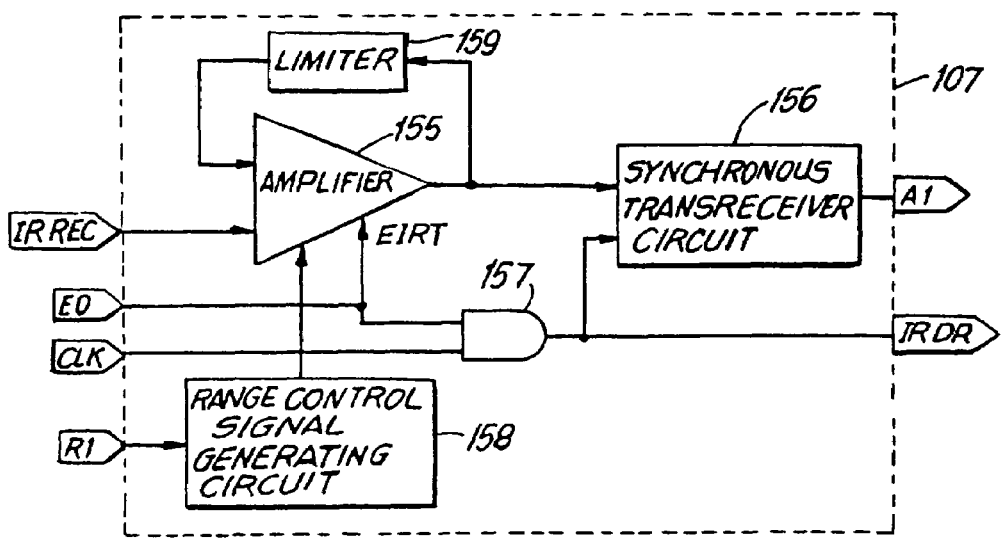
FIG. 8H is a block functional diagram of the object detection circuit (i.e., system activation means) in the ASIC chip in the automatic bar code symbol reading engine of the present invention.
Figure 8I:
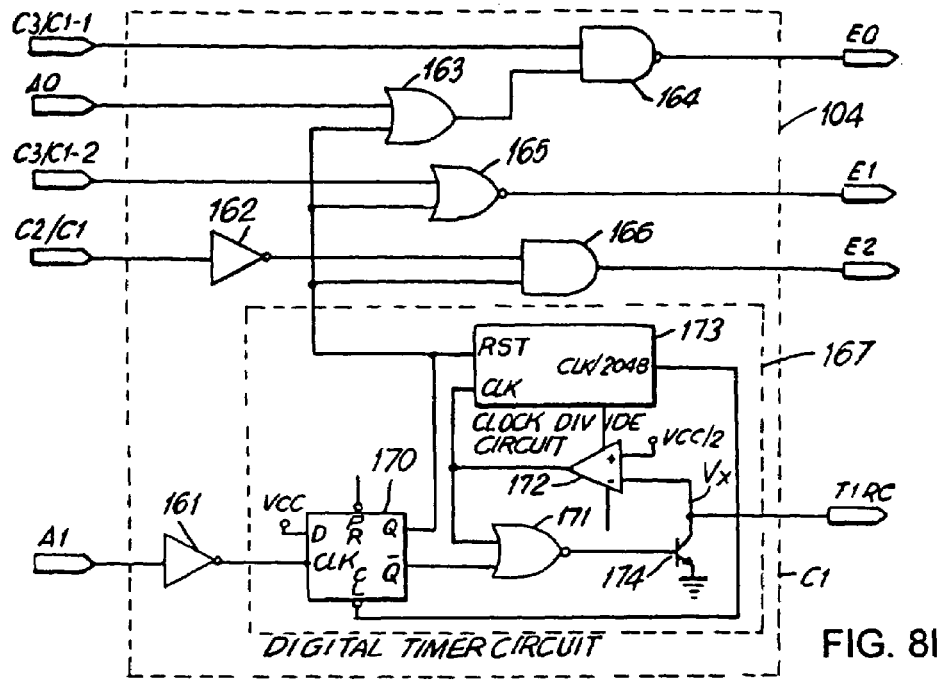
FIG. 8I is a functional logic diagram of the first control circuit ($C_1$) of the control system of the present invention.
Figure 8J:
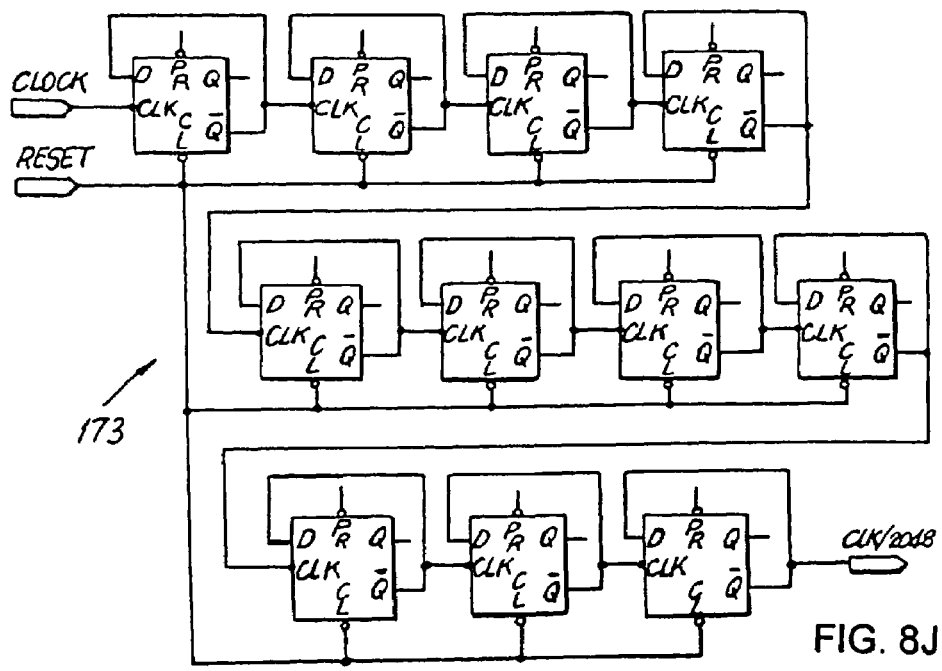
FIG. 8J is a functional logic diagram of the clock divide circuit in the first control circuit of FIG. 8I.
Figures 8K, 8L:
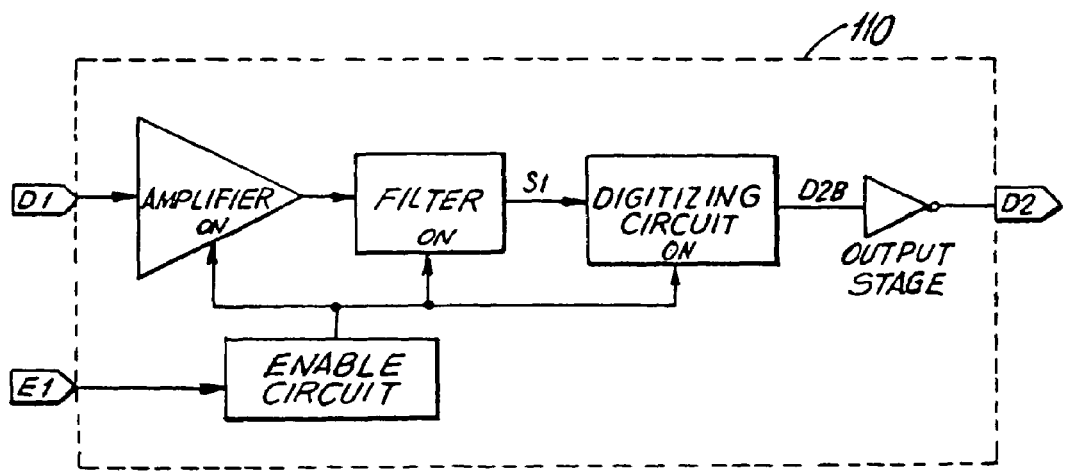
FIG. 8K is table setting forth Boolean logic expressions for the enabling signals produced by the first control circuit $C_1$.
FIG. 8L is a functional block diagram of the analog to digital (A/D) signal conversion circuit in the ASIC chip in the bar code symbol reading engine of the present invention.
Figure 8M:
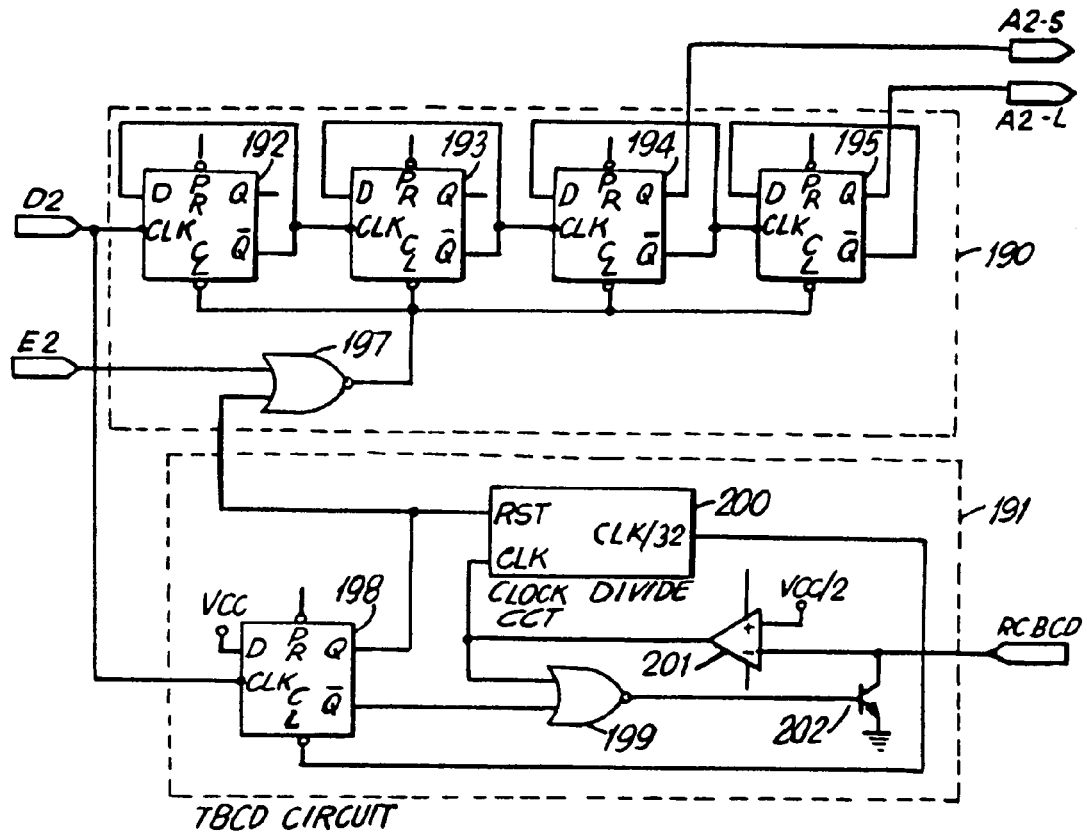
FIG. 8M is a functional logic diagram of the bar code symbol (Presence) detection circuit in the ASIC chip in the bar code symbol reading engine of the present invention.
Figure 8N:
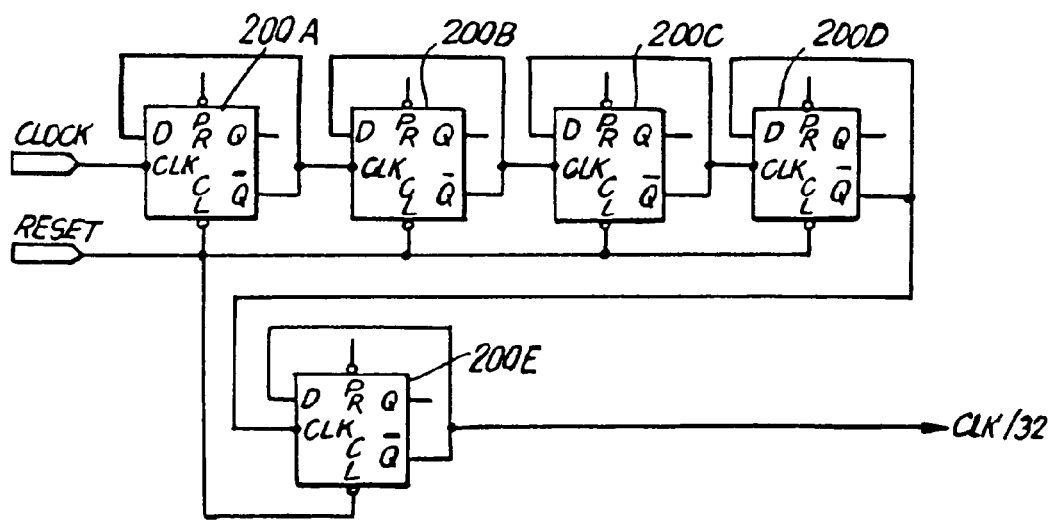
FIG. 8N is a functional logic diagram of the clock divide circuit in the bar code symbol detection circuit of FIG. 8M.
Figures 8O, 8Q:
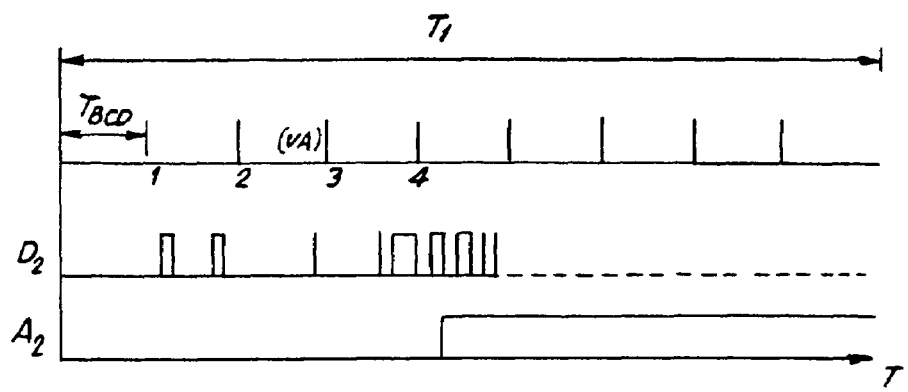
FIG. 8O is a schematic representation of the time window and subintervals maintained by the bar code symbol detection circuit during the bar code symbol detection process.
FIG. 8Q is Boolean logic table defining the functional relationships among the input and output signals into and out from the second control circuit $C_2$ of FIG. 8R.
Figure 8P:
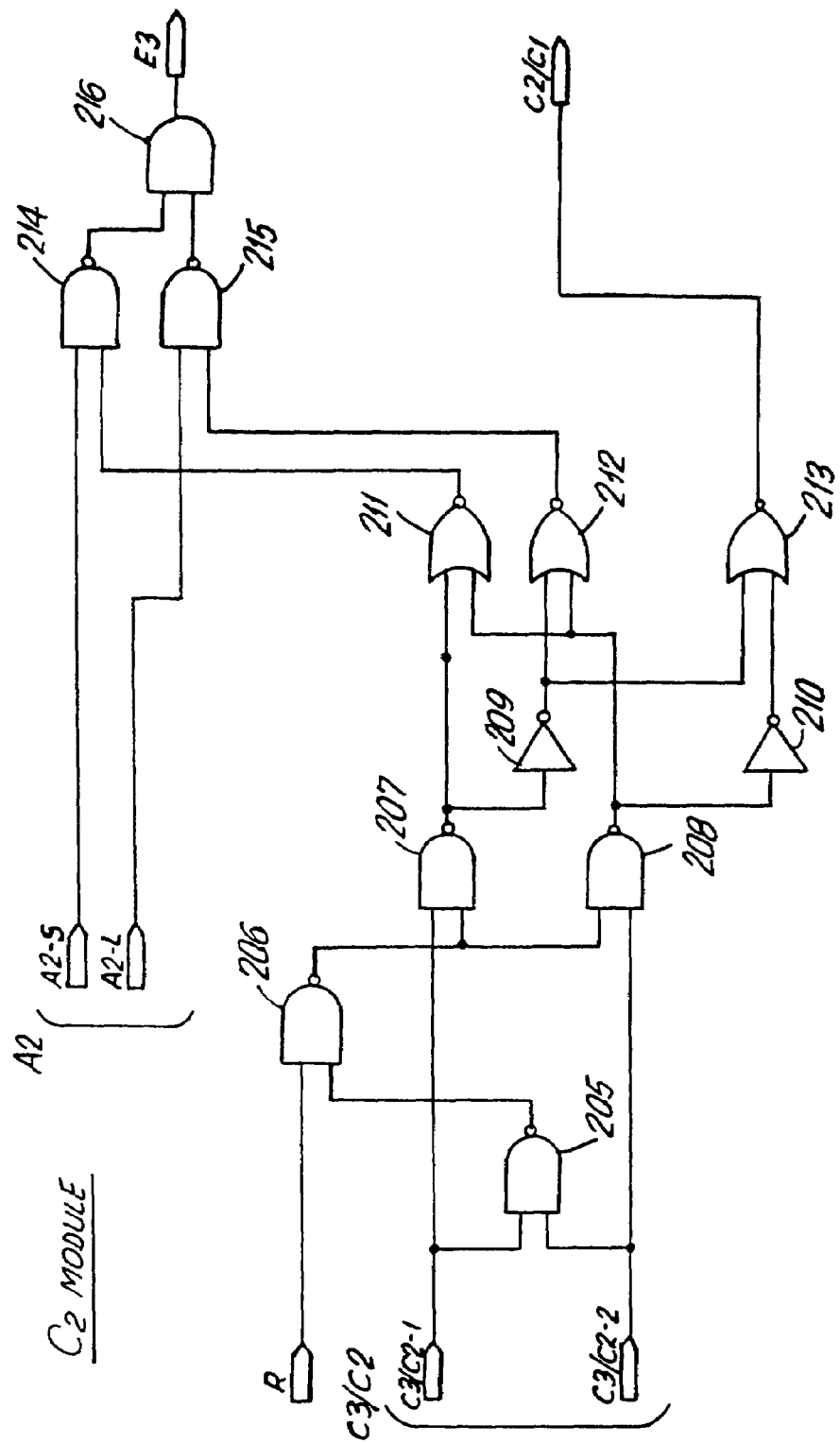
FIG. 8P is a functional logic diagram of the second control circuit ($C_2$) in the ASIC chip in the automatic bar code symbol reading engine of the present invention.
Figure 8R:
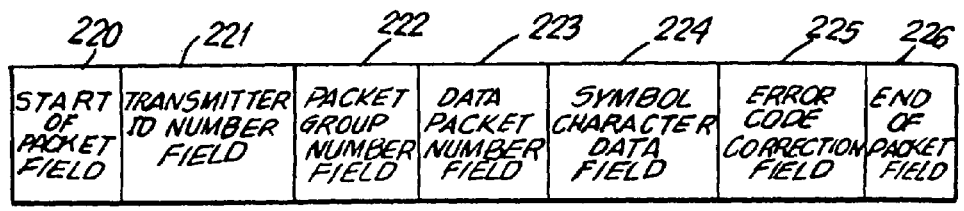
FIG. 8R is a schematic representation of the format of each data packet transmitted from the data packet transmission circuit of FIG. 9.

As shown in FIG. 8R, primary oscillation circuit 101 comprises a Schmidtt trigger 142, invertors 143 and 144, and a NMOS Field-Effect Transistor (FET) 145. As shown, the output of trigger 142 is connected to the inputs of both invertors 143 and 144. The output of invertor 143 produces clock signal CLK which is provided to system override signal detection circuit 100 and object detection circuit 107. The primary oscillation circuit is connected to first RC network 102 which comprises resistors $R_1$ and $R_2$, and capacitor $C_1$, configured as shown in FIG. 8R. The function of the RC network 102 is to establish the duty cycle and the oscillation period of the primary oscillator circuit. As shown, two time constants (i.e., loads) are established by the network using capacitor $C_1$ and resistors $R_1$ and $R_2$. The RC combination of $R_1$ and $C_1$ establishes the period of the oscillator. The ratio of the $R_2$ to $R_1$ provides the duty cycle of the oscillator. The value of $R_2$ is approximately 100 times smaller than $R_1$ to establish a 1.0% duty cycle. As shown in the timing diagram of FIG. 8O, the clock signal CLK remains low while the $V_1 1$ signal ramps up. This ramp up time is the time it takes for the capacitor $C_1$ to charge through $R_1$. The clock signal CLK then goes HIGH for the shorter discharge time of the capacitor through $R_2$. By adjusting the duty cycle (i.e., increasing or decreasing the value of resistor $R_2$), the sensitivity of the object detection circuit can be tuned such that it activates consistently at a specified distance from the light transmission window of the bar code symbol reading device.

In accordance with the present invention, the purpose of object detection circuit 107 is to produce a first control activation signal $A_1=1$ upon determining that an object (e.g., product, document, etc.) is present within the object detection field of the bar code symbol reading device, and thus at least a portion of the scan field thereof. As illustrated in FIG. 8, the object detection circuit is activated (i.e., enabled) by enabling signal $E_O$ supplied from first control circuit $C_1$, and the object detection circuit provides the first control circuit $C_1$ with first control activation signal $A_1=1$ when an object residing in the scan field is detected. In the illustrative embodiment, an "active" technique of automatic object detection is employed, although it is understood that "passive" techniques may be used with acceptable results. As shown in FIG. 8, the object detection means of the system comprises two major subcomponents, namely object sensing circuit 106 and object detection circuit 107, both of which are locally controlled by control circuit $C_1$. In the illustrative embodiment, object sensing circuit comprises an IR LED 148 driven by an IR transmitter drive circuit 149, and an IR phototransistor (or photodiode) 150 activated by an IR receive biasing circuit 151. As shown in FIGS. 7D and 7F, these components are arranged and mounted on PC board 87 so as to provide an object detection field that spatially encompasses the laser scanning plane, as described above. As shown in FIG. 8, the object detection circuit 107 produces an enable signal IR DR which is provided to the IR transmitter drive circuit 149. The signal produced from IR phototransistor 151, identified as IR REC, is provided as input signal to the object detection circuit 107 for signal processing in a manner which will be described in detail below. In the illustrative embodiment, infrared LED 148 generates a 900 nanometer signal that is pulsed at the rate of the primary oscillation circuit 101 (e.g., 1.0 KHZ) when the object detection circuit is enabled by enable signal $E_O$ produced from the first control circuit $C_1$. Preferably, the duty cycle of the primary oscillation circuit 101 is less than 1.0% in order to keep the average current consumption very low.

Referring to FIG. 5F, it is noted that the pulsed optical signal from LED 148 is transmitted so as to broadly illuminate the scan field. When an object is present within the object detection portion of the scan field, a reflected optical pulse signal is produced and focused through focusing lens 153 onto photodiode 150. The function of photodiode 150 is to receive (i.e., sense) the reflected optical pulse signal and, in response thereto, produce a current signal IR REC.

As shown in FIG. 8H, produced current signal IR REC is provided as input to the current-to-voltage amplifier (e.g., transconductance amplifier) 155 in the object detection circuit, and is converted into a voltage signal $V_O$. Within the object detection circuit 107, the infra-red LED drive signal IR DR is produced as the output of AND gate 157, whose inputs are enabling signal $E_O$ supplied from the first control circuit $C_1$ and the pulsed clock signal CLK supplied from the primary oscillation circuit 101.

As shown in FIG. 8H, enabling signal $E_O$ is also provided to current-to-voltage amplifier circuit 155, and the output voltage signal from AND gate 157 is provided as the second input to the synchronous transmitter/receiver circuit 156. Notably, the output voltage signal from AND gate 157 and the output voltage signal $V_O$ from the current-to-voltage amplifier correspond to the IR pulse signal trains transmitted from and received by object sensing circuit 106. The function of the synchronous transmitter/receiver circuit is to cyclically compare the output voltage signal from AND gate 157 and the output voltage signal $V_O$ from the current-to-voltage amplifier, and if these voltage signals synchronously match each other for a minimum of three (3) consecutive cycles of the primary oscillation circuit 101, then synchronous transmitter/receiver circuit 156 produces as output, a first control activation signal $A_1=1$, indicative that an object is present in the scan field of the bar code symbol reading device. Conversely, whenever first control activation signal $A_1=0$ is produced, then this condition indicates that an object is not present in the scan field.

Alternatively, the automatic bar code reading device of the present invention can be readily adapted to sense ultrasonic energy reflected off an object present within the scan field. In such an alternative embodiment, object sensing circuit 106 is realized as an ultrasonic energy transmitting/receiving mechanism. In the housing of the bar code reading engine, ultrasonic energy is generated and transmitted forwardly into the scan field. Then, ultrasonic energy reflected off an object within the object detection field is detected adjacent to the transmission window using an ultrasonic energy detector that produces an analog electrical signal (i.e., UE REC) indicative of the detected intensity of received ultrasonic energy. Preferably, a focusing element is disposed in front of the energy detector in order to effectively maximize the collection of ultrasonic energy reflected off objects in the scan field. In such instances, the focusing element essentially determines the geometrical characteristics of the object detection field of the device. Consequently, the energy focusing (i.e., collecting) characteristics of the focusing element will be selected to provide an object detection field which spatially encompasses at least a portion of the scan field. The electrical signal produced from the ultrasonic-energy based object sensing circuit is provided to object detection circuit 107 for processing in the manner described above. Notably, the sensitivity (i.e., gain) of current-to-voltage amplifier 155 is controlled by a sensitivity control signal $E_{IRT}$ produced from a range control signal generating circuit (not shown).

In general, first control logic block $C_1$, provides the first level of system control. This control circuit activates the object detection circuit 107 by generating enable signal $E_0=1$, it activates laser beam scanning circuit 108, photoreceiving circuit 109 and A/D conversion circuit 110 by generating enable signal $E_1=1$, and it activates bar code symbol detection circuit 111 by generating enable signal $E_2=1$. In addition, the first control circuit $C_1$ provides control lines and signals in order to control these functions, and provides a system override function for the low power standby mode of the bar code symbol reading engine. In the illustrative embodiment, the specific operation of first control circuit $C_1$ is dependent on the state of several sets of input signals (i.e., activation control signal $A_0$ and $A_1$, and override signals $C_2/C_1$, $C_3/C_{1-2}$ and $C_3/C_{1-2}$) and an internally generated digital timer signal B. A preferred logic implementation of the first control circuit $C_1$ is set forth in FIGS. 8I and 8J. The functional dependencies among the digital signals in this circuit are represented by the Boolean logic expressions set forth in the Table of FIG. 8K, and therefore are sufficient to uniquely characterize the operation of first control circuit $C_1$.

As shown in FIG. 8I, first control circuit comprises a pair of logic inverters 161 and 162, an OR gate 163, a NAND gate 164, a NOR gate 165, an AND gate 166, and a digital timer circuit 167 which produces as output, a digital output signal B. As shown, digital timer circuit 167 comprises a flip-flop circuit 170, a NOR gate 171, a clock divide circuit 173, a comparator (i.e., differential) amplifier 172, and a NPN transistor 174. As illustrated, activation control signal $A_1$ is provided to the CLK input of flip-flop 170 by way of inverter 161. The QNOT output of the flip-flop is provided as one input to NOR gate 171, whereas the other input thereof is connected to the CLK input of clock divide circuit 173 and the output of comparator amplifier 172. The output of the NOR gate is connected to the base of transistor 174, while the emitter thereof is connected to the electrical ground and the collector is connected to the negative input of comparator amplifier 172 as well as the second timing network 105, in a manner similar to the interconnection of first timing network 102 to primary oscillation circuit 101. Also, the divided clock output (i.e., CLK/2048) produced from clock divide circuit 173 is provided to the CL input of flip-flop 170. As shown, the Q output of flip-flop 170 is connected to the reset (RST) input of the clock divide circuit 173 as well as to one input of OR gate 163, one input of NOR gate 165, and one input of AND gate 166. Notably, the Q output of the flip-flop is the digital output signal B indicated in each of the Boolean expressions set forth in the Table of FIG. 8K.

As shown in FIG. 8I, enable signal $A_0$ from the system override signal detection circuit 100 is provided as the second input to OR gate 163, and the output thereof is provided as input to NAND gate 164. The override signal $C_2/C_1$ from second control circuit $C_2$ is provided as the input to inverter 162, whereas the output thereof is provided as the second input to AND gate 166. The override signal $C_3/C_{1-1}$ from third control module $C_3$ is provided as the second input to NAND gate 164, whereas the output thereof produces enable signal $E_0$ for activating the object detection circuit 107. The override signal $C_3/C_{1-2}$ is provided to the second input to NOR gate 165, whereas the output thereof produces enable signal $E_1$ for activating laser scanning and photoreceiving circuits 108 and 109 and A/D conversion circuit 110. The output of AND gate 166 produces enable signal $E_2$ for activating bar code symbol detection circuit 111.

Referring to FIG. 8I, the operation of digital timer circuit will be described. The output voltage of comparator amplifier 172 keeps transistor 174 in its nonconducting state (i.e., OFF), via NOR gate 171, thus allowing the external RC network 105 to charge to capacity. When comparator input voltage Vx exceeds reference voltage VCC/2, the comparator output voltage biases (i.e., switches ON) transistor 174 so as to begin discharging the RC timing network 105, until input voltage Vx falls below reference voltage VCC/2 upon which the process repeats, thus generating a digital clock oscillation at the comparator output. The timing cycle of digital output signal B is initiated by a transition on the activation control signal $A_1$ which toggles flip-flop 170. This toggling action sets the digital output signal B to its logical HIGH state, resetting clock divide circuit 173 and starting the digital clock oscillator described above by toggling the Q output of flip-flop 170. As shown in FIG. 8R, clock divide circuit 173 is constructed by cascading eleven flip-flop circuits together in a conventional manner. Each stage of the clock divider circuit divides the input clock signal frequency by the factor 2. Thus the clock divider circuit provides an overall division factor of 2048. When the clock output CLK/2048 toggles, the flip-flop circuit is cleared thus setting the digital signal B to logical LOW until the next pulse of the activation control signal $A_1$.

As reflected in the Boolean expressions of FIG. 8K, the state of each of the enable signals $E_0$, $E_1$ and $E_2$ produced by the first control circuit $C_1$ is dependent on whether the bar code symbol reading system is in its override state of operation. To better understand the operation of control circuit $C_1$, it is helpful to consider a few control strategies performed thereby.

In the override state of operation of the system, enable signal $E_0$ can be unconditionally set to $E_0=1$ by the third control circuit $C_3$ setting override signal $C_3/C_1=0$. Under such conditions, the object detection circuit is enabled. Also, when the system override signal detection circuit is activated (i.e., $A_0=1$) or the laser scanning and photoreceiving circuits activated (i.e., B=1) and override signal $C_3/C_1-1=1$, then enable signal $E_0=1$ and therefore the object detection circuit is automatically deactivated. The advantage of this control strategy is that it is generally not desirable to have both the laser scanning circuit 108 and photoreceiving circuit 109 and the object sensing circuit 105 active at the same time, as the wavelength of the infrared LED 148 typically falls within the optical input spectrum of the photoreceiving circuit 109. In addition, less power is consumed when the object detection circuit 107 is inactive (i.e., disabled).

As illustrated in FIG. 8, laser scanning circuit 108 comprises a light source 177 which, in general, may be any source of intense light suitably selected for maximizing the reflectivity from the object bearing a bar code symbol. In the preferred embodiment, light source 177 comprises a solid-state visible laser diode (VLD) which is driven by a conventional driver circuit 178. In the illustrative embodiment, the wavelength of visible laser light produced from the laser diode is preferably about 670 nanometers. In order to repeatedly scan the produced laser beam over the scan field (having a predetermined spatial extent in front the light transmission window), planar x and y axis scanning mirrors 407A (and 407B) are rapidly oscillated back and forth by x and y drive coils 440A and 440B, respectively, driven by the x-y coil driver circuit 181 (or 181') of the present invention, as shown and described in detail hereinabove. To selectively activate both laser light source 177 and motor 180, laser diode and scanning driver enable signal $E_1$ is provided as input to driver circuits 178 and 181 (or 181'). When enable signal $E_1$ is a logical "high" level (i.e., $E_1=1$) a laser beam is generated and projected through the light transmissive window. When the projected laser beam is repeatedly scanned across the scan field in a rastered manner, and an optical scan data signal is thereby produced off the object (and bar code) residing within the scan field. When laser diode and scanning driver enable signal $E_1$ is a logical "low" (i.e., $E_1=0$), there is no laser beam produced, projected, or scanned across the scan field.

When a bar code symbol is present on the detected object at the time of scanning, the user visually aligns the visible laser beam across the bar code symbol and incident laser light on the bar code will be scattered and reflected. This scattering/reflection process produces a laser light return signal of variable intensity which, represents a spatial variation of light reflectivity characteristic of the pattern of bars and spaces comprising the bar code symbol. Photoreceiving circuit 109 detects at least a portion of the reflected laser light of variable intensity and produces an analog scan data$_1$ signicative of the detected light ninth illustrative embodiment, photoreceiving circuit 109 generally comprises a number of components, namely: a photoreceiver 185 (e.g., a silicon photosensor) mounted onto PC board 87, as shown in FIG. 5F, for detecting laser light focused by the light collection optics; a frequency selective filter 186A, mounted in front of photoreceiver 185, for transmitting thereto only optical radiation having wavelengths up to a small band above 670 nanometers; and optionally, laser light collection optics including, for example, a focusing lens or other optical element for focusing reflected laser light for subsequent detection by photoreceiver 185.

In order to prevent optical radiation slightly below 670 nanometers from passing through light transmission aperture 110 and entering the housing, a light transmissive window realized as a plastic filter lens 186B is installed over the light transmission aperture of the housing. This plastic filter lens has optical characteristics which transmit only optical radiation from slightly below 670 nanometers. In this way, the combination of plastic filter lens 186B at the transmission aperture and frequency selective filter 186A before photoreceiver 185 cooperate to form a narrow band-pass optical filter having a center frequency $f_c=670$ nanometers. By permitting only optical radiation associated with the visible laser beam to enter the housing, this optical arrangement provides improved signal-to-noise ratio for detected scan data signals $D_1$.

In response to reflected laser light focused onto photoreceiver 185, photoreceiver 185 produces an analog electrical signal which is proportional to the intensity of the detected laser light. This analog signal is subsequently amplified by preamplifier 187 to produce analog scan data signal $D_1$. In short, laser scanning circuit 108 and photoreceiving circuit 109 cooperate to generate analog scan data signals $D_1$ from the scan field, over time intervals specified by first control circuit $C_1$ during normal modes of operation, and by third control module $C_3$ during "control override" modes of operation.

As illustrated in FIG. 8, analog scan data signal $D_1$ is provided as input to A/D conversion circuit 110, shown in FIG. 8P. In a manner well known in the art, A/D conversion circuit 110 processes analog scan data signal $D_1$ to provide a digital scan data signal $D_2$ which has a waveform that resembles a pulse width modulated signal, where logical "1" signal levels represent spaces of the scanned bar code and logical "0" signal levels represent bars of the scanned bar code. A/D conversion circuit 110 can be realized using any conventional A/D conversion techniques well known in the art. Digitized scan data signal $D_2$ is then provided as input to bar code presence detection circuit 111 and symbol decoding module 119 for use in performing particular functions required during the bar code symbol reading process of the present invention.

The primary purpose of bar code presence detection circuit 111 is to determine whether a bar code is present in or absent from the scan field, over time intervals specified by first control circuit $C_1$ during normal modes of operation and by third control module $C_3$ during control override modes of operation. In the illustrative embodiment, bar code presence detection circuit 111 indirectly detects the presence of a bar code in the scan field by detecting its bar code symbol "envelope". In the illustrative embodiment, a bar code symbol envelope is deemed present in the scan field upon detecting a corresponding digital pulse sequence in digital signal $D_2$ that A/D conversion circuit 110 produces when photoreceiving circuit 109 detects laser light reflected off a bar code symbol scanned by the laser beam produced by laser beam scanning circuit 108. This digital pulse sequence detection process is achieved by counting the number of digital pulse transitions (i.e., falling pulse edges) that occur in digital scan data signal $D_2$ within a predetermined time period $T_1$ clocked by the bar code symbol detection circuit. According to the laws of physics governing the laser scanning operation, the number of digital (pulse-width modulated) pulses detectable at photoreceiver 185 during time period $T_1$ is a function of the distance of the bar code from the light transmission window 111 at the time of scanning. Thus a bar code symbol scanned at 6" from the light transmission window will produce a larger number of digital pulses (i.e., digital count) at photoreceiver 185 during time period $T_1$ than will the same bar code symbol scanned at 3" from the light transmission window.

As shown in FIG. 8M, bar code symbol presence detection circuit 111 comprises a digital pulse transition counter 190 for counting digital pulse transitions during time period $T_1$, and a digital clock circuit (i.e., $T_{BCD}$ circuit) 191 for measuring (i.e., counting) time period $T_{BCD}$ and producing a count reset signal CNT RESET at the end of each such time period, as shown in FIG. 8O. As shown in FIG. 8O, the function of digital clock circuit 191 is to provide a time period $T_{BCD}$ (i.e., time window subdivision) within which the bar code symbol detection circuit attempts, repeatedly during time period $T_1$, to detect a bar code symbol in the scan field. In the preferred embodiment, $T_{BCD}$ is about 0.1 seconds, whereas $T_1$ is about 1.0 second. As shown in FIG. 8O, in order to establish such "bar code search" time subintervals within time period $T_1$, the digital clock circuit 191 generates the first count reset pulse signal CNT RESET upon the detection of the first pulse transition in digital scan data signal $D_2$. The effect of this reset signal is to clear or reset the digital pulse transition (falling edge) counter. Then at the end of each time subinterval $T_{BCD}$, digital clock signal 191 generates another count reset pulse CNT RESET to reset the digital pulse transition counter. If during time window $T_1$, a sufficient number of pulse transitions in signal $D_2$ are counted over a subinterval $T_{BCD}$, then either control activation signal $A_{2L}$ or $A_{2S}$ will be set to "1". In response to the detection of this condition, second control circuit $C_2$ automatically enables control activation $C_3$ in order to initiate a transition from the bar code symbol detection state of operation to the bar code symbol reading state of operation.

As shown in FIG. 8M, digital pulse transition counter 191 is formed by wiring together a series of three flip-flop circuits 192 to 194, such that each flip flop divides the clock signal frequency of the previous stage by a factor of 2. As indicated in the drawing of FIG. 8N, the Q output of flip flops 192 to 194 represent the binary digits 2, 4, 8, and 16 respectively, of a binary number (i.e., counting) system. As shown, enable signal $E_2$ from first control circuit $C_1$ is provided as input to NOR gate 197, while the second input thereto is the counter reset signal CNT RESET provided from the digital counter circuit 191. In order to reset or clear the pulse transition counter circuit 190 upon the generation of each CNT RESET pulse, the output of the NOR gate 197 is connected to the clear line (CL) of each flip flop 192 to 194, as shown.

As illustrated in FIG. 8M, digital clock circuit 191 comprises a flip-flop circuit 198, a NOR gate 199, a clock divide circuit 200, a comparator 201, and a NPN transistor 202. As illustrated, digital scan data signal $D_2$ is directly provided to the CLK input of flip-flop 198. The QNOT output of the flip-flop is provided as one input to NOR gate 199, whereas the Q output thereof is connected to the CLK input of clock divide circuit 200 and the second input of NOR gate 197. The other input of NOR gate 199 is connected to the input line CLK of clock divide circuit 200 and to the output of comparator 201, as shown. The output of the NOR gate is connected to the base of transistor 202, while the emitter thereof is connected to electrical ground and the collector is connected to the negative input of comparator 201 as well as to the third timing network 112, in a manner similar to the interconnection of the first timing network 102 to primary oscillation circuit 101. As shown in FIG. 8N, clock divide circuit 200 is realized as series of five flip-flops 200A to 200E wired together so as to divide digital clock input signal CLOCK by 32, and be resettable by pulsing reset line RESET in a conventional manner.

When an object is detected in the scan field, first control circuit $C_1$ produces enable signal $E_2=1$ so as to enable digital pulse transition counter 190 for a time duration of $T_1$. As shown, the digital scan data signal $D_2$ (representing the bars and spaces of the scanned bar code) drives the clock line of first flip flop 192, as well as the clock line of flip flop 198 in the $T_{BCD}$ timer circuit. The first pulse transition in digital scan data signal $D_2$ starts digital timer circuit 191. The production of each count reset pulse CNT RESET from digital timer circuit 191 automatically clears the digital pulse transition counter circuit 190, resetting it once again to count the number of pulse transitions present in the incoming digital scan data signal $D_2$ over a new time subinterval $T_{BCD}$. The Q output corresponding to eight pulse transitions counted during time period $T_{BCD}$, provides control activation signal $A_2$. When the presence of a bar code in the scan field is detected, second activation control signal $A_2$ is generated, third control circuit $C_3$ is activated and second control circuit $C_2$ is overridden by third control circuit $C_3$ through the transmission of control override signals (i.e., $C_3/C_2$ inhibit and $C_3/C_1$ enable signals) from the third control circuit $C_3$.

As illustrated in FIG. 8P, second control circuit $C_2$ is realized using logic circuitry consisting of NAND gates 205 to 208, invertors 209 and 210, NOR gates 211 to 213, NAND gates 214 and 215, AND gate 216, configured together as shown. As shown, second control activation signals $A_{2S}$ and $A_{2L}$ are provided to the first inputs of NAND gates 214 and 215, respectively, whereas the outputs of NOR gates 211 and 212 are provided to the second inputs of NAND gates 214 and 215 respectively. The outputs of NAND gates 214 and 215 are provided to the inputs of AND gate 216 and the output thereof provides enable signal $E_3$ for enabling third control module $C_3$.

As shown in FIG. 8P, the third control module $C_3$ provides override signals $C_3/C_{2-1}$ and $C_3/C_{2-2}$ to the first and second inputs of NAND gate 205 and to the first input of NAND gate 207 and the first input of NAND gate 208, respectively. The range selection signal R produced from range selection circuit 115 is provided as input to NAND gate 206. As shown, output of NAND gate 205 is provided as the second input to NAND gate 206. The output of NAND gate 206 is provided as the second input to NAND gate 207 and the second input to NAND gate 208. As shown in FIG. 8P, the output of NAND gate 207 is provided as an input to NOR gate 211 and inverter 209, whereas the output of NAND gate 208 is provided as inputs to NOR gates 211 and 212 and inverter 210. The output of inverter 209 is provided as the other input to NOR gate 212 and one input to NOR gate 213. The output of inverter 210 is provided as another input to NOR gate 213, whereas the output thereof provides control override signal $C_2/C_1$. So configured, the combinational logic of the second control circuit $C_2$ maps its input signals to its output signals in accordance with the logic table of FIG. 8Q.

Upon entering the bar code symbol reading state, third control module $C_3$ provides override control signal $C_3/C_1$ to first control circuit $C_1$ and second control circuit $C_2$. In response to control signal $C_3/C_1$, the first control circuit $C_1$ produces enable signal $E_1=1$ which enables scanning circuit, 109 photo-receiving circuit 109 and A/D conversion circuit 110. In response to control signal $C_3/C_2$, the second control circuit $C_2$ produces enable signal $E_2=0$, which disables bar code symbol detector circuit 111. Thereafter, third control module $C_3$ produces enable signal $E_4$ to enable symbol decoding module 119. In response to the production of such signals, the symbol decoding module decode processes, scan line by scan line, the stream of digitized scan data contained in signal $D_2$ in an attempt to decode the detected bar code symbol within the second predetermined time period $T_2$ established and monitored by the third control module $C_3$. If the symbol decoding module 119 successfully decodes the detected bar code symbol within time period $T_2$, then symbol character data $D_3$ (representative of the decoded bar code symbol and typically in ASCII code format) is produced. Thereupon symbol decoding module 119 produces and provides the third control activation signal $A_3$ to the third control module $C_3$ in order to induce a transition from the bar code symbol reading state to the data packet transmission state. In response thereto, two distinct events occur. First the third control module $C_3$ produces and provides enable signal $E_5$ to data packet synthesis module 120. Secondly, symbol decoding module 119 stores symbol character data $D_3$ in a memory buffer associated with data packet synthesis module 120.

In the illustrated embodiment, symbol decoding module 119, data packet synthesis module 120, and timers $T_2$, $T_3$, $T_4$ and T5 are each realized using programmed microprocessor and accessible memory 134. Similarly, third control module $C_3$ and the control functions which it performs at Blocks I to GG shown in FIGS. 13A and 13CC, are realized as a programming implementation using techniques well known in the art.

The function of data packet synthesis module 120 is to use the produced symbol character data to synthesize a group of data packets for subsequent transmission to its mated base unit by way of data packet transmission circuit 121.

For purposes of illustration, the case of transmitting data contained in a 1-D bar code symbol will be considered with reference to the data packet format description shown in FIG. 8R. In particular, each data packet in each data packet group comprises a number of data fields, namely: Start of Packet Field 220 for containing a digital code indicating the beginning of the transmitted data packet; Transmitter Identification Number Field 221 for containing a digital code representative of the Transmitting Bar Code Symbol Reader; Data Packet Group Number Field 222 for containing a digital code (i.e., a first module number) assigned to each particular data packet group being transmitted; Data Packet Transmission No. Field 223 for containing a digital code (i.e., a second module number) assigned to each data packet in each data packet group being transmitted; Symbol Character Data Field 224 for containing digital code representative of the symbol character data being transmitted to the base unit; Error Correction Code Field 225 for containing a digital error correction code for use by the receiving base unit to determine if error in data packet transmission has occurred; and End of Packet Field for 226 for containing a digital code indicating the end of the transmitted data packet.

Figure 9:
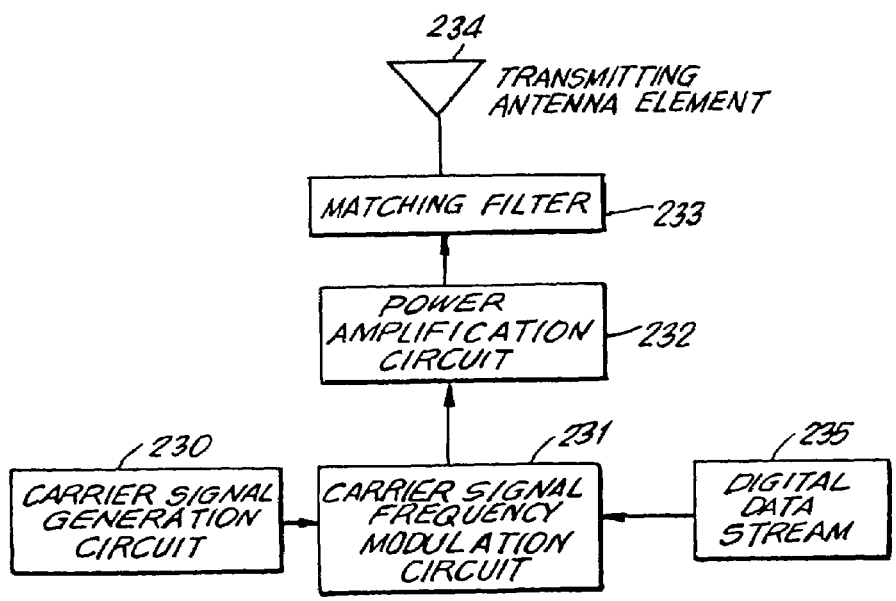
FIG. 9 is a functional block diagram of the data packet transmission circuit of the bar code symbol reading system of the present invention.

After the data packet synthesis module synthesizes a group of data packets as described above, the third control module $C_3$ provides enable signal $E_7$ to data packet transmission circuit 121. As illustrated in FIG. 9, the data packet transmission circuit comprises a carrier signal generation circuit 230, a carrier signal frequency modulation circuit 231, a power amplifier 232, a matching filter 233, and a quarterwave ($\lambda/4$) transmitting antenna element 234. The function of the carrier signal generation circuit 230 is to generate a carrier signal having a frequency in the RF region of the electromagnetic spectrum. In the illustrative embodiment, the carrier frequency is about 912 Mhz, although it is understood that this frequency may vary from one embodiment of the present invention, to another embodiment thereof. As the carrier signal is being transmitted from transmitting antenna 234, frequency modulation circuitry 231 modulates the instantaneous frequency of the carrier signal using the digital data sequence (i.e., digital data stream) 235 constituting the group of data packets synthesized by the data packet synthesis module 120. The function of the power amplifier is to amplify the power of the transmitted modulated carrier signal so that it may be received by a base unit of the present invention located within a predetermined data transmission range (e.g., from about 0 to about 30 feet), illustrated in FIG. 2 in particular.

In general, each base unit of the present invention performs a number of functions. First, the base unit receives the modulated carrier signal transmitted from a hand-supportable bar code symbol reading device within the data reception range of the base unit. Secondly, the base unit demodulates the received carrier signal to recover the data packet modulated thereunto during signal transmission. Thirdly, the base unit analyzes each of the recovered data packets to determine whether the received carrier signal was transmitted from a hand-supportable bar code symbol reading device preassigned to the receiving base unit. Fourthly, the base unit recovers the symbol character data from at least one data packet in a transmitted group of data packets, and ascertaining the reliability of the recovered symbol character data. Fifthly, the base unit generates an acoustical acknowledgement signal $S_{ACK}$ that can be audibly perceived by the operator of the transmitting bar code symbol reading device while located in the data reception range of the base unit. Finally, the base unit transmits the received symbol character data to a host computer system or like device. Each of these functions will be described in greater detail during the detailed description of the Main System Control Routine set forth in FIGS. 13A to 13CC.

In order to better understand the functions performed by the bar code symbol reading device and base unit of the present invention, it will be helpful to first describe the principles underlying the data communication method of the present invention, and thereafter discuss the role that the base unit plays in carrying out this communication method.

In a typical application of the present invention, a (resultant) system of bar code symbol reading subsystems is installed in physical proximity with each other. Typically each system is a point of sale (POS) station including a host computer system interfaced with a base unit of the present invention and an automatic hand-supportable bar code symbol reading device preassigned to one of the base units. To register (i.e., associate) each bar code symbol reading device with a preassigned base unit, each bar code symbol reading device is preassigned a unique "Transmitter Identification Code" which is stored in a memory in the assigned base unit during a set-up procedure. In the illustrative embodiment, the carrier frequency of the data packet transmitter in each bar code symbol reading device is substantially the same for all bar code symbol reading devices in the resultant system. Also, the data packet transmission range of each bar code symbol reading device will be substantially greater than the distance between each bar code symbol reading device and a neighboring base unit to which the bar code symbol reading unit is not assigned. Consequently, under such operating conditions, at any instance in time, any base station in the resultant system may simultaneously receive two or more packet modulated carrier signals which have been transmitted from two or more bar code symbol reading devices being used in the resultant system. These bar code symbol reading devices may include the bar code symbol reading device preassigned to the particular base unit as well as neighboring bar code symbol reading devices. Thus due to the principles of data packet transmission of present invention, there exists the possibility that any particular base unit may simultaneously receive two or more different data packets at any instant in time, thereby creating a "packet interference" situation.

Figure 10:
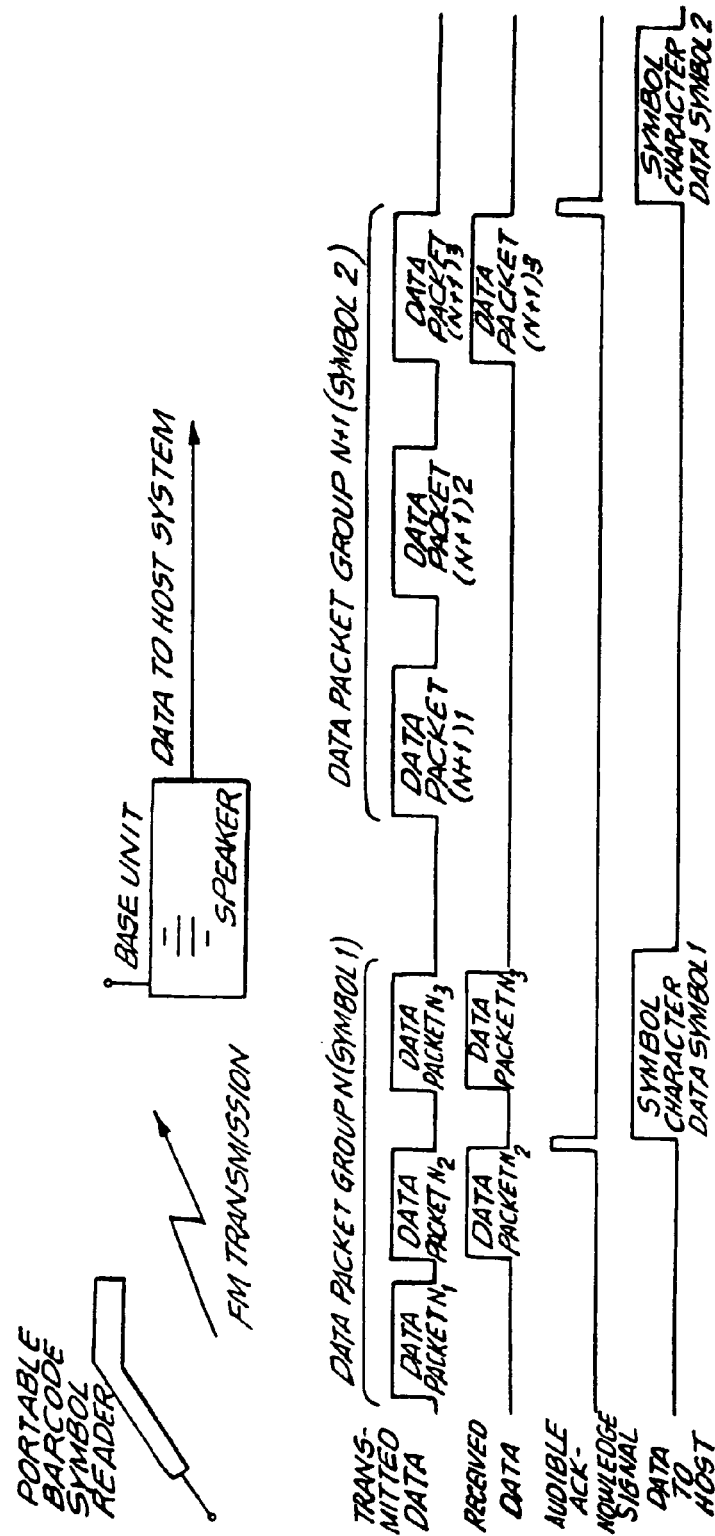
FIG. 10 is a schematic representation illustrating several groups of data packets transmitted from the bar code symbol reading device hereof in accordance with the principles of data packet transmission and reception scheme of the present invention.

In order to ensure that each base unit in the resultant system is capable of receiving at least one data packet from a data packet group transmitted by its preassigned bar code symbol reading device (i.e., without risk of interference from neighboring bar code symbol reading device transmitters), the unique "data packet group" transmission scheme shown in FIG. 10 is employed. As shown, upon the successful reading of a first bar code symbol and the production of its symbol character data $D_3$, data packet synthesis module 120 aboard the bar code symbol reading device automatically produces a first (i.e., N=1) group of (three) data packets, each having the packet format shown in FIG. 9. Thereafter, the data packet transmission circuit 121 uses the digital data bit stream, representative of the synthesized data packet group, to modulate a carrier signal transmitted from the hand-supportable bar code symbol reading device.

In the illustrative example shown FIG. 10, only the second and third data packets of the group sent over the modulated carrier signal are shown as being received by the preassigned base unit. As shown in this drawing, the base unit transmits the recovered symbol character data $D_3$ to its host computer system, upon receiving the second data packet in the transmitted group of data packets. Thereafter, the base unit produces an acoustical acknowledgement signal $S_{ACK}$ of sufficient intensity that it can be easily heard by the operator of the bar code symbol reading device that transmitted the received data packet. The function of the acoustical acknowledgment signal is to provide the operator with an audible acknowledgement that the symbol character data $D_3$ (associated with the recently read bar code symbol) has been received by the base unit and transmitted to its host computer system for processing and or subsequent storage. Notably, while the third data packet $N_3$ is also received by the base unit, the available acknowledgement signal $S_{ACK}$ and symbol character data transmission is not produced as packet $N_3$ contains redundant information already received by the second packet $N_2$ of the same group.

In the preferred embodiment, the pitch of the transmitted acoustical acknowledgement signal $S_{ACK}$ is uniquely specified and assigned to a particular bar code symbol reading unit. This way the operator of each bar code symbol reading (sub)system can easily recognize (i.e., discern) the audible acoustical acknowledgement signal produced from the base unit preassigned to his or her bar code symbol reading device. At the same time, this pitch assignment scheme allows each operator to ignore audible acoustical acknowledgment signals produced from neighboring base units not mated with his or her portable bar code symbol reading device. If after reading a bar code symbol, the operator does not see the visual "good read" indication light on its device "flash" or "blink" and immediately thereafter hear its preassigned acoustical acknowledgement signal emanate from its base unit, then the operator is implicitly informed that the symbol character data of the read bar code symbol was not successfully received by the base unit. In response to such an event, the operator simply rereads the bar code symbol and awaits to hear the acoustical acknowledgment signal emanating from the base unit.

Notably, it may even be desirable in some operating environments to produce acoustical acknowledgement signals in the form of a unique series of notes preassigned to a bar code symbol reading device and its "mated" base unit. The pitch or note sequence assigned to each mated base unit and bar code symbol reading device can be stored in a memory (e.g., EPROM) realized in the base unit, and can be programmed at the time of system set-up and modified as required. Preferably, each pitch and each note sequence is selected so that it can be readily distinguished and recognized by the operator to which it is uniquely directed.

Also shown in FIG. 10 is the case where the bar code symbol reading device reads a second bar code symbol and then transmits a second (N=2) group of data packets. However, due to interference only the third data packet in the second transmitted group of data packets is received at the respective base unit. Despite such group transmission errors (e.g., due to channel corruption or non-radio transmissive obstructions), the base unit as shown is nevertheless able to recover the transmitted symbol character data. Upon receiving the third data packet, recovering the packaged symbol character data and transmitting the same to the host computer system, the bar code symbol reading device generates an acoustical acknowledgement signal having a pitch or note sequence that the operator can hear and recognize as an indication that the data packet reception was successful.

Figure 11:
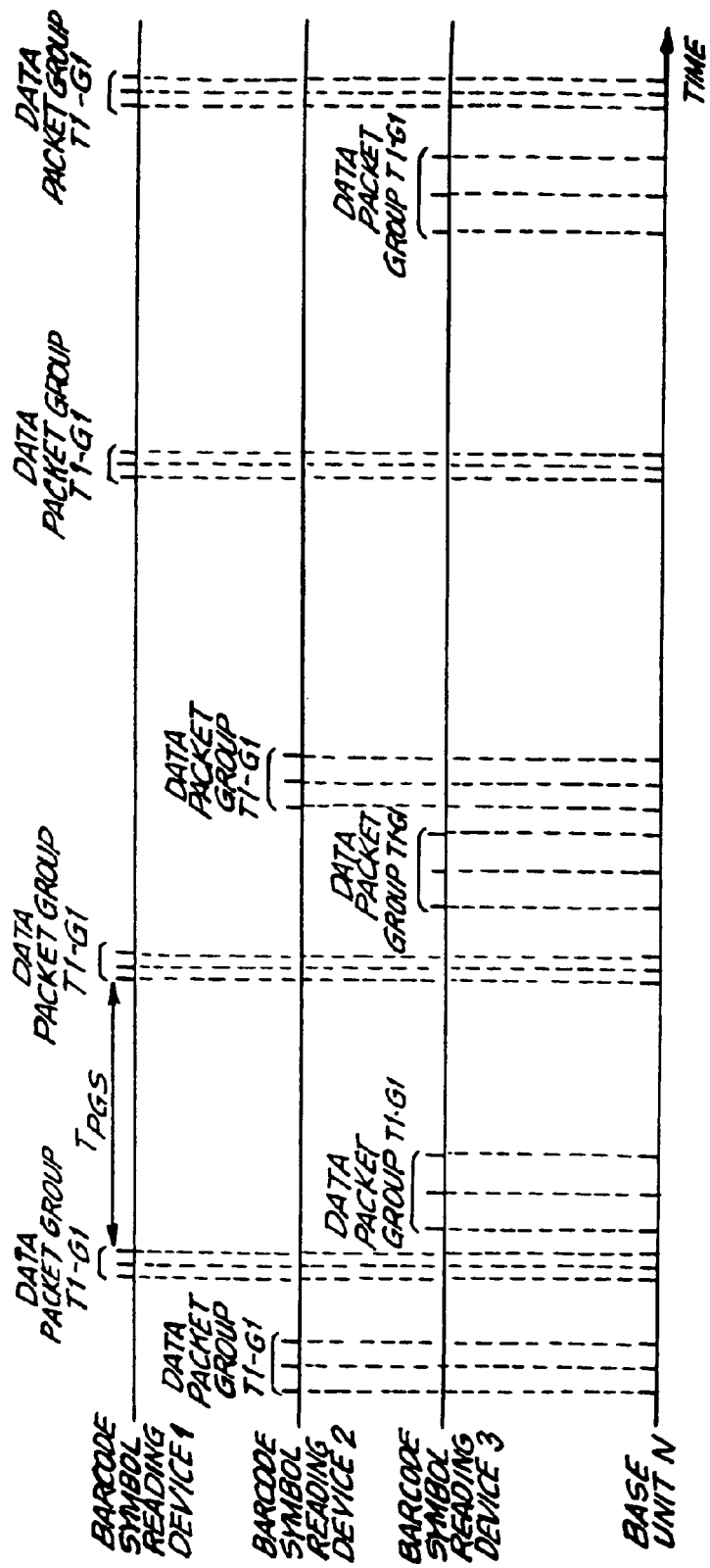
FIG. 11 is a schematic representation of an exemplary set of groups of data packet pseudo randomly transmitted from neighboring bar code symbol reading devices, and received at one base unit in physical proximity therewith.
Figure 12:
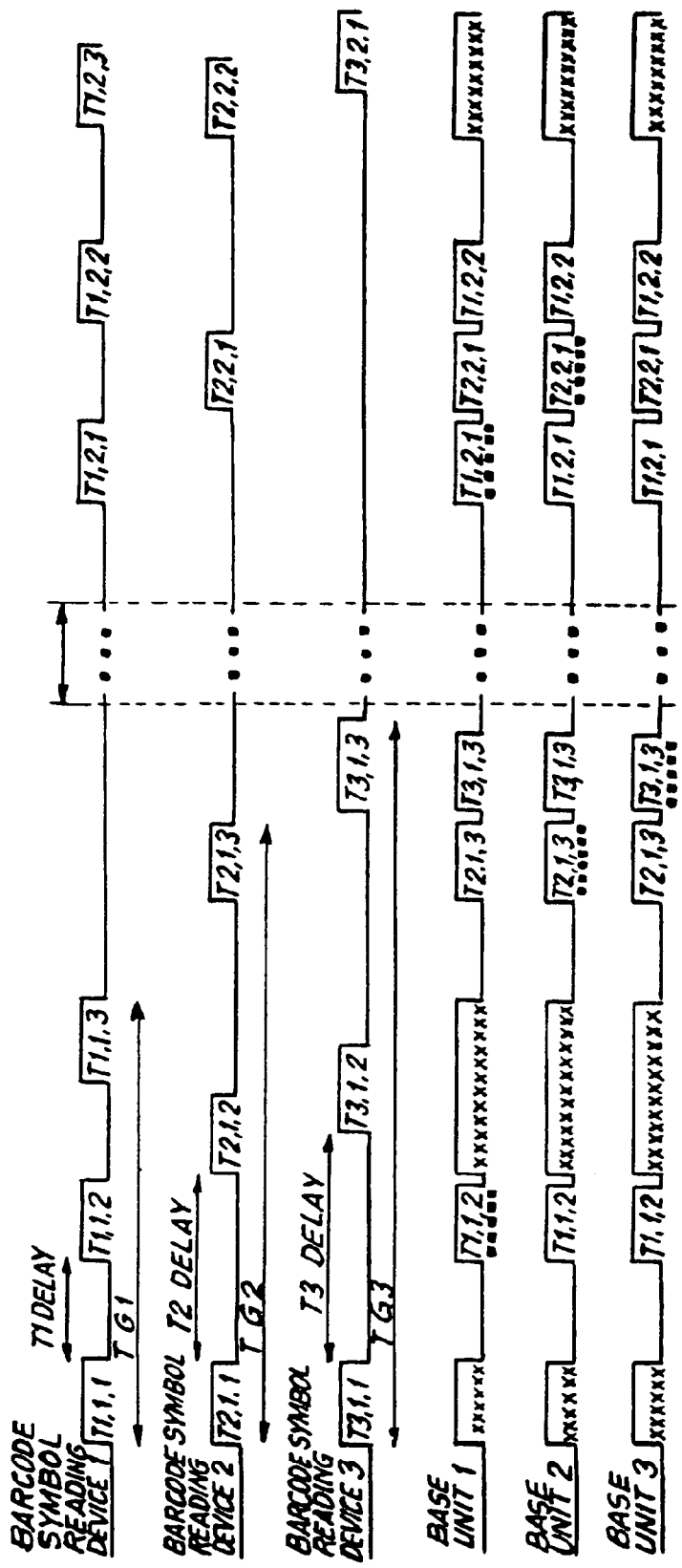
FIG. 12 is a schematic representation of an exemplary set of data packets simultaneously transmitted from three neighboring bar code symbol reading devices of the present invention, and received at the associated base units assigned thereto.

In FIGS. 11 and 12, the data packet transmission and reception scheme of the present invention is shown for the case of a three station system. In the best case scenario shown in FIG. 11, the group of data packets transmitted from each bar code symbol reading device is transmitted at a time when there are no neighboring bar code symbol reading devices transmitting data packets. This case will occur most frequently, as the total transmission times for each group of data packets is selected to be substantially smaller than the random time durations lapsing naturally between adjacent data packet transmissions from neighboring bar code symbol reading devices. This fact is illustrated in FIG. 11, in which (i) a group of data packets from bar code reading device No. 1 are transmitted between adjacent groups of data packet transmitted from bar code symbol reading devices Nos. 2, 3 and 4 without the occurrence of data packet interference (i.e., collision). In most instances, the time delay between consecutive groups of data packets transmitted from any particular bar code symbol reading device, will be sufficient to permit a neighboring bar code symbol reading device to transmit at least one data packet to its base unit without the occurrence of data packet interference.

In accordance with the data transmission scheme of the present invention, data packet interference is minimized by the random presence of interference-free time slots, during which a transmitted data packet can be received at its respective base unit without neighboring packet interference. However, the present invention employs additional measures to further reduce the likelihood of data packet interference. Such measures are best appreciated when considering a high-density data packet transmission environment, in which a number of closely situated neighboring bar code symbol readers are each attempting to transmit a group of data packets to its preassigned base unit. In general, such operating conditions would present a worst case scenario for the data packet transmission scheme of the present invention.

In the worst case scenario shown in FIG. 12, each of the four neighboring bar code symbol reading devices is assumed to consecutively read two bar code symbols and simultaneously begin the transmission of the first data packet in the first group of data packets corresponding to the first read bar code symbol. As mentioned above, each data packet is formatted essentially the same way, has substantially the same packet width, and is transmitted on a carrier signal having a frequency which is substantially the same as all other carrier signals transmitted throughout the system. In accordance with the principles of the present invention, the data packet transmission circuit 121 in each bar code symbol reading device is preprogrammed to transmit adjacent data packets with a different "time delay", as shown in FIG. 12. This condition is achieved throughout the resulting system by assigning a different Packet time Delay to each having a different Transmitter Identification Number, and then programming the bar code symbol reading device with the preassigned Packet Time Delay parameter. As illustrated in FIG. 12, the value of the Packet Time Delay parameter programmed in each bar code symbol reading device is selected so that, when the neighboring bar code symbol reading devices simultaneously transmit groups of data packets, each base unit in the resulting system is capable of receiving at least one data packet (in a group thereof) that has been transmitted from its preassigned bar code symbol reading device. In general, the data packet delay scheme of the present invention involves selecting and programming the Packet Time Delay parameter in each bar code symbol reading device so that each base unit is periodically provided a vacant time slot, during which one transmitted data packet in each group thereof can be received free of "data packet interference", as shown in FIG. 12. The advantage of providing a packet time delay among the data packets of each transmitted group thereof is that rereading and retransmission of bar code symbols is effectively minimized under the data packet transmission scheme of the present invention.

Having described the detailed structure and internal functions of automatic bar code symbol reading device of the present invention, the operation of the control system thereof will now be described while referring to the system block diagram shown in FIG. 8 and control Blocks A to GG in FIGS. 13A to 13C.

Figure 13A:
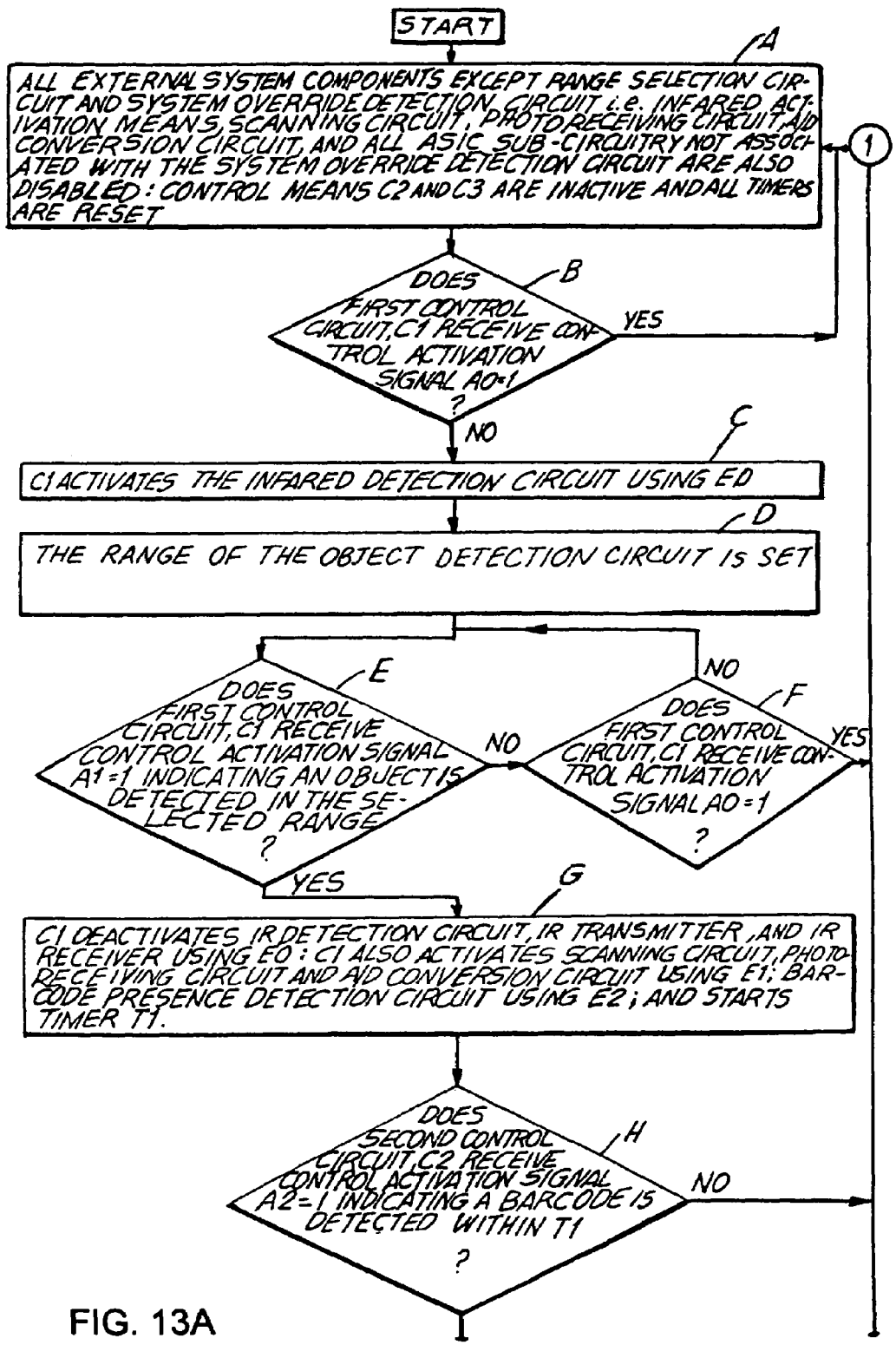
FIGS. 13A to 13C, taken together, show a high level flow chart of the control process performed by the control subsystem of the bar code symbol reading device, illustrating various modes of object detection, bar code presence detection and bar code symbol reading.
Figure 13A:
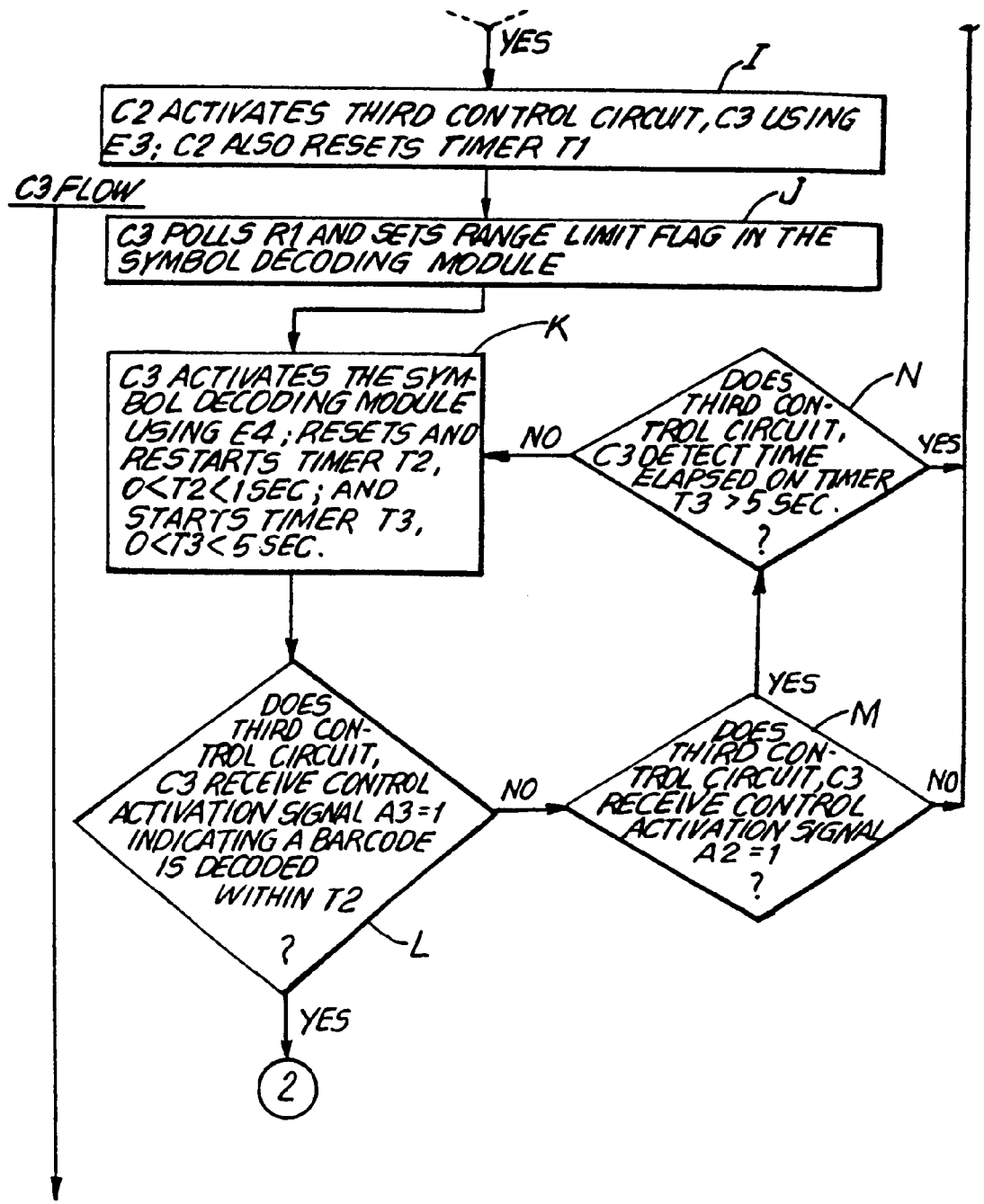

Beginning at the START block of Main System Control Routine and proceeding to Block A of FIG. 13A, the bar code symbol reading system is "initialized". This initialization step involves activating system override circuit 100, first control circuit $C_1$ and oscillator circuit 101. It also involves deactivating (i.e., disabling): (i) all external system components except the range selection circuit 115 and OO/OFF switch 103 (i.e., infrared sensing circuit 105, laser scanning circuit 108, and photoreceiving circuit 109); (ii) all subcircuits aboard ASIC chip 133 not associated with the system override circuit 100, such as object detection circuit 107, A/D conversion circuitry 110, second control circuit $C_2$ and bar code presence detection circuit 111; and (iii) third control module 114, symbol decoding module 119 and data packet synthesis module 120. In addition, all timers $T_1$, $T_2$, $T_3$, $T_4$, and $T_5$ are reset to t=0.

Proceeding to Block B in FIG. 13A, the first control circuit $C_1$ checks to determine whether it has received control activation signal $A_0$=1 from system override detection circuit 100. If this signal is received, then the first control circuit $C_1$ returns to Block A. If control activation signal $A_0$=1 is not received, then at Block C the first control circuit $C_1$ activates (i.e., enables) the object detection circuit by producing $E_0$. At Block D, optionally, the range of the object detection circuit is set by the user via external means, or other manner. At Block E, the first control circuit $C_1$ determines whether it has received control activation signal $A_1$=1, indicating that an object has been detected within the selected range of the scan field. If this control activation signal is not received, then at Block F the first control circuit $C_1$ determines whether its has received control activation signal $A_0$=1. If the first control circuit C, has received control activation signal $A_0$=1, then the control system returns to Block A in FIG. 13A, as shown. If the first control circuit $C_1$ has not received control activation signal $A_0$=1, then the control system returns to Block E, as shown.

If at Block E the first control circuit $C_1$ has received first control activation signal $A_1$=1, then at Block G the first control circuit $C_1$ (i) deactivates (i.e., disables) the object sensing circuit and the object detection circuit using disabling signal $E_0$=0, (ii) activates (i.e., enables) laser scanning circuit 108, photoreceiving circuit 109 and A/D signal conversion circuit 110 using enable signal $E_1$=1, (iii) activates bar code detection circuit 111 and second control circuit $C_2$ using enable signal $E_2$=1, and (iv) starts timer $T_1$ maintained in the first control circuit $C_1$. This permits the bar code symbol reading device to collect and analyze scan data signals for the purpose of determining whether or not a bar code is within the scan field. If at Block H the second control circuit $C_2$ does not receive control activation signal $A_{2S}$=1 or $A_{2L}$=1 from the bar code detection circuit within time period $T_1$, indicating that a bar code symbol is detected in the scan field, then the control system returns to Block A thereby returning system control to the first control unit $C_1$, as shown in FIG. 13A. If at Block H the bar code symbol detection circuit 111 provides the second control circuit $C_2$ with control activation signal $A_{2S}$=1 or $A_{2L}$=1, as the case may be, then second control circuit $C_2$ activates (i.e., enables) third control module $C_3$ (i.e., microprocessor 134) using enable signal $E_3$=1.

At Block J, the third control module $C_3$ polls (i.e., reads) the parameter R set by range selection circuit 115 and sets a range limit flag in the symbol decoding module 119. At Block K third control module $C_3$ activates the symbol decoding module 119 using enable signal $E_4$, resets and restarts timer $T_2$ permitting it to run for a second predetermined time period (e.g., $0<T_2<1$ second), and resets and restarts timer $T_3$ permitting it to run for a third predetermined time period (e.g., $0<T_3<5$ seconds). At Block L, the third control module checks to determine whether control activation signal $A_3$=1 is received from the symbol decoding module 119 within $T_2$=1 second, indicating that a bar code symbol has been successfully read (i.e., scanned and decoded) within the allotted time period. If control activation signal $A_3$=1 is not received within the time period $T_2$=1 second, then at Block M third control module $C_3$ checks to determine whether control activating signal $A_2$=1 is received. If a bar code symbol is not detected, then the control system returns to Block A, causing a state transition from bar code reading to object detection. However, if at Block M the third control module $C_3$ receives control activation signal $A_2$=1, indicating that a bar code once again is within the scan field, then at Block N the third control module $C_3$ checks to determine whether time period $T_3$ has elapsed. If it has, then the control system returns to Block A. If, however, time period $0 \leq T_3 \leq 5$ seconds has not elapsed, then at Block K the third control module $C_3$ resets and restarts timer $T_2$ to run once again for a time period $0 \leq T_2 \leq 1$ second, while $T_3$ continues to run. In essence, this provides the device at least another opportunity to read a bar code present within the scan field when the control system is at control Block L. During typical bar code reading applications, the control system may progress through the control loop defined by Blocks K-L-M-N-K several times before a bar code symbol in the scan field is read within the time period allotted by timer $T_3$.

Figure 13B:
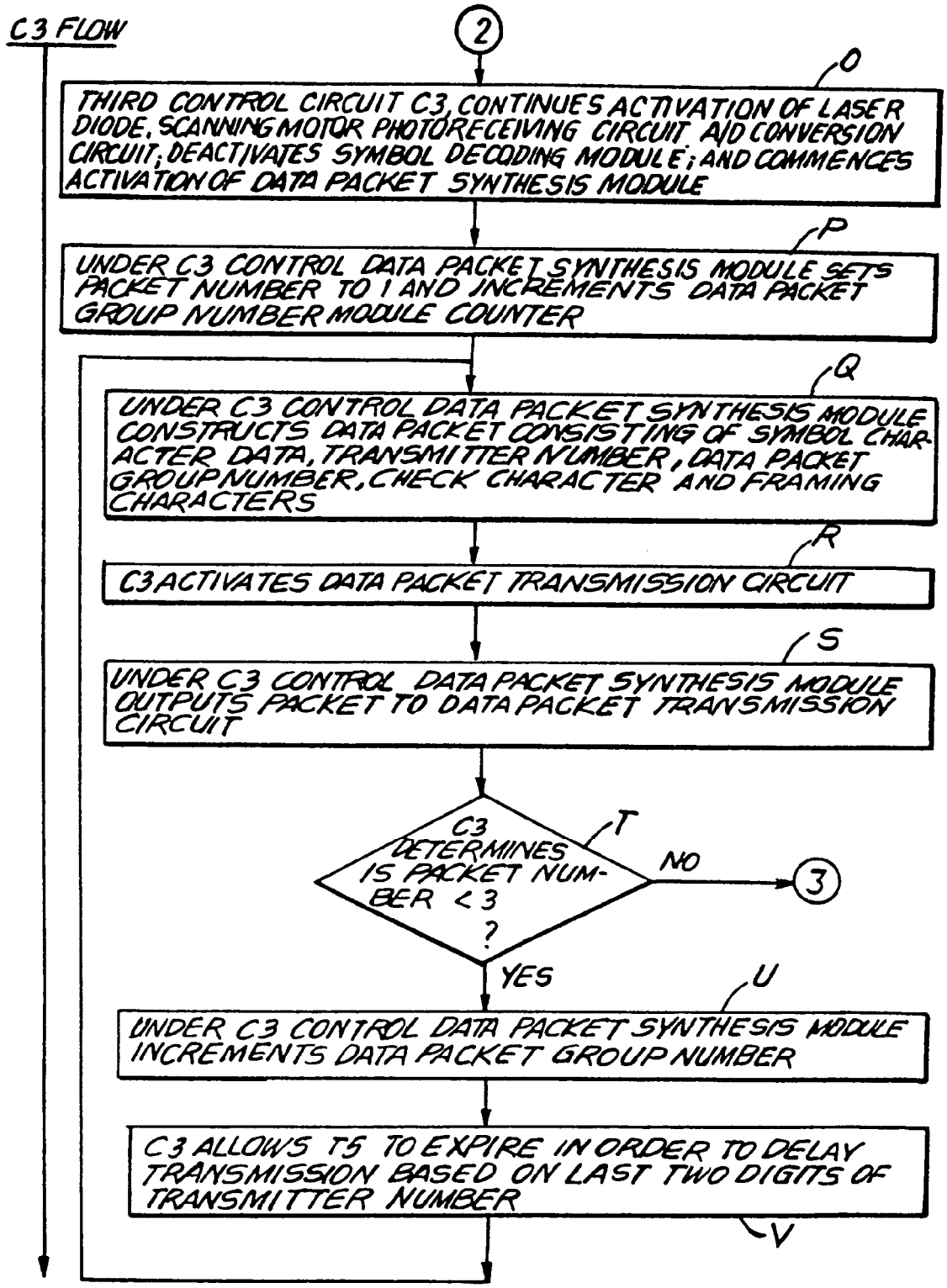

Upon receiving control activation signal $A_3=1$ from symbol decoding module 119, indicative that a bar code symbol has been successfully read, the control system proceeds to Block O in FIG. 13B. At this stage of the system control process, the third control module $C_3$ continues activation of laser scanning circuit 108, photoreceiving circuit 109, and A/D conversion circuit 110, while deactivating symbol decoding module 119 and commencing activation of data packet synthesis module 120. While the laser beam is continuously scanned across the scan field, the operations at Blocks P to V described below, are carried out in a high speed manner under the orchestration of control module $C_3$.

As indicated at Block P, data packet synthesis module 120 first sets the Packet Number to "1", and increments the Packet Group Number from the previous number. Preferably, the data packet synthesis module keeps track of (i.e., manages) the "Packet Number" using a first modulo-N counter realized by programmable microprocessor 134, while it manages the "Packet Group Number" using a second modulo-M counter also realized by programmed microprocessor 134. In the illustrative embodiment, the first modulo counter has a cyclical count range of N=2 (i.e., 0, 1, 2, 0, 1, 2, . . . ), whereas the second modulo counter has a cyclical count range of M=10 (i.e., 0, 1, 2, 3, 4, 5, 6, 7, 8, 9, 0, 1, 2, . . . ). At Block Q, the data packet synthesis module synthesizes or constructs a data packet having a packet format as shown in FIG. 9, i.e., consisting of symbol character data, a Transmitter Identification Number, a Packet Number, a Packet Group Number, check character, and Packet Start and End (i.e., framing) Characters. After the data packet has been formed and the digital data sequence constituting the same is buffered, the third control module $C_3$ activates at Block R the data packet transmission circuit. Thereafter at Block S, the data packet synthesis module outputs the buffered digital data sequence (of the first synthesized data packet of the group) to the data packet transmission circuit, which uses the digital data sequence to modulate the frequency of the carrier signal as it is being transmitted from the bar code symbol reading device, to its mated base unit, as described hereinabove, and then automatically deactivates itself to conserve power.

At Block T, the third control module $C_3$ determines whether the Packet Number counted by the first module counter is less than "3". If the Packet Number of the recently transmitted data packet is less than "3", indicative that at most only two data packets in a specific group have been transmitted, then at Block U the data packet synthesis module 120 increments the Packet Number by +1. At Block V, the third control module then waits for a time delay $T_5$ to lapse prior to the control system returning to Block Q, as shown in FIG. 13B. Notably, the occurrence of time delay $T_5$ causes a delay in transmission of the next data packet in the data packet group. As illustrated in FIG. 12, the duration of time delay $T_5$ is a function of the (last two digits of the) Transmitter Number of the current data packet group, and thus is a function of the bar code symbol reading device transmitting symbol character data to its mated base unit. For the case of three data packet groups, time delay $T_5$ will occur between the transmission of the first and second data packets in a packet group and between the transmission of the second and third data packets in the same packet group.

Returning to Block Q, the data packet synthesis module synthesizes or constructs the second data packet in the same data packet group. After the second data packet has been formed and the digital data sequence constituting the same is buffered, the third control module $C_3$ reactivates at Block R the data packet transmission circuit. Thereafter at Block S, the data packet synthesis module outputs the buffered digital data sequence (of the second synthesized data packet) to the data packet transmission circuit, which uses the digital data sequence to modulate the frequency of the carrier signal as it is being transmitted from the bar code symbol reading device, to its mated base unit, and thereafter automatically deactivates itself. When at Block T third control module $C_3$ determines that the Packet Number is equal to "3", the control system advances to Block W in FIG. 13C.

Figure 13C:
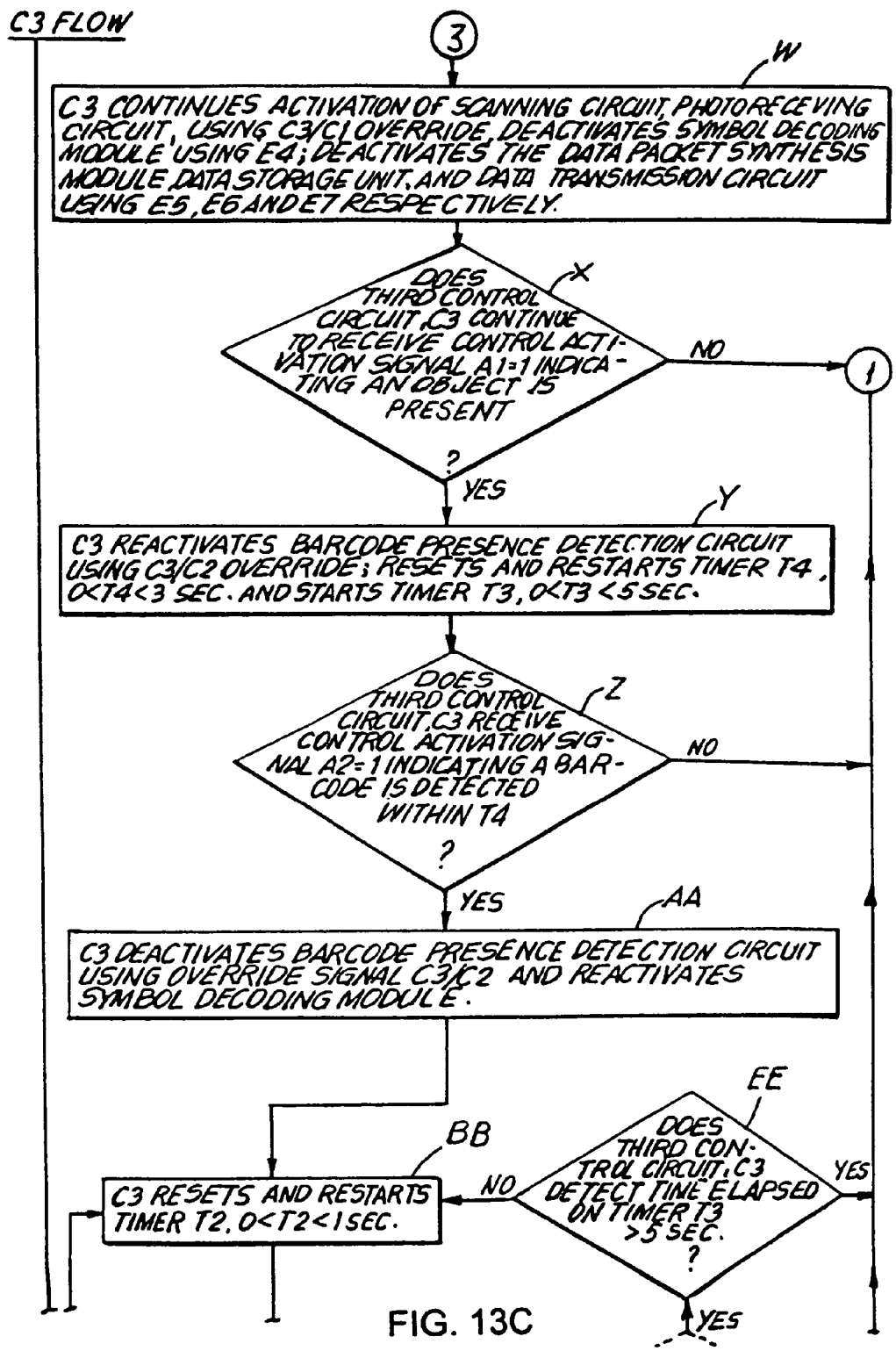
Figure 13C:
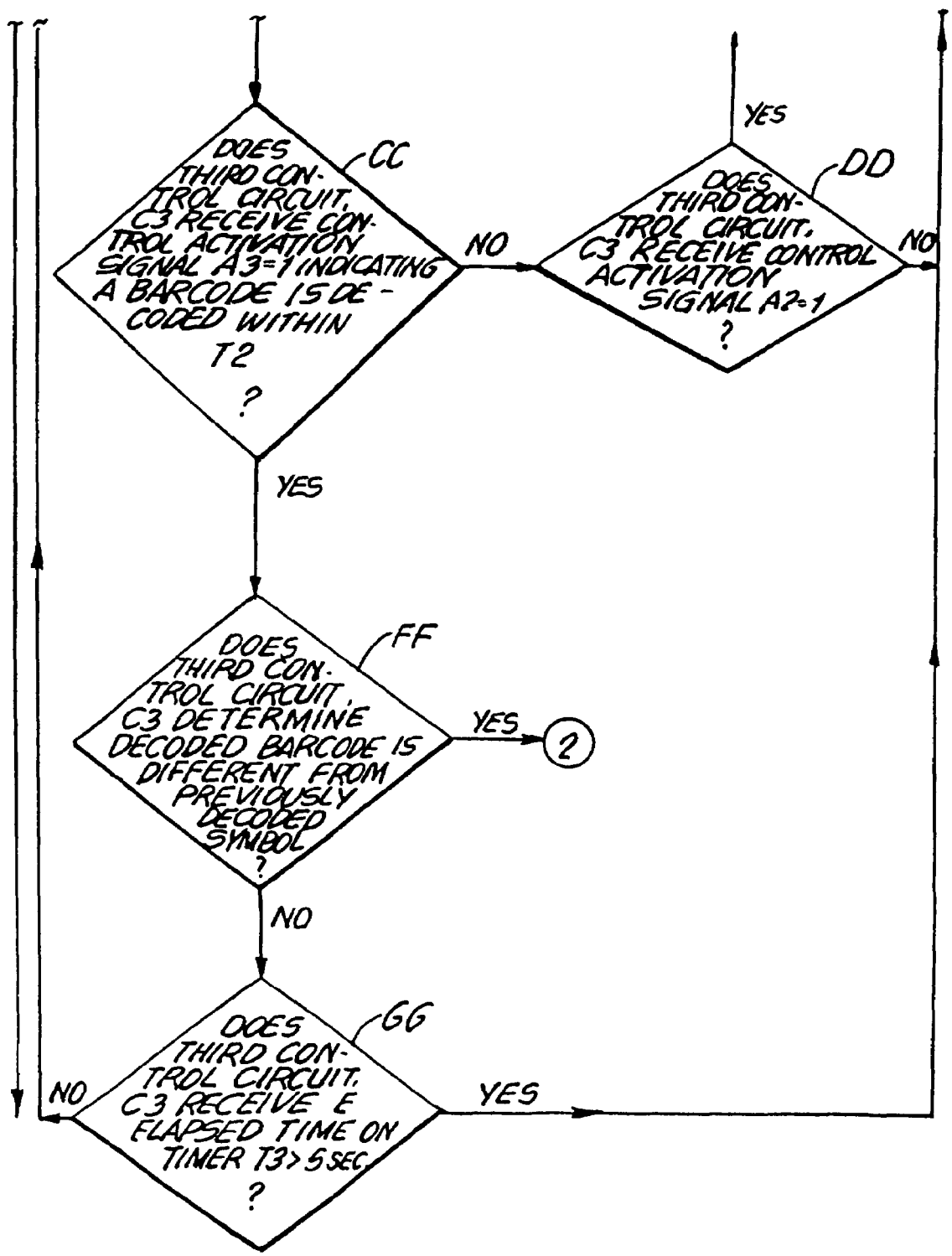

At Block W in FIG. 13C, the third control module $C_3$ continues activation of laser scanning circuit 108 photoreceiving circuit 109, and A/D conversion circuit 110 using control override signals $C_3/C_1$, and deactivates symbol decoding module 119, data packet synthesis module 120 and the data packet transmission circuit 121 using disable signals $E_4=0$, $E_5=0$ and $E_6=0$, respectively. Then at Block X the third control module $C_3$ determines whether control activation signal $A_1=1$, indicating that an object is present in the scan field. If this control activation signal is not provided to the third control module $C_3$, then the control system returns to Block A, as shown. If control activation signal $A_1=1$ is received, then at Block Y the third control module $C_3$ reactivates the bar code symbol detection circuit using override signal $C_3/C_2$, and resets and restarts timer $T_3$ to start running over its predetermined time period, i.e., $0<T_3<5$ seconds, and resets and restart timer $T_4$ for a predetermined time period $0<T_4<3$ seconds.

At Block Z in FIG. 13C, the third control module $C_3$ then determines whether control activation signal $A_2=1$ is produced from the bar code symbol detection circuit 111 within time period $T_4$, indicating that a bar code symbol is present in the scan field during this time period. If this signal is not produced within time period $T_4$, then at Block AA the third control module $C_3$ deactivates the bar code symbol detection circuit using override signal $C_3/C_2$, and reactivates the bar code symbol decoding module 119 using enable signal $E_4=1$. At Block BB, the third control module $C_3$ resets and restarts timer $T_2$ to run over its predetermined time period, i.e., $0<T_2<1$ second. At Block CC the third control module $C_3$ determines whether control activation signal $A_3=1$ is produced by the symbol decoding module within time period $T_2$, indicating that the detected bar code symbol has been successfully decoded within this time period. If this control activation signal is not produced within time period $T_2$, then at Block DD the third control module $C_3$ determines whether control activation signal $A_2=1$ is being produced from the bar code symbol detection circuit, indicating that either the same or another bar code symbol resides within the scan field. If control activation signal $A_2=1$ is not being produced, then the control system returns to Block A, as shown. However, if this control signal is being produced, then at Block EE the third control module $C_3$ determines whether or not timer $T_3$ has lapsed, indicating that time window to read a bar code symbol without redetecting the object on which it is disposed, is closed. When this condition exists, the control system returns to Block A in FIG. 13A. However, if time remains on timer $T_3$, then at Block BB the third control module $C_3$ resets and restarts timer $T_2$ and returns to Block CC. As mentioned above, the control system may flow through the control loop defined by Blocks BB-CC-DD-EE-BB a number of times prior to reading a bar code within time period $T_3$.

When the symbol decoding module produces control activation signal $A_3=1$ within time period $T_2$, the third control module $C_3$ determines at Block FF whether the decoded bar code symbol is different from the previously decoded bar code symbol. If the decoded bar code symbol is different than the previously decoded bar code symbol, then the control system returns to Block O in FIG. 13B. If the currently decoded bar code symbol is not different than the previously decoded bar code symbol, then the third control module $C_3$ determines whether timer $T_3$ has lapsed. If the timer $T_3$ has not lapsed, then the control system returns to Block BB and reenters the control flow defined at Blocks BB through GG, attempting once again to detect and read a bar code symbol on the detected object. However, if at Block GG timer $T_3$ has lapsed, then the control system returns to Block A in FIG. 13A.

Having described the operation of the illustrative embodiment of the automatic hand-supportable bar code reading device of the present invention, it will be helpful to describe at this juncture the various conditions which cause state transitions to occur during its operation. In this regard, reference is made to FIG. 14 which provides a state transition diagram for the illustrative embodiment.

Figure 14:
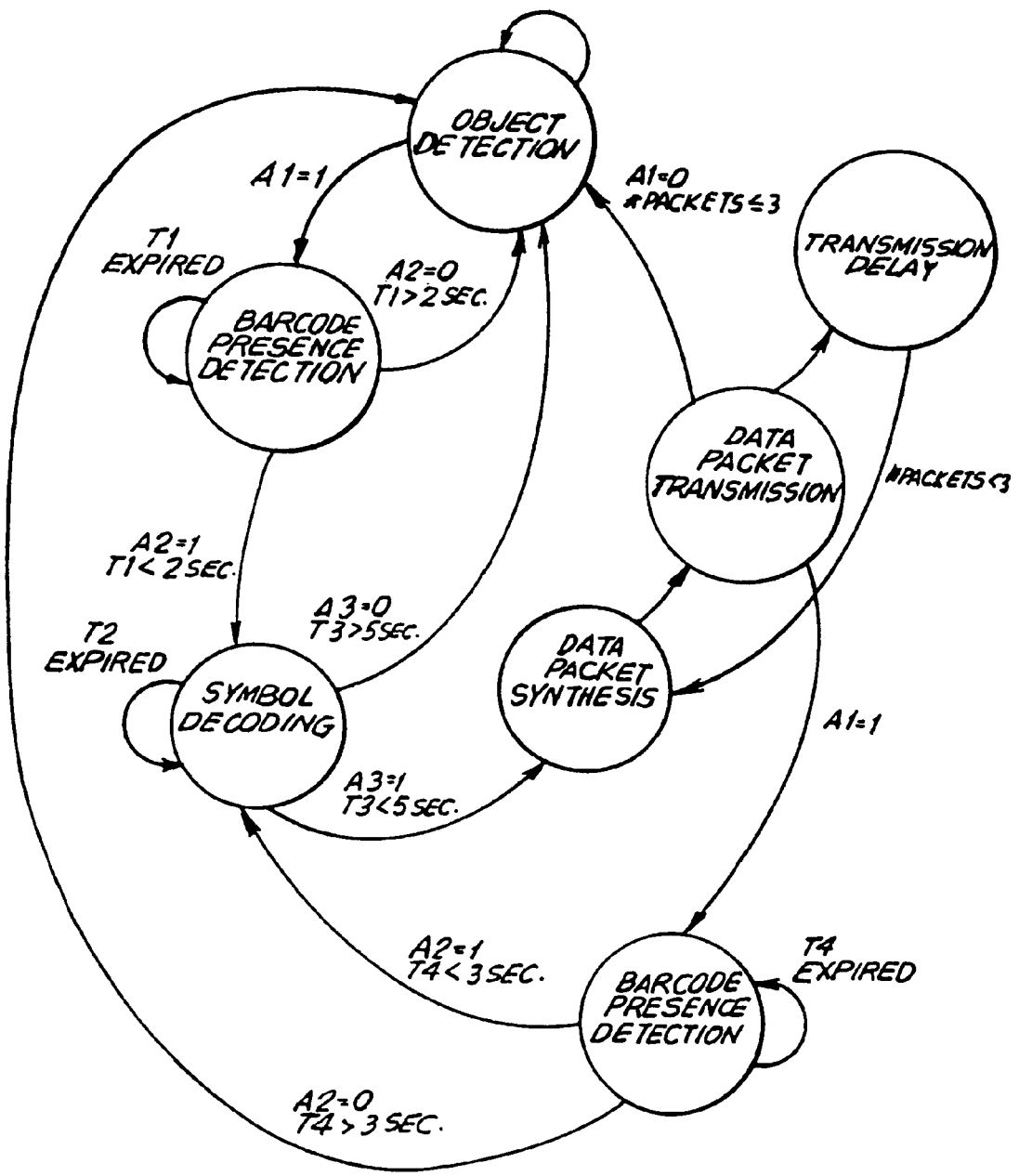
FIG. 14 is a state diagram illustrating the various states that the automatic hand-supportable bar code symbol reading device of the illustrative embodiment may undergo during the course of its programmed operation.

As illustrated in FIG. 14, the automatic hand-supportable bar code reading device of the present invention has four basic states of operation namely: object detection, bar code symbol presence detection, bar code symbol reading, and symbol character data transmission/storage. The nature of each of these states has been described above in great detail.

Transitions between the various states are indicated by directional arrows. Besides each set of directional arrows are transition conditions expressed in terms of control activation signals (e.g., $A_1$, $A_2$ and $A_3$, and where appropriate, state time intervals (e.g., $T_1$, $T_2$, $T_3$, $T_4$, and $T_5$). Conveniently, the state diagram of FIG. 14 expresses most simply the four basic operations occurring during the control flow within the system control program of FIGS. 13A to 13C. Significantly, the control activation signals $A_1$, $A_2$ and $A_3$ in FIG. 14 indicate which events within the object detection and/or scan fields can operate to effect a state transition within the allotted time frame(s), where prescribed.

Figure 15A:
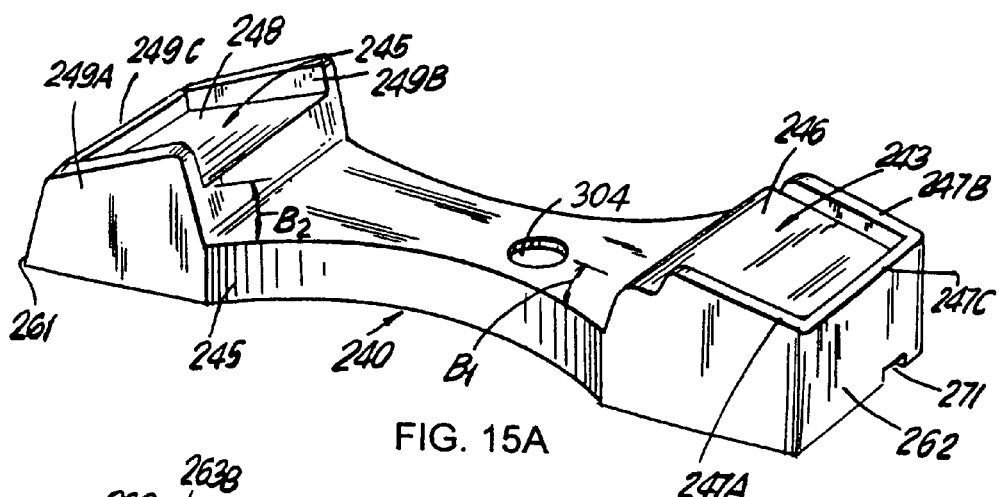
FIG. 15A is a perspective view of the scanner support stand housing of the countertop base unit of the present invention.
Figure 15B:
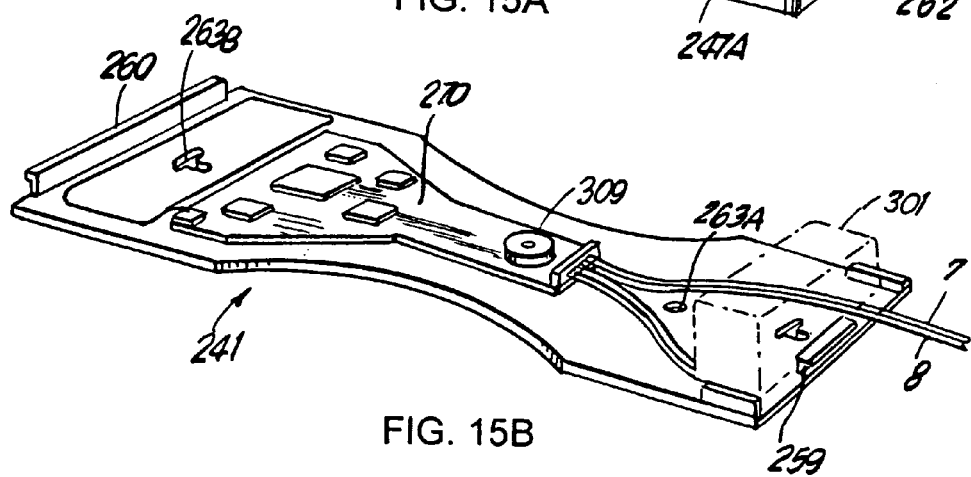
FIG. 15B is a perspective view of the base plate portion of the countertop base unit of the present invention.
Figure 15C:
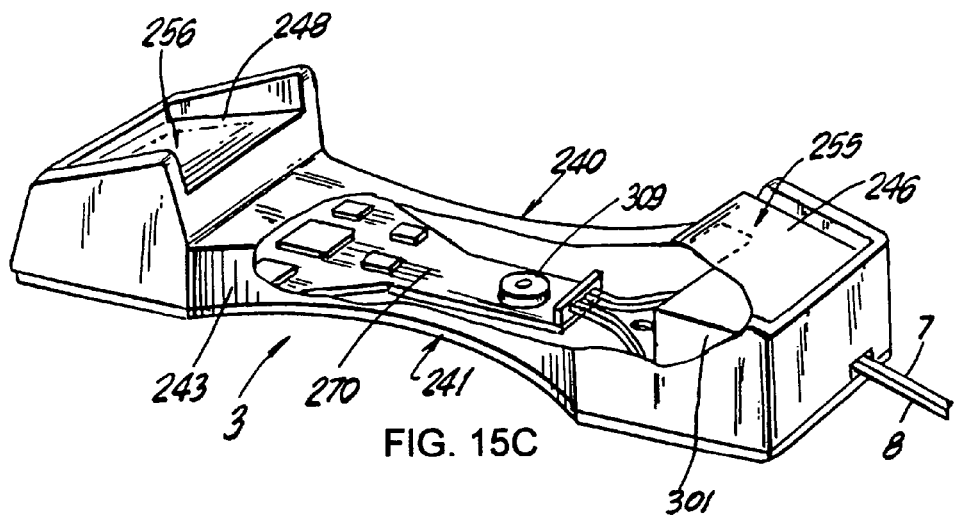
FIG. 15C is a perspective, partially broken away view of the assembled countertop base unit of the present invention.

Referring now to FIGS. 15 to 15C, the base unit of the first illustrative embodiment of the present invention will be described. As shown, base unit 3 is realized in the form of a scanner stand comprising support frame 240 releasably connected to a base support/mounting plate 241 by way of a snap fit fastening mechanism illustrated in FIGS. 15B and 15C. In the illustrative embodiment, support frame 240 is formed as an injection molded shell, in which a handle portion support structure is realized by a first support recess 243; whereas a head portion support structure is realized by a second support recess 245. As shown in FIG. 15, first support recess 243 is disposed above base portion 245 and inclined at a first acute angle Bi with respect thereto, while second support recess 245 is disposed above base portion 245 and inclined at a second acute angle $B_2$ with respect thereto.

As best shown in FIG. 15, first support recess 243 is formed by a first substantially planar support surface 246 surrounded by the projection of opposing side walls 247A and 247B and rear wall 247C, extending above planar support surface 246 in a perpendicular fashion. The function of first support recess 243 is to receive and support the handle portion of hand supportable bar code reading device.

Similarly, second support recess 245 is formed by a second substantially planar support surface 248 surrounded by the projection of opposing side walls 249A and 249B and front wall surface 249C extending above planar support surface 248 in a perpendicular fashion.

The function of support recess 245 is to receive and support the head portion of hand-supportable bar code reading device 2. Front wall projection 249C is slightly lower than side wall projections 249A and 249B to ensure that the transmitted IR signal from IR LED 148 is freely transmitted through an aperture stop 250 formed in the head portion of the housing, whereas the reflected IR signal passes through an aperture stop 251 and is detected by IR photodiode 150 in the head portion of the hand-supportable housing. At the same time, this structural feature of the scanner support stand ensures that visible laser light is projected and collected through light transmissive window 11 without obstruction, i.e., when the automatic bar code reading device is operated in its automatic hands-free mode, shown in FIG. 28, in particular.

In order to ensure that bar code reading device 2 is securely, yet releasably supported within support recesses 243 and 245 and not easily knocked out of the scanner support stand during the hands-free mode of operation, first and second magnetic elements 255 and 256 are permanently mounted to the underside of planar support surfaces 246 and 248, respectively, as illustrated in FIG. 15C. With this arrangement, magnetic flux of constant intensity continuously emanates from support recesses 243 and 245. As a result, when the handle and head portions of the bar code reading device are placed within support recesses 243 and 245, a ferrous element 257 in handle portion 9B is magnetically attracted to magnetic element 255, while ferrous element 258 on head portion 9A is magnetically attracted to magnetic element 256. The magnetic force of attraction between these elements is selected so that a desired degree of force is required to lift the automatic bar code reading device out of scanner support stand, while preventing accidental displacement of the device from the scanner support stand during use in the hands-free mode of operation. Also, the magnetic flux produced from these magnets 255 or 256 is detected by the Hall-effect switch 115 mounted within the hand-supportable bar code symbol reader 2 when it is placed in its support stand 3, as shown in FIG. 4A, inducing the high-speed/low-resolution raster mode of scanner operation for sheet-reading type applications. In this mode, the bar code symbol reader can be used as a 2-D bar code sheet reader with excellent results.

As illustrated in FIGS. 15B and 15C, base mounting plate 241 is formed as a thin planar structure having perimetrical dimensions substantially equal to the perimetrical dimensions of the base portion of support frame 240. At the front and rear end portions of base plate 241, a pair of projections 259 and 260 extend perpendicularly, as shown. These projections have horizontal flanges which are adapted to snap fit into horizontal grooves formed on the interior surfaces of front and rear walls 261 and 262, as shown in FIGS. 15A to 15C.

To facilitate mounting of base plate 241 on a vertical planar mounting surface, a pair of spaced apart mounting holes 263A and 263B are provided. To facilitate attachment of base plate 241 to a pivotal joint assembly 265 associated with pedestal base 266, as illustrated in FIGS. 28 to 29B, a set of mounting holes (not shown) are formed in the base plate itself. To facilitate support of base plate 241 upon a horizontal support surface, a set of four rubber feet (not shown) may be adhesively applied to the underside corners of the base plate.

In order to perform the data packet reception, processing, retransmission, and acknowledgement functions of base unit 3 described above, a circuit board 270 populated with electronic circuitry is concealed within the interior volume contained between the interior surface of support stand portion 245 and the upper surface of base plate 241. In the illustrated embodiment, PC board 270 contains electronic circuitry for realizing each of the functions represented by the block shown in the system diagram of FIG. 16. As shown in FIG. 15A, flexible communication and power supply cables 7 and 8 are routed through aperture 271 formed in the lower portion of rear wall of the support frame, as shown in FIG. 15C, and connect to the electronic circuitry on PC board 270.

Figure 16:
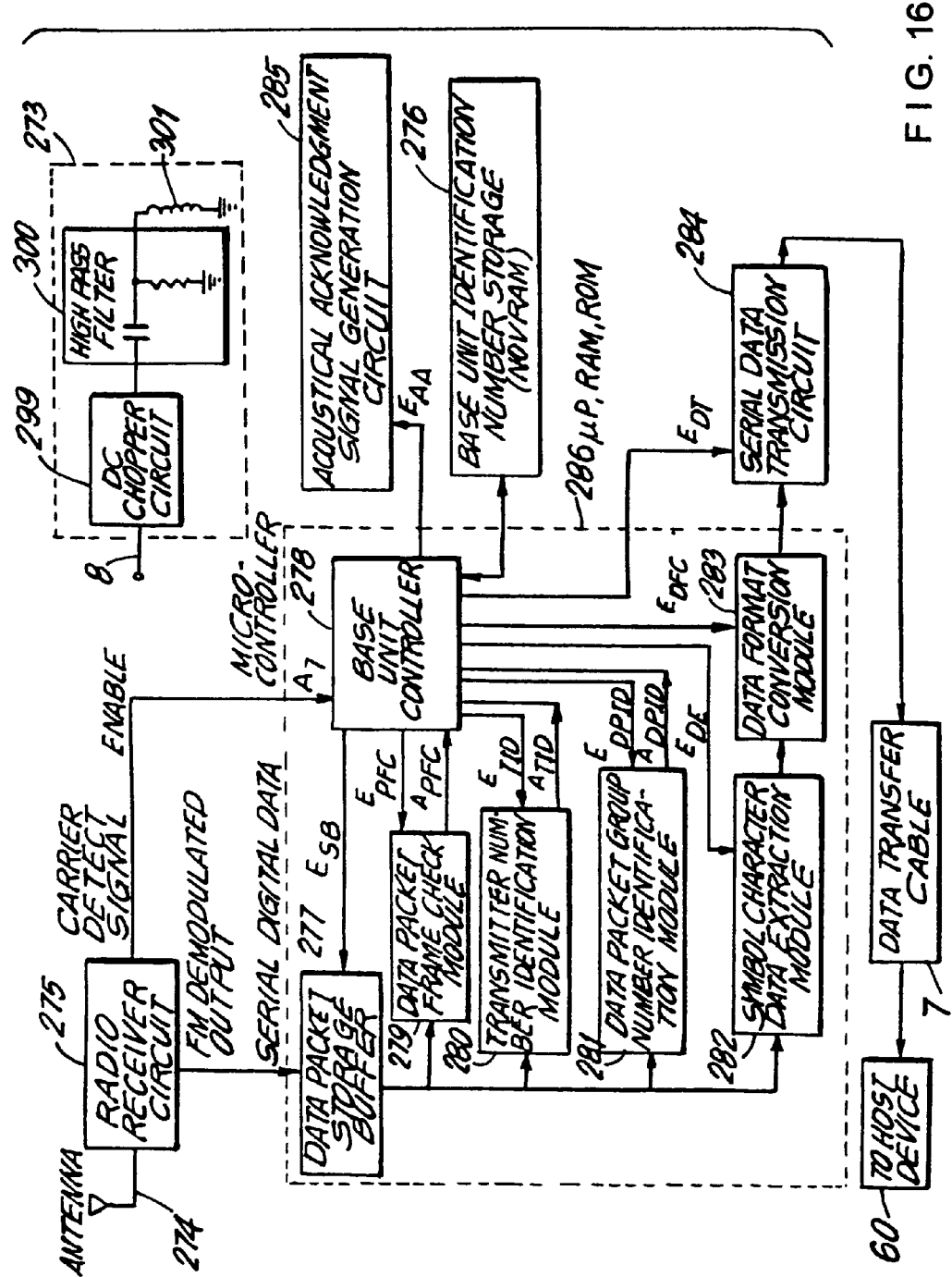
FIG. 16 is a functional block diagram of the data packet receiving and processing circuitry and the acknowledgment signal generating circuitry of the present invention realized on the printed circuit board in the base unit shown in FIGS. 15A to 15C.

In FIG. 16, the system architecture of base unit 3 is schematically represented. As shown, base unit 3 comprises a number hardware and software components, namely: a power supply circuit 273; a receiving antenna element 274; an RF carrier signal receiver circuit 275 base unit identification number storage unit 276; a data packet storage buffer 277; a base unit system controller 278; a data packet frame check module 279; a transmitter number identification module 280; a data packet number identification module 281; a symbol character data extraction module 282; a data format conversion module 283; a serial data transmission circuit 284; and an acoustical acknowledgement signal generation circuit 285. In the illustrative embodiment, a programmed microprocessor and associated memory (i.e., ROM and RAM), indicated by reference numeral 286, are used to realize the base unit system controller 278 and each of the above-described data processing modules 277 to 283. The details of such a programming implementation are known by those with ordinary skill in the art to which the present invention pertains.

As shown in FIG. 16, receiving antenna element 274 is electrically coupled to an input signal port of radio receiver circuit 275 in a conventional manner. In general, the function of radio receiver circuit 275 is to receive and process the data-packet modulated carrier signal transmitted from a remote bar code symbol reader to its mated base unit. The radio receiver circuit of the illustrative embodiment can be realized by configuring several commercially available IC chips together, although it is understood that there are certainly other ways in which to realize the basic functions of this circuit. As shown in FIG. 16A, receiving antenna 274 is connected to a matching filter circuit 287 realized by using miniature inductive and capacitive components. The matching filter circuit is tuned to pass a 912 MHz RF carrier signal transmitted from the data packet transmission circuit 121 of the bar code symbol reading device. The output of matching filter circuit 287 is connected to the input of a first IC chip 288 which converts (i.e., translates) the frequency spectrum of the received modulated carrier signal down to an intermediate frequency band, for subsequent signal processing. In the illustrative embodiment, the first IC chip 288 is realized using the MAF2001 IC chip from Motorola, Inc., and provides a low noise amplifier 289, an double balanced mixer 290. A local oscillator 292 is needed to provide a local oscillator signal of about 922.7 MHZ for use in frequency down-conversion in the double balanced mixer 290. Typically, a matching filter 291 is commonly required between local oscillator 292 and mixer 290. As shown in FIG. 16A, the output of the first IC chip is provided to a band-pass filter 293 tuned to about 10.7 MHZ, the intermediate frequency band of each base unit. The intermediate signal is then provided as input to a second IC chip 294. In the illustrative embodiment, the second IC chip 294 is realized using the MC13156 IC chip commercially available from Motorola, and provides inter alia an amplification circuit, a quadrature demodulation circuit 295, a binary thresholding circuit 296, and carrier signal detection circuit 297. The function of the second IC chip is fourfold. The first function of the second IC chip is to filter and amplify the intermediate signal to produce in-phase and quadrature phase signal components for use in digital data recovery. The second function of the second IC chip is to recover an analog data signal at the base band portion of the spectrum, by providing the in-phase and quadrature-phase signal components to the quadrature demodulation circuit 295. Suitable quadrature demodulation circuitry for use in practicing the present invention is disclosed in U.S. Pat. No. 4,979,230 to Marz, which is incorporated herein by reference in its entirety. As illustrated in FIG. 16A, the third function of the second IC chip is to convert the analog data signal produced from quadrature demodulation circuit 295 into a digital data signal using a binary-level thresholding circuit 296. The fourth function of the second IC chip is to analyze the incoming signal from the output of band-pass filter 293 in order to detect the incoming carrier signal and produce a carrier detect signal $A_7$ to the base unit system controller 278. In order to produce a CMOS compatible signal, the recovered digital data signal produced from second IC chip 294 is amplified by a current amplification circuit 298 that is operative whenever a carrier signal is detected (i.e., $A_7=1$). As shown in FIG. 16, the output of current amplification circuit 298 is a serial data stream that is clocked into data packet storage buffer 277 under the control of base unit system controller 278. In general, the data packet storage buffer 277 can be realized using a commercially available Universal Asynchronous Receiver/Transmitter (UART) device. The primary function of data packet buffer memory 277 is to buffer bytes of digital data in the produced digital data stream.

In the illustrative embodiment, it necessary to provide a means within the base unit housing, to recharge the batteries contained within the hand-supportable housing of the portable bar code symbol reading device. Typically, DC electrical power will be available from the host computer system 6, to which the base unit is operably connected by way of flexible cables 7 and 8. An electrical arrangement for achieving this function is set forth in FIG. 16. As shown, power supply circuit 273 aboard the base unit of the present invention comprises a conventional current chopper circuit 299, a high-pass electrical filter 300 in parallel therewith, and a primary inductive coil 301 in parallel with the high-pass electrical filter. Low voltage DC electrical power provided from the host computer system by way of power cable 8 is provided to direct current (DC) chopper circuit 299, which is realized on PC board 270 using high-speed current switching circuits. The function of current chopper circuit 299 is to convert the input DC voltage to the circuit into a high-frequency triangular-type (time-varying) waveform, consisting of various harmonic signal components. The function of the high-pass electrical filter is to filter out the lower frequency signal components and only pass the higher frequency signal components to the inductive coil 301. As such, the high frequency electrical currents permitted to flow through inductive coil 301 induce a high voltage thereacross and produce time-varying magnetic flux (i.e., lines of force). In accordance with well known principles of electrical energy transfer, the produced magnetic flux transfers electrical power from the base unit to the rechargeable battery aboard the bar code symbol reading device, whenever the primary and secondary inductive coils aboard the base unit and the mated device are electromagnetically coupled by the magnetic flux. In order to maximize energy transfer between the base unit and its mated device during battery recharging operations, high permeability materials and well known principles of magnetic circuit design can be used to increase the amount of magnetic flux coupling the primary and secondary inductive coils of the battery recharging circuit.

Referring to FIG. 16, the function of each of the data processing modules of base unit 3 will now be described in detail.

Upon reception of an incoming carrier signal and the recovery of the digital data stream therefrom, base unit system controller 278 orchestrates the processing of the recovered digital data stream. As shown in FIG. 16, the operation of data processing modules 279, 280, 281, 282 and 283 are enabled by the production of enable signals $E_{PFC}$, $E_{TID}$, $E_{DPID}$, $E_{DE}$, and $E_{DFC}$, respectively, from the base unit system controller.

The primary function of data packet frame check module 279 is to analyze all of the data bytes in the received data packet, including the Start and End of Packet Fields, and determine whether a complete frame (i.e., packet) of digital data bytes has been recovered from the incoming modulated carrier signal. If so, then data packet frame check module 279 produces activation control signal $A_{PFC}=1$, which is provided to the base unit system controller, as shown in FIG. 16.

The primary function of the transmitter number identification module 280 is to analyze the data bytes in the Transmitter ID Field of the received data packet and determine the Transmitter ID Number preassigned to the bar code reading device that transmitted the data packet received by the base unit. If the Transmitter ID Number of the received data packet matches the preassigned Base Unit Identification No. stored in nonvolatile memory (i.e., EPROM) 302 aboard the base unit, then the transmitter number identification module generates control activation signal $A_{TID}=1$, which is provided to the base unit system controller.

The primary function of the packet number identification module 281 is to analyze the data bytes in the Packet Number Field of the received data packet and determine the Packet Number of the data packet received by the base unit. This module then advises the base unit system controller that a different packet number was received, representing a new group (e.g., now seen) by producing an encoded signal ADPID during the system control process.

The primary function of the symbol character data extraction module 282 is to analyze the data bytes in the Symbol Character Data Field of the received data packet, determine the code represented by the symbol character data, and provided this symbol character data to the data format conversion module 283 under the control of the base unit system controller during the system control process.

The primary function of the data format conversion module 283 is to convert the format of the recovered symbol character data, into a data format that can be used by the host computer symbol 6 that is to ultimately receive and use the symbol character data. In the bar code symbol reading system of first illustrative embodiment, the data format conversion is from ASCII format to RS232 format, although it is understood that other conversions may occur in an alternative embodiment of the present invention. Typically, the data format conversion process is carried out using a data format conversion table which contains the appropriate data structure conversions.

The primary function of the serial data transmission circuit 284 is to accept the format-converted symbol character data from the data format conversion module 283, and transmit the same as a serial data stream over data communication cable 7, to the data input port of the host computer system 6 (e.g., cash register, data collection device, inventory computer). Preferably, an RS-232 data communication protocol is used to facilitate the data transfer process. Thus the construction of serial data transmission circuit 284 is conventional and the details thereof are well within the knowledge of those with ordinary skill in the art.

The primary function of acoustical acknowledgement signal generation circuit 285 is to produce an acoustical acknowledgement signal SA in response to the successful recovery of symbol character data from a transmitted data packet. The purpose of the acoustical acknowledgement signal is to notify the user that the transmitted data packet has been successfully received by its mated base unit. In the illustrative embodiment, the intensity of the acoustical acknowledgement signal is such that the remotely situated user of the portable bar code symbol reader can easily hear the acoustical acknowledgement signal in an expected work environment having an average noise floor of at least about 50 decibels. Preferably, the pitch of the acoustical acknowledgement signal is within the range of about 1 to about 10 kilohertz, in order to exploit the sensitivity characteristics of the human auditory apparatus of the user. In the exemplary embodiment, the pitch is about 2.5 kilohertz. Under such conditions, the intensity of such an acoustical acknowledgement signal at its point of generation will typically need to have an output signal power of about 70 decibels in order to be heard by the user in a working environment having an average noise floor of about 50 decibels and an average noise ceiling of about 100 decibels. Acoustical acknowledgement signals of such character can be produced from acoustical acknowledgement signal generation circuit 285, shown in FIG. 285.

As shown in FIG. 16B, acoustical acknowledgement signal generation circuit 285 comprises a number of sub-components, namely: a decoder circuit 305; a voltage controlled oscillator (VCO) driver circuit 306; a VCO circuit 307; an output amplifier circuit 308; and a piezoelectric type electro-acoustic transducer 303 having an output signal bandwidth in the audible range. The operation (i.e., duration) of the acoustical acknowledgment signal generation circuit 285 is controlled by base unit system controller 278 using enable signal $E_{AA}$. In the illustrative embodiment, enable signal $E_{AA}$ is a digital word encoded to represent one of a number of possible audible pitches or tones that are to be generated upon each successful reception of a transmitted data packet at a mated base station. The function of decoder circuit 305 is to decode the enable signal EAA produced by the base unit system controller and produce a set of voltage signals $\{V_11, V2, \ldots, Vn\}$ which correspond to a specified pitch sequence to be produced by electro-acoustic transducer 309. The function of VCO driver circuit 306 is to sequentially drive VCO circuit 307 with the produced set of voltages $\{V_11, V2, \ldots, Vn\}$ so that VCO circuit produces over a short time period (e.g., 0.5–1.5 seconds), a set of electrical signals having frequencies that correspond to the specified pitch sequence to be produced from the electro-acoustic transducer 309. The function of amplifier circuit 308 is to amplify these electrical signals, whereas the function of electro-acoustical transducer 309 is to convert the amplified electrical signal set into the specified pitch sequence for the user to clearly hear in the expected operating environment. As shown in FIGS. 1 and 15A, the base housing is preferably provided with an aperture or sound port 304 so as to permit the energy of the acoustical signal from transducer 309 to freely emanate to the ambient environment of the user. In a particular application, it may be desired or necessary to produce acoustical acknowledgement signal of yet greater intensity levels that those specified above. In such instances, electro-acoustical transducer 309 may be used to excite one or more tuned resonant chamber(s) mounted within or formed as part of the base unit housing.

Figure 17:
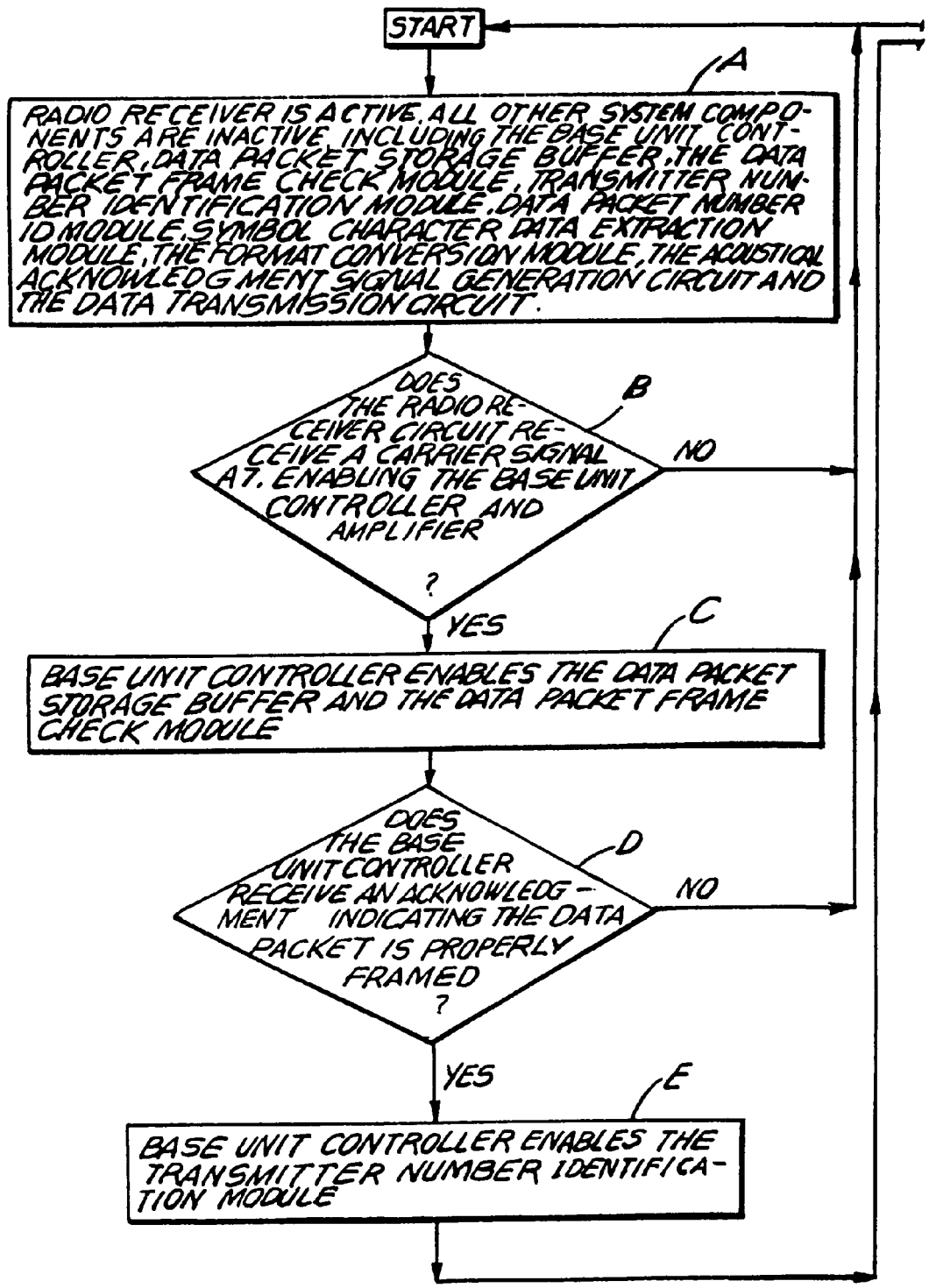
FIGS. 17 and 17A, taken together, set forth a flow chart illustrating the steps undertaken during the control process carried out in the base unit of FIG. 15C.
Figure 17A:
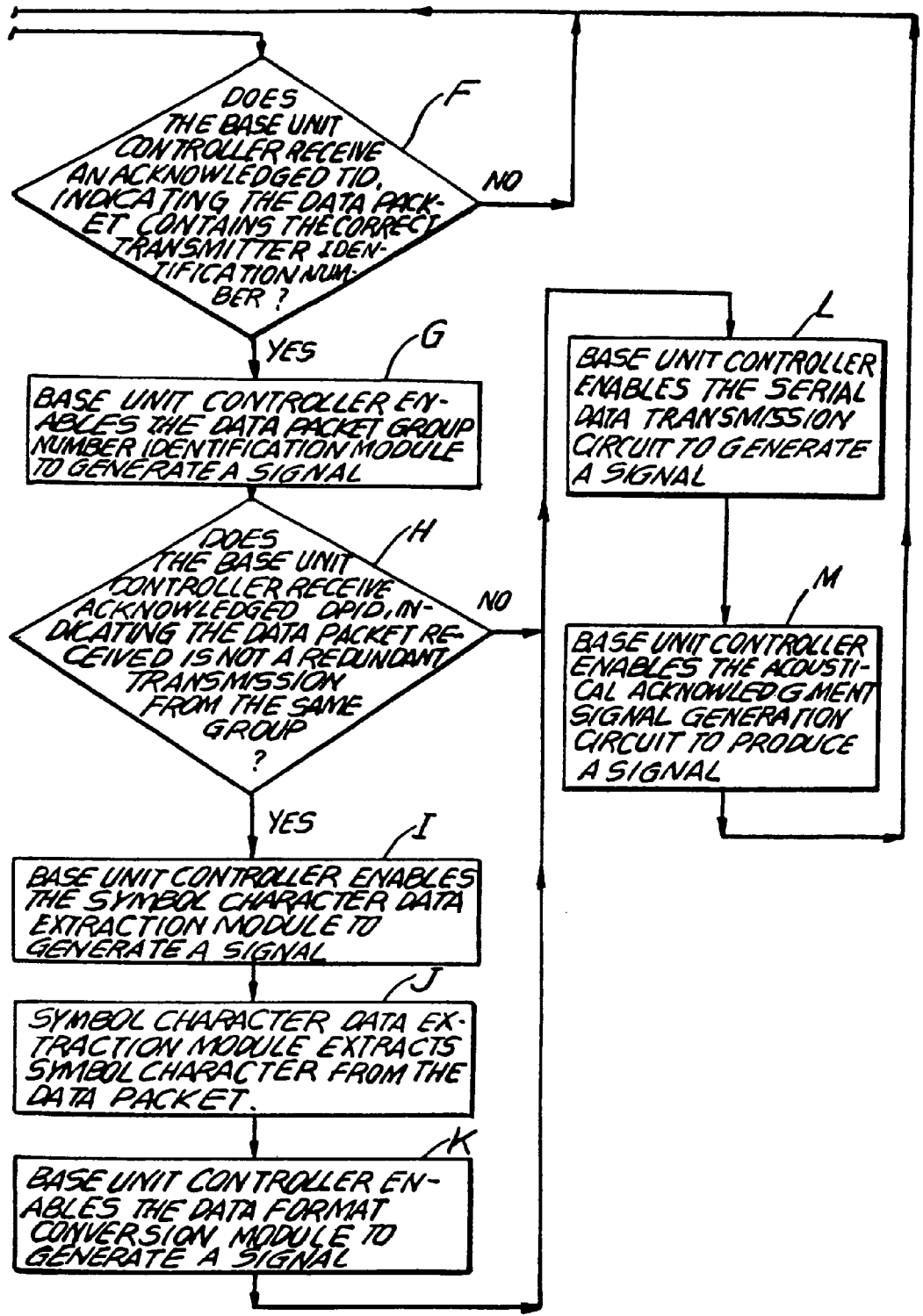

Having described the structure and general functional components of base unit 3, it is appropriate at this juncture to now describe the overall operation thereof with reference to the control process shown in FIGS. 17 and 17A.

As illustrated at Block A in FIG. 17, radio receiving circuit 275 is the only system component that is normally active at this stage of the base unit system control process. All other system components are inactive (i.e., disabled), including base unit system controller 278; data packet storage buffer 277, data packet frame check module 279, transmitter number identification module 280, data packet number Identification module 281, symbol character data extraction module 282, data format conversion module 283, serial data transmission circuit 284, and acoustical acknowledgement signal generation circuit 285. With the radio receiving circuit activated, the base unit is capable of receiving any modulated carrier signal transmitted from any of the bar code symbol reading devices within the data transmission range of the base unit.

At Block B in FIG. 17, radio receiving circuit 275 determines whether it has received a transmitted carrier signal on its receiving antenna element 274. If it has, then the radio receiving circuit generates a system controller activation signal $A_7$, which activates base unit system controller 278 and signal amplifier 276 shown in FIG. 16 and 16A, respectively. Then at Block C, the base unit system controller activates (i.e., enables) data packet storage buffer 277 and data packet frame check module 279 by producing activation control signals ESB=1 and $E_{PFC}=1$, respectively. At Block D, the base unit system controller determines whether it has received an acknowledgement (i.e., control activation signal $A_{PFC}=1$) from the data packet frame check module, indicating that the received data packet is properly framed. If the received data packet is not properly framed, then the base unit returns to Block A in order to redetect an incoming carrier signal. However, if the received data packet is properly framed, then at Block E the base unit system controller enables the transmitter number identification module by generating enable signal $E_{TID}=1$.

At Block F, the base unit system controller determines whether it has received an acknowledgment (i.e., control activation signal $A_{TID}=1$) from the transmitter number identification module that the received data packet contains the correct transmitter identification number (i.e., the same number assigned to the base unit and stored in storage unit 276). If the Transmitter Identification Number contained within the received data packet does not match the base unit identification number stored in storage unit 276, then the base unit system controller returns to Block A whereupon it resumes carrier signal detection. If, however, the transmitter packet number contained within the received data packet matches the base unit identification number, then at Block G the base unit system controller enables the data packet number identification module 289 by generating enable signal $E_{DPID}=1$.

At Block H, the base unit system controller determines whether it has received an acknowledgment (i.e., control activation signal $A_{DPID}=1$) from the data packet identification module indicating that the received data packet is not a redundant data packet (i.e., from the same transmitted data packet group). If the received data packet is a redundant data packet, then the base unit system controller returns to Block A, whereupon carrier signal detection is resumed. If, however, the received data packet is not redundant, then at Block I the base unit system controller enables the symbol character data extraction module by generating enable signal $E_{DE}=1$. In response to the generation of this enable signal, the symbol data extraction module reads at Block J the symbol character data contained in the received data packet, checks the data for statistical reliability, and then writes the extracted symbol character data bytes into a storage buffer (not explicitly shown).

As indicated at Block K in FIG. 17, the base unit system controller then enables the data format conversion module by generating enable signal $E_{DFC}=1$. In response to this enable signal, the data format conversion module converts the data format of the recovered symbol character data and then buffers the format-converted symbol character data bytes in a data buffer (not explicitly shown). At Block L the base unit system controller enables the serial data transmission circuit 284 by generating enable signal $E_{DT}=1$. In response to this enable signal, the serial data transmission circuit transmits the format-converted symbol character data bytes over communication cable 7 using serial data transmission techniques well known in the art, as discussed above. When the serial data transmission process is successfully completed, the base unit system controller enables at Block M the acoustical acknowledgement signal generation circuit 285 by producing enable signal $E_{AA}=1$. In response to the production of this enable signal, acoustical acknowledgment signal generation circuit 285 generates a high intensity acoustical signal having characteristics of the type described above, thereby informing the user that a transmitted data packet has been received and that the symbol character data packaged therein has been successfully recovered and transmitted to the host computer system. Thereafter, the base unit system controller returns to the Block A, as shown.

With automatic bar code reading device positioned within scanner stand portion of base unit 3 as shown in FIG. 32, the system is automatically induced into its long-range hands-free mode of operation by way of the magnetic flux sensing technique disclosed in copending application Ser. No. 07/761,123. By simply moving object 435 into the object detection field, the bar code symbol 436 is repeatedly scanned by the visible laser beam scanned across the scan field. To induce the automatic bar code reading system into its short-range hands-on mode of operation, the user simply grasps the automatic bar code reading device and lifts it out of the scanner support stand, as illustrated in FIG. 33A. Then, by placing object 435 into the short-range portion of the object detection field as shown in FIG. 33B, the object is automatically detected and bar code symbol 436 scanned by the visible laser beam repeatedly scanned across the scan field. After the bar code symbol has been successfully read and an audible acoustical acknowledgment signal produced as herebefore described, the automatic bar code reading device can be placed back into the scanner support stand, automatically inducing the system into its long-range hands-free mode of operation.

The one-way RF data packet transmission protocol described in detail above can be modified so that the data contained in 2-D (e.g. PDF) bar code symbols can be transmitted to the base unit of the bar code symbol reader. This would involve modifying the data packet format shown in FIG. 8R by adding two data fields between start of packet field 221 and end of packet field 226, namely: a Packet Set Number Field representative of the number assigned to each set of packets to be sent for each 2-D bar code symbol read; and a Total Number Of Packets In Set Field representative of the total number of packets to be transmitted in each set of packets. Typically, three or more sets of packets will be sent to provide sufficient redundancy in the protocol. The total number of packets in a given set will be dependent on the actual amount of data contained in a particular 2-D bar code symbol read, and thus can vary from data transmission session to data transmission session. The protocols used at the portable bar code symbol reader and the base station can be readily modified so that the base unit will generate an acoustical acknowledgment signal to the operator only when all of the data packets in a given set of packets (in a packet group) have been received by the base unit without error.

Other Illustrative Embodiments of Bar Code Symbol Reading System of the Present Invention In general, the 2-D bar code symbol reading engine 18 described above can be embodied within diverse types of bar code driven systems, including hand-held bar code symbol readers, body-wearable bar code symbol readers, fixed counter scanners, transaction terminals, reverse-vending machines, CD-juke boxes, etc. In FIGS. 18 and 19, a few illustrative examples are shown where such laser scanning engines can be embodied. Such examples are not intended to limit the scope of the present invention, but simply illustrate several of the many environments that the 2-D laser scanning module hereof might be embedded in.

In FIG. 18, the laser scanning bar code reading 18 is shown embodied within a hand-held bar-code symbol driven Internet-based portable data terminal 775. As shown, the portable data terminal 775 is shown connected to an ISP 776 by way of a radio-base station 777 and wireless link 778. The hand-held Internet Access Terminal 775 has an integrated GUI-based web browser program, display panel 779, touch-screen type keypad 780, and programmed bar code symbol scanner 781 incorporating the laser scanning engine 18 of FIG. 5A. The function of bar code symbol driven terminal 775 can be multi-fold: namely: it may be used to read a bar code symbol 882 that is encoded with the URL of a transaction-enabling Web page to be accessed form a web (http) server 783 by the Internet-based Transaction-Enabling System, and produce symbol character data representative thereof; it may be used to read UPC-type bar code symbols in order to access a database connected to the Internet 785 by way of a common gateway interface (CGI); it may be used to read PDF-type bar code symbols encoded with various types of information known in the art; or it may be simply used to read other types of bar code symbols that identify a product or article in a conventional manner.

In the illustrative embodiment, the portable data terminal 775 is realized as a transportable computer, such as the Newton® Model 2000 MessagePad from Apple Computer, Inc. of Cupertino, Calif. This device is provided with NetHopper™ (2.0) brand Internet Access Software which supports the client-side of HTTP and the TCP/IP networking protocol within the Newton MessagePad operating system. Such software provides the Newton MessagePad with a GUI-based HTTP (WWW) browser for WWW access and the like. The MessagePad 775 s also equipped with a Motorola PCMCIA-based modem card 86 having a RF transceiver for establishing a wireless digital communication link with either (i) a cellular base station, or (ii) one or more satellite-base stations connected to the Internet by way of ISP 776 in a manner well known in the global information networking art.

As shown, the entire Newton MessagePad, bar code symbol engine 18 and auxiliary battery supply (not shown) are completely housed within a rubberized shockproof housing 787, in order to provide a hand-supportable unitary device. Once the object (e.g., transaction card) 788 is detected by the object detection field 15, a laser beam 431 is automatically projected and swept across the bar code symbol thereon within the laser scan field 10.

In the illustrative embodiments above, the bar code symbol reading device has been either supported within the hand of the operator; upon a countertop surface or the like. It is contemplated, however, that the laser scanning module of the present invention can be embodied within a body-wearable bar code symbol reader designed to be worn on the body of an operator as illustrated in FIG. 19. As shown, the body-wearable Internet-based system 891 comprises: a bar code symbol scanning unit 892 designed to be worn on the back of the hand, and within which the 1D/2-D laser scanning module of the present invention is integrated; and a remote unit 893 (i.e., body-wearable RF-based portable data/Internet-Access terminal) designed to be worn about the forearm or foreleg of the operator by fastening thereto using flexible straps or like fastening technology.

In the illustrative embodiment shown in FIG. 19, hand-mounted scanning unit 892 comprises: a light transmission window 894 for exit and entry of light used to scan bar code symbols; a glove 895 worn by the operator for releasably mounting the housing 896 to the back of his or her hand, and a laser scanning bar code symbol reader 897, as described hereinabove with respect to the other illustrative embodiments of the present invention.

In the illustrative embodiment shown in FIG. 19, the remote unit 893 comprises: an LCD touch-screen type panel 897; an audio-speaker 898; a RISC-based microcomputing system or platform 899 for supporting various computing functions including, for example, TCP/IP, HTTP, and other Internet protocols (e.g, E-mail, FTP, etc.) associated with the use of an Internet browser or communicator program (e.g., Netscape Navigator or Communicator, or MicroSoft Explorer programs) provided by the remote unit; a telecommunication modem 8100 interfaced with the microcomputing system; and RF transceiver 8101 (e.g., employing DFSK or spread-spectrum modulation techniques) also interfaced with the telecommunication modem for supporting a 2-way telecommunication protocol (e.g, PPP) known in the art, between the microcomputing system and a remote transceiver 8102 (described hereinabove) which is interfaced with an ISP connected to the Internet; a (rechargeable) battery power supply 104 aboard the remote housing, for providing electrical power to the components therein as well as to the bar code symbol reader 987; and a flexible cable 8105, for supporting communication between the bar code symbol reader and the microcomputing platform, and electrical power transfer from the power supply to the bar code symbol reader. Notably, the remote unit 893 will embody one of the Internet access methods described hereinabove. The method used by remote unit 893 (i.e., Internet access terminal) will depend on the information that is encoded within the bar code symbol scanned by the bar code symbol reader thereof. Preferably, the remote unit is worn on the forearm of the operator so that the touch-type LCD panel 897 integrated therewith can be easily viewed during use of the body-wearable system of the present invention. Thus, for example, when an URL-encoded bar code symbol is read by the hand-mounted (or finger-mounted) bar code symbol reader 892, the transaction-enabling web page associated with the scanned bar code symbol and displayed on the LCD panel can be easily viewed by and interacted with by the operator. Also, in response to reading an URL-encoded bar code symbol (i.e., transaction enabled thereby), the operator may be required to manually enter information to the Web page being displayed, using the touch-screen display panel 897 and pen-computing software, well known in the art. Portable data terminal 891 is also programmed to read PDF and other types of 2-D bar code symbols used in diverse applications.

In the above-described illustrative embodiments, the bar code symbol reading engine was activated using IR-based object detection circuitry. In other embodiments of the present invention, the bar code symbol reading system can be activated (i) using laser-based object detection mechanisms as shown in FIGS. 20, 21 and 22 using bar code symbol reading engine 18', or (ii) using manually-actuated mechanisms (such as trigger switches, voice actuation, capacitance sensors and the like) as shown in FIGS. 23, 24 and 25 using bar code symbol reading engine 18".

In FIG. 20, the system of FIG. 2 has been modified by removing the IR-based object detection circuitry and adding some control circuitry that operates the laser beam in a low power, non-visible mode when the system is in its bar code detection state. The low-power non-visible laser beam can be pulsed out into the object detection field, spatially-coincident with the scan field, and detected by the photo-receiving circuit whose sensitivity can be increased for this embodiment of the present invention. Such modifications would result in a bar code symbol reading engine 18 having virtually all of the functionalities of engine 18. Thus automatic bar code symbol reading system 1' would function much like automatic bar code symbol reading system 1.

In FIG. 21, the system of FIG. 18 has been modified by modifying bar code symbol reading engine 18 into engine 18', as described above. Thus automatic bar code symbol reading system 775' would function much like automatic bar code symbol reading system 775.

In FIG. 22, the system of FIG. 19 has been modified by modifying bar code symbol reading engine 18 into engine 18', as described above. Thus automatic bar code symbol reading system 891' would function much like automatic bar code symbol reading system 891.

In FIG. 23, the system of FIG. 2 has been modified by removing all automatic object detection circuitry (e.g. IR transceiver, object detection circuit 107, etc.) and adding a manually-actuatable trigger switch 900 on the housing as shown, so as to enable the operator to produce control activation signal $A_1$ by pulling the trigger switch in a manner know in the art. This will signal to $C_1$ that an object (and possibly a bar code symbol) is in the scan field. All other automatic circuitry within engine 18 can be used with little or no modification required. Such modifications would result in a bar code symbol reading engine 18' having virtually all of the functionalities of engine 18. Thus automatic bar code symbol reading system 1" would function much like automatic bar code symbol reading system 1, except that actuation of the trigger switch 900 is required to initiate laser scanning and system operation.

In FIG. 24, the system of FIG. 18 has been modified by transforming bar code symbol reading engine 18 into engine 18", as described above. Optionally, manual trigger switch 900 can be emulated on the touch-type display screen 780 using a graphical icon 900' representative of a "start scanning/reading" button. Thus automatic bar code symbol reading system 775" would function much like automatic bar code symbol reading system 775 except that actuation of the trigger switch 900 (or 900') is required to initiate laser scanning and system operation.

In FIG. 25, the system of FIG. 19 has been modified by modifying bar code symbol reading engine 18 into engine 18", as described above. In this case, the manual trigger switch 900 can be realized as a lever 900" actuatable by the operator's finger movement, or by a graphical icon 900" displayed on touch-screen 897 representative of a "start scanning/reading" button. Thus automatic bar code symbol reading system Thus automatic bar code symbol reading system 891" would function much like automatic bar code symbol reading system 891.

Having described the preferred embodiments of the present invention, several modifications come to mind.

For example, while the illustrative embodiments have disclosed the use of base sheet material comprising copper laminated onto Kapton™ plastic material during the fabrication of the scanning element hereof, it is understood that other types of resilient plastic materials, including Mylar™ plastic material, can be used to manufacture the scanning element with suitable results.

The automatic bar code reading system of the present invention is capable of performing a wide variety of complex decision-making operations in real-time, endowing the system with a level of intelligence hitherto unattained in the bar code symbol reading art. Within the spirit of the present invention, additional decision-making operations may be provided to further enhance the capabilities of the system.

It is understood that the laser scanning modules, engines and systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A system capable of producing a raster-type laser scanning pattern for scanning 2-D bar code symbols along x and y axis scanning directions, said system comprising:

a housing;

a light source disposed in said housing, for producing a light beam having cross-sectional characteristics suitable for scanning a 2-D bar code symbol bar code symbol along x and y axis scanning directions;

a first light beam scanning mechanism, disposed in said housing and responsive to a first control signal, for scanning said light beam along said x axis scanning direction using a first scanning element, wherein said first light beam scanning mechanism includes a first electromagnetically driven coil for driving said first scanning element;

a second light beam scanning mechanism, disposed in said housing and responsive to a second control signal, for scanning said light beam along said y axis scanning direction orthogonal to said x axis scanning direction using a second scanning element, wherein said second light beam scanning mechanism includes a second electromagnetically driven coil for driving said second scanning element;

light collecting means disposed in said housing, for collecting light reflected off a bar code symbol scanned by said scanning pattern;

light detecting means disposed in said housing, for detecting said collected light and producing scan data indicative of the intensity of said detected light; and electronic scanning mechanism control circuitry, disposed in said housing, for electrically controlling the operation of said first and second scanning elements so as to produce a raster-type scanning pattern for scanning said 2-D bar code symbol along x and y axis scanning directions;

wherein said electronic scanning mechanism control circuitry includes (i) a push-pull type drive circuit for producing an x-axis drive voltage signal having periodic characteristics, for driving said first scanning element along said x axis direction, and (ii) an electronically-controlled potentiometer for producing a y-axis drive voltage signal periodically incrementing and decrementing in small quantized voltage level steps, in response to a control signal generated independently from said x-axis drive voltage signal, for driving said second scanning element along said y axis direction.

2. The system of claim 1, wherein said electronic scanning mechanism control circuitry electrically controls said first and second scanning elements in a synchronous manner so that said raster-type scanning pattern as a whole is substantially free of movement relative to said housing.

3. The system of claim 1, wherein said electronic scanning mechanism control circuitry electrically controls said first and second scanning elements in an asynchronous manner so that said raster-type scanning pattern as a whole moves back and forth along relative to said housing so as to improve the scanning of said 2-D bar code symbol when supporting said housing within the hand of an operator.

4. The system of claim 1, wherein said light beam is a laser beam.

5. The system of claim 1, wherein said housing is hand-supportable.

6. The system of claim 1, wherein said housing is body-wearable.

7. The system of claim 1, said scanning pattern is a 1D scanning pattern.

8. The system of claim 1, wherein said electronic scanning mechanism control circuitry comprises means for generating a plurality of y-axis drive voltage signals, each for driving said second scanning element at a different scan rate.

9. The system of claim 1, wherein said scanning element comprises a first scanning element comprises a first mechanically-damped scanning element supported at one end from a first fixed anchoring structure, and driven in an off-resonant manner by said first electromagnetically driven coil; and wherein second scanning element comprises a second mechanically-damped scanning element supported at one end from a second fixed anchoring structure, and driving in an off-resonant manner said second electromagnetically driven coil.

10. The system of claim 9, wherein said first fixed anchoring structure and said second fixed anchoring structure are provided on a common support platform, in close proximity with each other.

11. The system of claim 10, wherein said common support platform comprises an optical bench.

12. The system of claim 1, wherein said housing is a miniature enclosure that can be supported on the hand of an operator.

* * * * *